United States Patent
Lee et al.

(10) Patent No.: US 11,930,497 B2
(45) Date of Patent: Mar. 12, 2024

(54) METHOD WHEREBY USER EQUIPMENT RECEIVES DATA SIGNAL IN WIRELESS COMMUNICATION SYSTEM, AND USER EQUIPMENT AND BASE STATION WHICH SUPPORT SAME

(71) Applicant: LG Electronics Inc., Seoul (KR)

(72) Inventors: Kilbom Lee, Seoul (KR); Jiwon Kang, Seoul (KR); Hyungtae Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 345 days.

(21) Appl. No.: 17/430,976

(22) PCT Filed: Jan. 22, 2020

(86) PCT No.: PCT/KR2020/001111
§ 371 (c)(1),
(2) Date: Aug. 13, 2021

(87) PCT Pub. No.: WO2020/166844
PCT Pub. Date: Aug. 20, 2020

(65) Prior Publication Data
US 2022/0141857 A1    May 5, 2022

(30) Foreign Application Priority Data
Feb. 15, 2019 (KR) .................. 10-2019-0018250
Mar. 29, 2019 (KR) .................. 10-2019-0037503

(51) Int. Cl.
*H04W 72/1273* (2023.01)
*H04W 72/0446* (2023.01)
(Continued)

(52) U.S. Cl.
CPC ... *H04W 72/1273* (2013.01); *H04W 72/0446* (2013.01); *H04W 72/0453* (2013.01); *H04W 72/23* (2023.01); *H04W 72/54* (2023.01)

(58) Field of Classification Search
CPC ... H04L 5/0044; H04L 5/0046; H04L 5/0094; H04W 72/0446; H04W 72/0453; H04W 72/1273; H04W 72/23; H04W 72/54
See application file for complete search history.

(56) References Cited

U.S. PATENT DOCUMENTS 9,723,616 B2 *   8/2017   Cimpu ............... H04W 72/541
10,292,143 B2 *  5/2019   Chatterjee ......... H04W 72/0446
(Continued)

FOREIGN PATENT DOCUMENTS

KR    20180072764    6/2018
KR    20180118531    10/2018

OTHER PUBLICATIONS

International Search Report and Written Opinion in International Appln. No. PCT/KR2020/001111, dated May 11, 2020, 14 pages (with English translation).
(Continued)

*Primary Examiner* — Kashif Siddiqui
(74) *Attorney, Agent, or Firm* — Fish & Richardson P.C.

(57) ABSTRACT

Disclosed are a method whereby user equipment receives a data signal in a wireless communication system, and devices which support same. According to one embodiment applicable to the present disclosure, on the basis of (i) configuration information related to dynamic bundling for a precoding resource block (PRB) and (ii) control information for scheduling a first physical downlink shared channel (PDSCH), both pieces of information being received from a
(Continued)

base station, user equipment can receive a data signal via the first PDSCH on the basis of an assumption related to the first PDSCH.

14 Claims, 31 Drawing Sheets

(51) Int. Cl.
*H04W 72/0453* (2023.01)
*H04W 72/23* (2023.01)
*H04W 72/54* (2023.01)

(56) References Cited

U.S. PATENT DOCUMENTS

| | | |
|---|---|---|
| 10,367,551 B2 * | 7/2019 | Davydov ............ H04L 25/0228 |
| 2016/0227520 A1 | 8/2016 | Davydov et al. |
| 2023/0198714 A1 * | 6/2023 | Rong .................. H04L 25/0226 |
| | | 370/329 |
| 2023/0254022 A1 * | 8/2023 | Hao ...................... H04W 72/21 |
| | | 370/329 |

OTHER PUBLICATIONS

OPPO, "Enhancements on multi-TRP and multi-panel transmission," R1-1900266, Presented at 3GPP TSG RAM WG1 Ad-Hoc Meeting 1901, Taipei, Jan. 21-25, 2019, 7 pages.

Spreadtrum Communications, "Discussion on Multi-TRP transmission," R1-1900711, Presented at 3GPP TSG RAN WG1 Meeting #AH1901, Taipei, Jan. 21-25, 2019, 6 pages.

* cited by examiner

FIG. 6
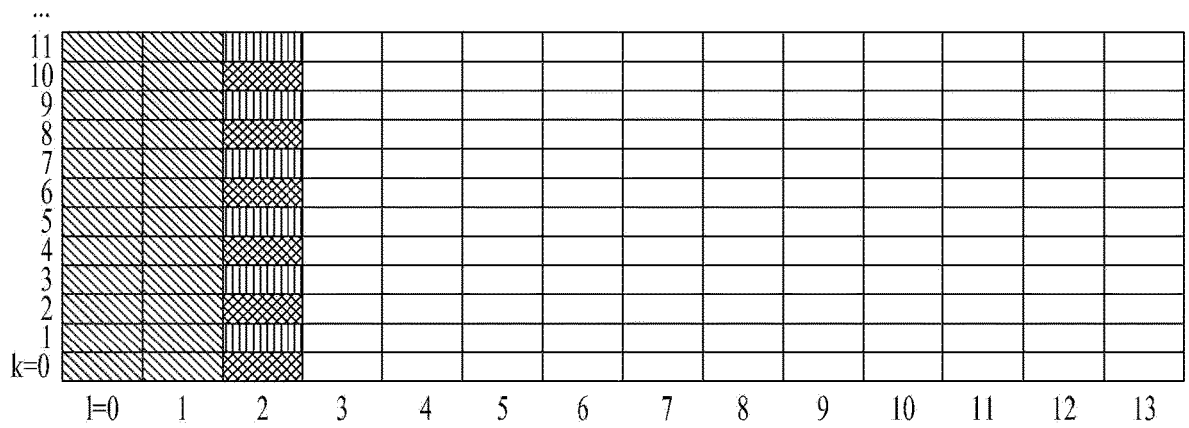
(a)
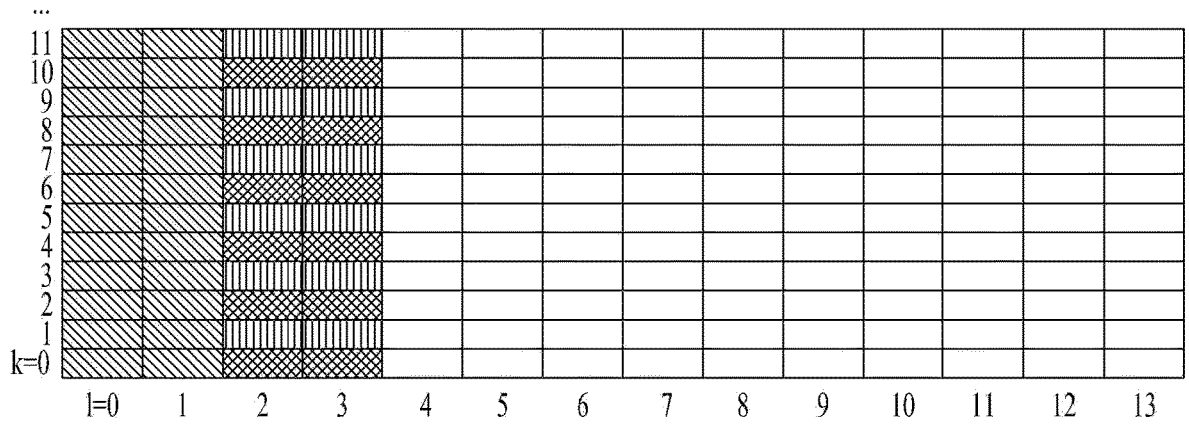
(b)

FIG. 9
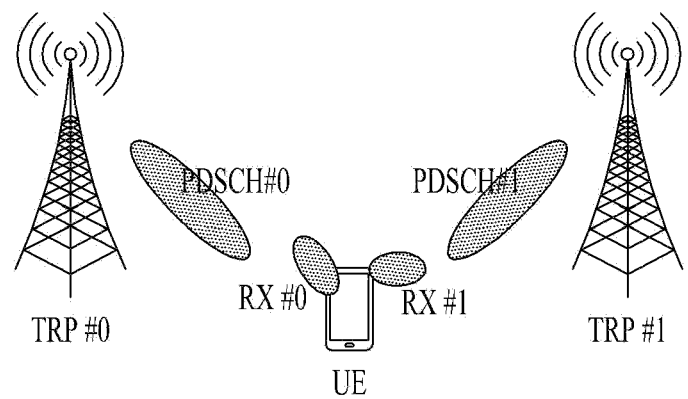
(a)
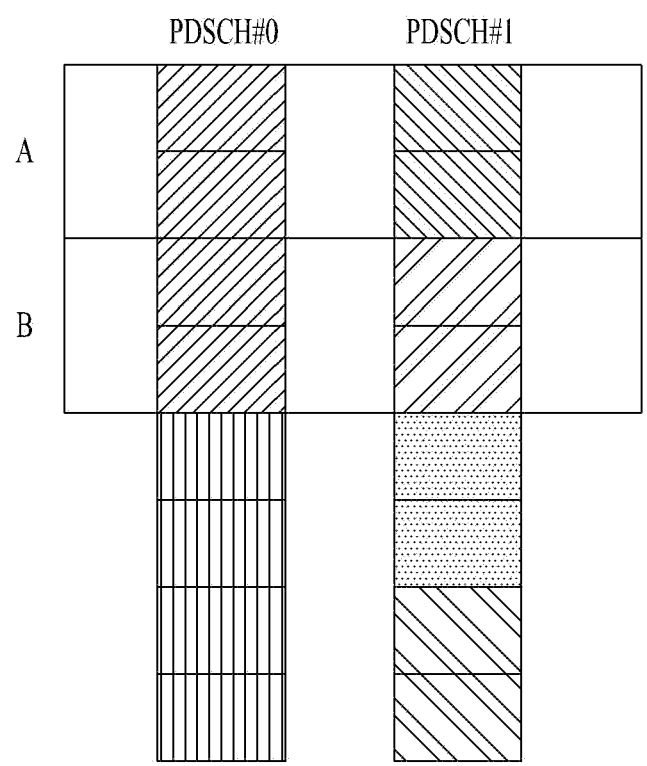
(b)

FIG. 13
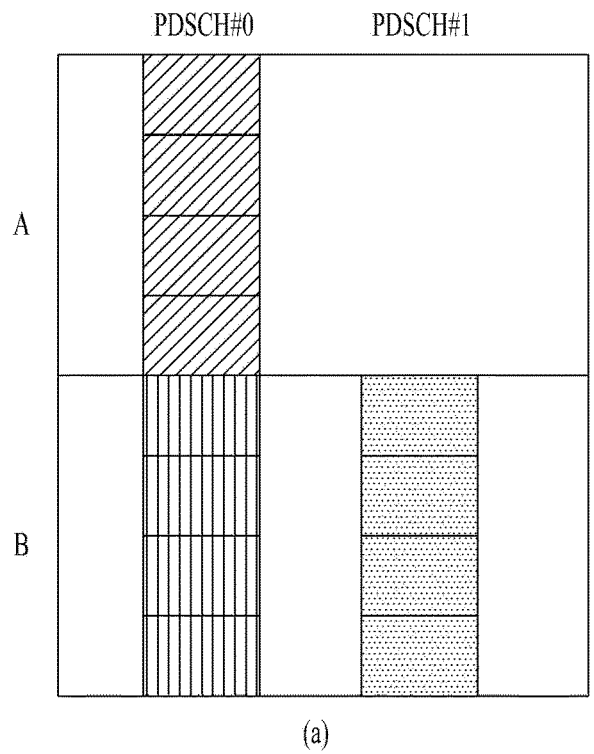
(a)
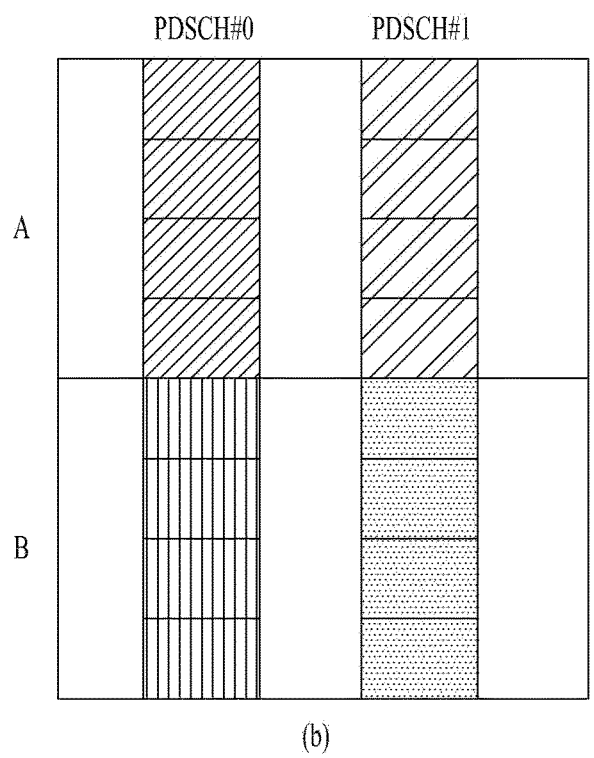
(b)

FIG. 18
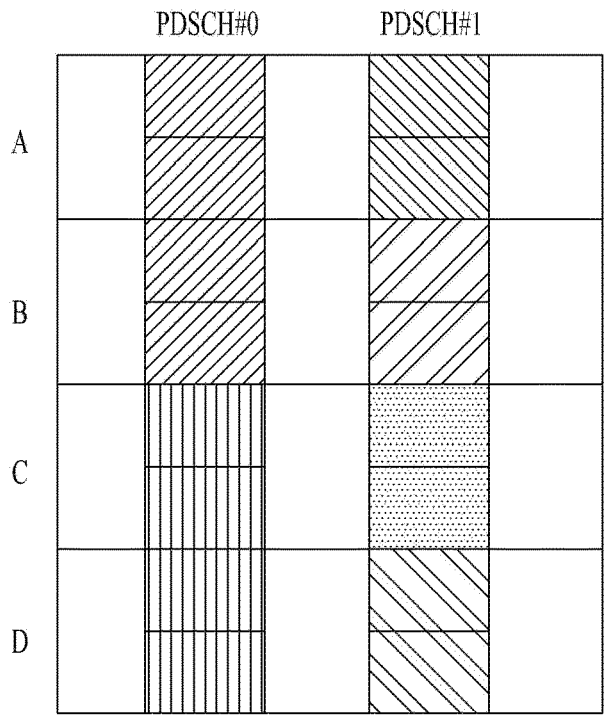
(a)
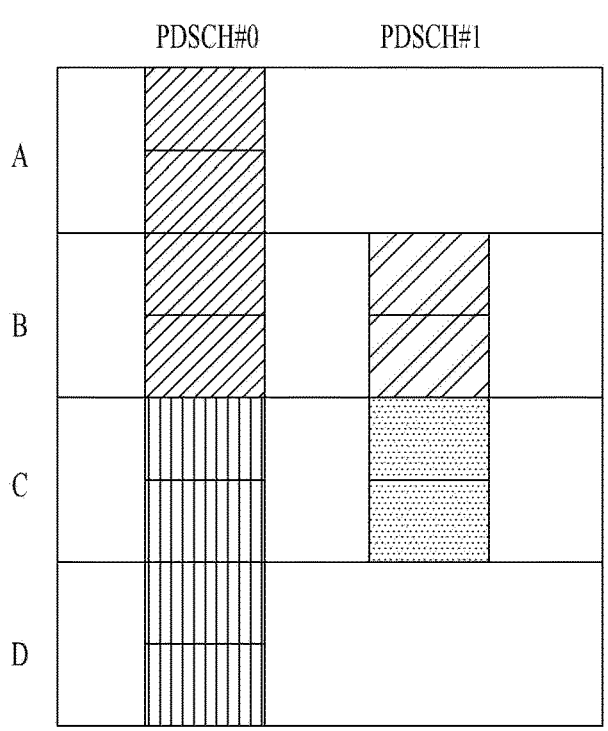
(b)

METHOD WHEREBY USER EQUIPMENT RECEIVES DATA SIGNAL IN WIRELESS COMMUNICATION SYSTEM, AND USER EQUIPMENT AND BASE STATION WHICH SUPPORT SAME

CROSS-REFERENCE TO RELATED APPLICATIONS

This application is a National Stage application under 35 U.S.C. § 371 of International Application No. PCT/KR2020/001111, filed on Jan. 22, 2020, which claims the benefit of Korean Application Nos. 10-2019-0037503, filed on Mar. 29, 2019, and 10-2019-0018250, filed on Feb. 15, 2019. The disclosures of the prior applications are incorporated by reference in their entirety.

TECHNICAL FIELD

The present disclosure relates to a wireless communication system, and more particularly to a method for operating a user equipment (UE) and a base station (BS) related to operation in which the UE receives a data signal through at least one physical downlink shared channel (PDSCH) from at least one transmission reception point (TRP) in a wireless communication system, and a device for supporting the same.

BACKGROUND

Wireless access systems have been widely deployed to provide various types of communication services such as voice or data. In general, a wireless access system is a multiple access system that supports communication of multiple users by sharing available system resources (a bandwidth, transmission power, etc.) among them. For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, and a Single Carrier Frequency Division Multiple Access (SC-FDMA) system.

As more communication devices have demanded higher communication capacity, enhanced mobile broadband (eMBB) communication technology relative to legacy radio access technology (RAT) has been introduced. In addition, a communication system considering services/UEs sensitive to reliability and latency as well as massive machine type communication (MTC) for providing various services anytime and anywhere by connecting a plurality of devices and objects to each other has been introduced. Thus, eMBB communication, massive MTC, ultra-reliable and low-latency communication (URLLC), etc. have been introduced and various configurations therefor have been proposed.

SUMMARY

An object of the present disclosure is to provide a method for allowing a user equipment (UE) to receive a data signal in a wireless communication system, and devices for supporting the same.

It will be appreciated by persons skilled in the art that the objects that could be achieved with the present disclosure are not limited to what has been particularly described hereinabove and the above and other objects that the present disclosure could achieve will be more clearly understood from the following detailed description.

The present disclosure provides a method for allowing the UE to receive a data signal in a wireless communication system and devices for supporting the same.

In accordance with an aspect of the present disclosure, a method for enabling a user equipment (UE) to receive a data signal in a wireless communication system may include receiving, from a base station (BS), configuration information related to dynamic bundling for a precoding resource block (PRB), receiving, from the base station (BS), first downlink control information (DCI) for scheduling a first physical downlink shared channel (PDSCH), i) if absence of another PDSCH configured to overlap the first PDSCH in a time domain and a frequency domain is determined based on the configuration information and the first DCI, or ii) if presence of a second PDSCH configured to overlap the first PDSCH in the time domain and the frequency domain is determined based on the configuration information and the first DCI, allowing the user equipment (UE) to assume that the first PDSCH and the second PDSCH in the frequency domain overlap each other in units of PRB groups (PRGs) each having the same size, and based on the UE assumption, allowing the user equipment (UE) to receive the data signal through the first PDSCH.

The allowing the user equipment (UE) to receive the data signal through the first PDSCH based on the UE assumption may include allowing the user equipment (UE) to receive the data signal through the first PDSCH based on interference channel estimated caused by the assumption.

The configuration information may include any one of:
first bundling size configuration information for indicating that the dynamic bundling has the size of 2 PRBs,
second bundling size configuration information for indicating that the dynamic bundling has the size of 4 PRBs, and
third bundling size configuration information for indicating that the dynamic bundling has the size of wideband (WB).

The second PDSCH may be scheduled (i) for the user equipment (UE), or may be scheduled (ii) for another user equipment (UE).

The method may further include receiving, from the base station (BS), second DCI for scheduling the second PDSCH, and receiving, by the user equipment (UE), the data signal through the second PDSCH based on assumption that is caused by the configuration information and the second DCI.

The first PDSCH and the second PDSCH may be respectively received from different transmission reception points (TRPs).

The user equipment (UE) may expect that a size of a resource block group (RBG) for the first PDSCH is equal to or greater than a size of the PRG of the first PDSCH.

Based on a resource block group (RBG) size for the first PDSCH, the user equipment (UE) may expect candidate values each having the PRG size for the first PDSCH.

For example, based on a resource block group (RBG) size that is equal to 2 and is used for the first PDSCH, the user equipment (UE) may expect that candidate values each having the PRG size for the first PDSCH include 2 PRBs, 4 PRBs, and a wideband (WB).

In another example, based on a resource block group (RBG) size that is equal to or greater than 4 and is used for the first PDSCH, the user equipment (UE) expects that candidate values each having the PRG size for the first PDSCH include 4 PRBs and a wideband (WB).

The receiving the data signal by the UE may further include transmitting acknowledgement (ACK) information related to the data signal to the base station (BS).

In accordance with another aspect of the present disclosure, a user equipment (UE) configured to receive a data signal in a wireless communication system may include at least one transmitter, at least one receiver, at least one processor, and at least one memory operatively connected to the at least one processor, and configured to store instructions such that the at least one processor performs specific operations by executing the instructions. The specific operations may include receiving, from a base station (BS), configuration information related to dynamic bundling for a precoding resource block (PRB), receiving, from the base station (BS), first downlink control information (DCI) for scheduling a first physical downlink shared channel (PDSCH), i) if absence of another PDSCH configured to overlap the first PDSCH in a time domain and a frequency domain is determined based on the configuration information and the first DCI, or ii) if presence of a second PDSCH configured to overlap the first PDSCH in the time domain and the frequency domain is determined based on the configuration information and the first DCI, allowing the user equipment (UE) to assume that the first PDSCH and the second PDSCH in the frequency domain overlap each other in units of PRB groups (PRGs) each having the same size, and based on the UE assumption, allowing the user equipment (UE) to receive the data signal through the first PDSCH.

The user equipment (UE) may be configured to communicate with at least one of a mobile terminal, a network, and an autonomous vehicle other than a vehicle provided with the user equipment (UE).

In accordance with another aspect of the present disclosure, a base station (BS) configured to transmit a data signal in a wireless communication system may include at least one transmitter, at least one receiver, at least one processor, and at least one memory operatively connected to the at least one processor, and configured to store instructions such that the at least one processor performs specific operations by executing the instructions. The specific operations may include transmitting, to a user equipment (UE), configuration information related to dynamic bundling for a precoding resource block (PRB), transmitting, to the user equipment (UE), i) transmitting first downlink control information (DCI) for scheduling a first physical downlink shared channel (PDSCH) to the user equipment (UE), and ii) transmitting second DCI for scheduling a second PDSCH to the user equipment (UE), and transmitting the first PDSCH and the second PDSCH to the user equipment (UE). Based on the configuration information, the first DCI, and the second DCI, the first PDSCH and the second PDSCH may be configured not to overlap each other in a time domain and a frequency domain, or if the first PDSCH and the second PDSCH overlap each other in the time domain and the frequency domain, the first PDSCH and the second PDSCH in the frequency domain may be configured to overlap each other in units of precoding resource block (PRB) groups (PRGs) having the same size.

The above-described aspects of the present disclosure are only some of the preferred embodiments of the present disclosure, and various embodiments reflecting the technical features of the present disclosure may be derived and understood from the following detailed description of the present disclosure by those skilled in the art.

As is apparent from the above description, the embodiments of the present disclosure have the following effects.

In the present disclosure, when the base station (BS) transmits a plurality of PDSCHs through all or some overlapping time/frequency resources, the UEs designed to receive the plurality of PDSCHs can efficiently detect the PDSCH(s).

In a specific example, when the BS transmits the plurality of PDSCHs to a specific UE through all or some overlapping time/frequency resources, whereas the UE cannot obtain information needed to schedule at least one PDSCH from among the plurality of PDSCHs, the UE can easily detect the remaining PDSCHs.

It will be appreciated by persons skilled in the art that that the effects that can be achieved through the embodiments of the present disclosure are not limited to those described above and other advantageous effects of the present disclosure will be more clearly understood from the following detailed description. That is, unintended effects according to implementation of the present disclosure may be derived by those skilled in the art from the embodiments of the present disclosure.

BRIEF DESCRIPTION OF THE DRAWINGS

The accompanying drawings, which are included to provide a further understanding of the disclosure, provide embodiments of the present disclosure together with detail explanation. Yet, a technical characteristic of the present disclosure is not limited to a specific drawing. Characteristics disclosed in each of the drawings are combined with each other to configure a new embodiment. Reference numerals in each drawing correspond to structural elements.

FIG. 6 is a diagram illustrating an example of a Front Loaded DMRS of a first DMRS configuration type according to the present disclosure.

FIG. 9 is a diagram illustrating a method for allowing the UE to receive different PDSCHs from different TRPs according to the present disclosure.

FIG. 13 is a diagram illustrating an example of a second operation according to the present disclosure.

FIGS. 18 and 19 are diagrams illustrating examples of BS resource allocation.

DETAILED DESCRIPTION

Figure 1:
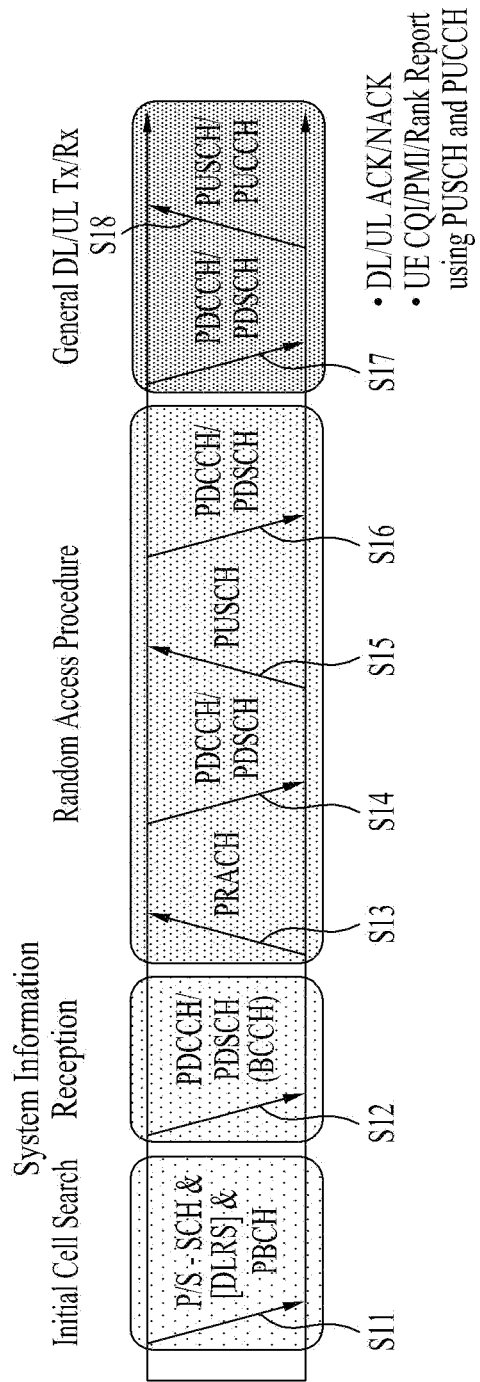
FIG. 1 is a diagram illustrating physical channels and a general signal transmission method using the physical channels.

The embodiments of the present disclosure described below are combinations of elements and features of the present disclosure in specific forms. The elements or features may be considered selective unless otherwise mentioned. Each element or feature may be practiced without being combined with other elements or features. Further, an embodiment of the present disclosure may be constructed by combining parts of the elements and/or features. Operation orders described in embodiments of the present disclosure may be rearranged. Some constructions or elements of any one embodiment may be included in another embodiment and may be replaced with corresponding constructions or features of another embodiment.

In the description of the attached drawings, a detailed description of known procedures or steps of the present disclosure will be avoided lest it should obscure the subject matter of the present disclosure. In addition, procedures or steps that could be understood to those skilled in the art will not be described either.

Throughout the specification, when a certain portion "includes" or "comprises" a certain component, this indicates that other components are not excluded and may be further included unless otherwise noted. The terms "unit", "-or/er" and "module" described in the specification indicate a unit for processing at least one function or operation, which may be implemented by hardware, software or a combination thereof. In addition, the terms "a or an", "one", "the" etc. may include a singular representation and a plural representation in the context of the present disclosure (more particularly, in the context of the following claims) unless indicated otherwise in the specification or unless context clearly indicates otherwise.

In the embodiments of the present disclosure, a description is mainly made of a data transmission and reception relationship between a base station (BS) and a user equipment (UE). A BS refers to a UE node of a network, which directly communicates with a UE. A specific operation described as being performed by the BS may be performed by an upper node of the BS.

Namely, it is apparent that, in a network comprised of a plurality of network nodes including a BS, various operations performed for communication with a UE may be performed by the BS, or network nodes other than the BS. The term 'BS' may be replaced with a fixed station, a Node B, an evolved Node B (eNode B or eNB), gNode B (gNB), an advanced base station (ABS), an access point, etc.

In the embodiments of the present disclosure, the term UE may be replaced with a UE, a mobile station (MS), a subscriber station (SS), a mobile subscriber station (MSS), a mobile UE, an advanced mobile station (AMS), etc.

A transmission end is a fixed and/or mobile node that provides a data service or a voice service and a reception end is a fixed and/or mobile node that receives a data service or a voice service. Therefore, a UE may serve as a transmission end and a BS may serve as a reception end, on an uplink (UL). Likewise, the UE may serve as a reception end and the BS may serve as a transmission end, on a downlink (DL).

The embodiments of the present disclosure may be supported by standard specifications disclosed for at least one of wireless access systems including an institute of electrical and electronics engineers (IEEE) 802.xx system, a 3rd generation partnership project (3GPP) system, a 3GPP long term evolution (LTE) system, 3GPP 5G NR system and a 3GPP2 system. In particular, the embodiments of the present disclosure may be supported by the standard specifications, 3GPP TS 38.211, 3GPP TS 38.212, 3GPP TS 38.213, 3GPP TS 38.321 and 3GPP TS 38.331. That is, the steps or parts, which are not described to clearly reveal the technical idea of the present disclosure, in the embodiments of the present disclosure may be explained by the above standard specifications. All terms used in the embodiments of the present disclosure may be explained by the standard specifications.

Reference will now be made in detail to the embodiments of the present disclosure with reference to the accompanying drawings. The detailed description, which will be given below with reference to the accompanying drawings, is intended to explain exemplary embodiments of the present disclosure, rather than to show the only embodiments that can be implemented according to the disclosure.

The following detailed description includes specific terms in order to provide a thorough understanding of the present disclosure. However, it will be apparent to those skilled in the art that the specific terms may be replaced with other terms without departing the technical spirit and scope of the present disclosure.

Hereinafter, 3GPP NR system is explained, which are examples of wireless access systems.

Technology described below may be applied to various wireless access systems such as code division multiple access (CDMA), frequency division multiple access (FDMA), time division multiple access (TDMA), orthogonal frequency division multiple access (OFDMA), and single carrier frequency division multiple access (SC-FDMA).

To clarify technical features of the present disclosure, embodiments of the present disclosure are described focusing upon a 3GPP NR system. However, the embodiments proposed in the present disclosure may be equally applied to other wireless systems (e.g., 3GPP LTE, IEEE 802.16, and IEEE 802.11).

1. NR System

1.1. Physical Channels and General Signal Transmission

In a wireless access system, a UE receives information from a base station on a DL and transmits information to the base station on a UL. The information transmitted and received between the UE and the base station includes general data information and various types of control information. There are many physical channels according to the types/usages of information transmitted and received between the base station and the UE.

FIG. 1 illustrates physical channels and a general signal transmission method using the physical channels, which may be used in embodiments of the present disclosure.

A UE performs initial cell search such as synchronization establishment with a BS in step S11 when the UE is powered on or enters a new cell. To this end, the UE may receive a primary synchronization channel (P-SCH) and a secondary synchronization channel (S-SCH) from the BS, establish synchronization with the BS, and acquire information such as a cell identity (ID).

Thereafter, the UE may receive a physical broadcast channel (PBCH) from the BS to acquire broadcast information in the cell.

Meanwhile, the UE may receive a DL reference signal (RS) in the initial cell search step to confirm a DL channel state.

Upon completion of initial cell search, the UE may receive a physical downlink control channel (PDCCH) and a physical downlink shared channel (PDSCH) according to information included in the PDCCH to acquire more detailed system information in step S12.

Next, the UE may perform a random access procedure such as steps S13 to S16 to complete access to the BS. To this end, the UE may transmit a preamble through a physical random access channel (PRACH) (S13) and receive a random access response (RAR) to the preamble through the PDCCH and the PDSCH corresponding to the PDCCH (S14). The UE may transmit a physical uplink shared channel (PUSCH). In the case of contention-based random access, a contention resolution procedure including transmission of a PRACH signal (S15) and reception of a PDCCH signal and a PDSCH signal corresponding to the PDCCH signal (S16) may be additionally performed.

The UE which has performed the above procedures may receive a PDCCH signal and/or a PDSCH signal (S17) and transmit a PUSCH signal and/or a physical uplink control channel (PUCCH) signal (S18) as a general UL/DL signal transmission procedure.

Control information that the UE transmits to the BS is referred to as uplink control information (UCI). The UCI includes a hybrid automatic repeat and request (HARQ) acknowledgement (ACK)/negative ACK (NACK) signal, a scheduling request (SR), a channel quality indicator (CQI), a precoding matrix index (PMI), a rank indicator (RI), or beam indication (BI) information.

In an NR system, the UCI is generally periodically transmitted on the PUCCH. However, according to an embodiment (if control information and traffic data should be transmitted simultaneously), the control information and traffic data may be transmitted on the PUSCH. In addition, the UCI may be transmitted aperiodically on the PUSCH, upon receipt of a request/command from a network.

1.2. Radio Frame Structure

Figure 2:
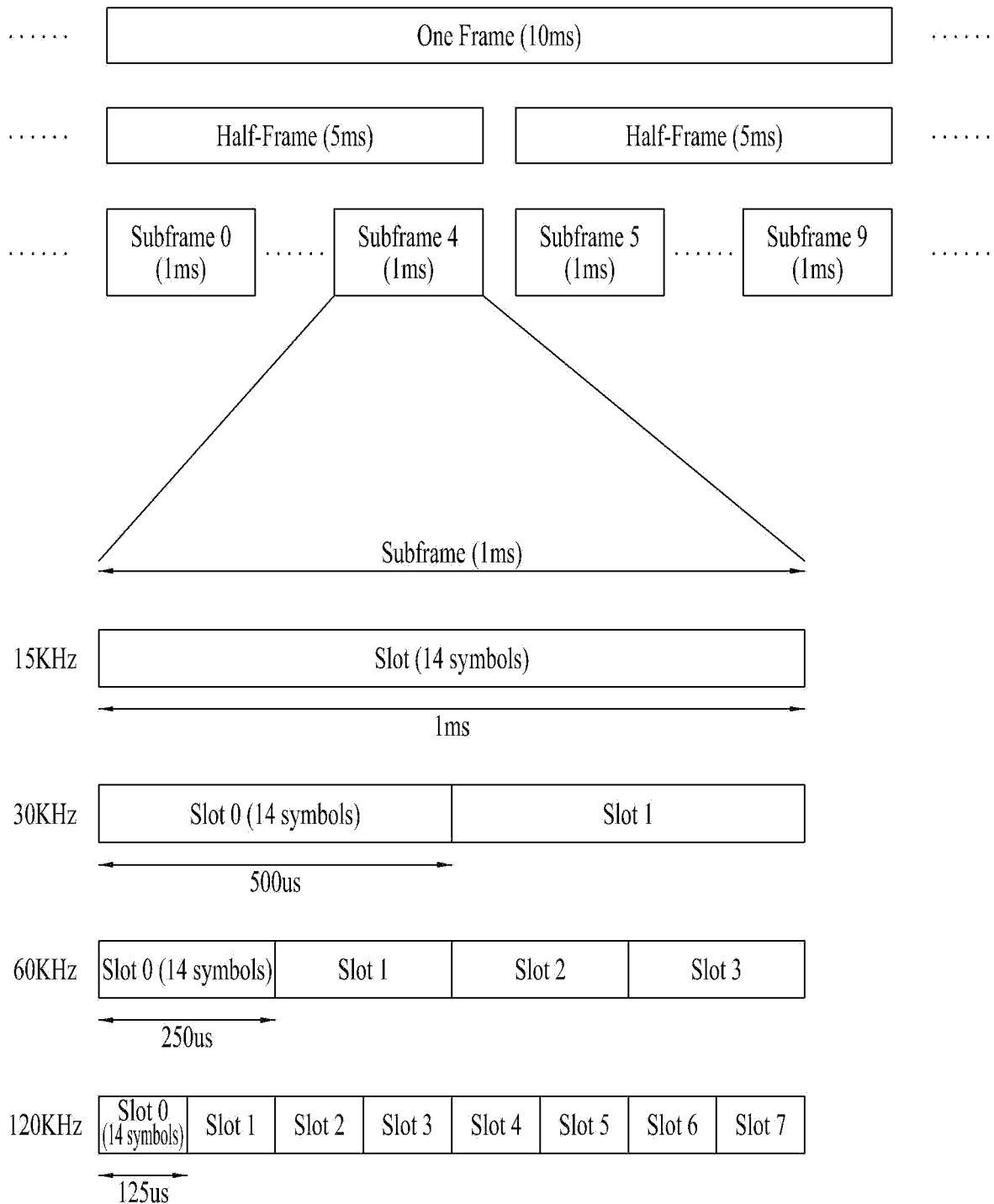
FIG. 2 is a diagram illustrating a radio frame structure in an NR system to which embodiments of the present disclosure are applicable.

FIG. 2 is a diagram illustrating a radio frame structure in an NR system to which embodiments of the present disclosure are applicable.

In the NR system, UL and DL transmissions are based on a frame as illustrated in FIG. 2. One radio frame is 10 ms in duration, defined by two 5-ms half-frames. One half-frame is defined by five 1-ms subframes. One subframe is divided into one or more slots, and the number of slots in a subframe depends on an SCS. Each slot includes 12 or 14 OFDM(A) symbols according to a CP. Each slot includes 14 symbols in a normal CP case, and 12 symbols in an extended CP case. Herein, a symbol may include an OFDM symbol (or a CP-OFDM) symbol and an SC-FDMA symbol (or a DFT-s-OFDM symbol).

Table 1 lists the number of symbols per slot, the number of slots per frame, and the number of slots per subframe in the normal CP case, and Table 2 lists the number of symbols per slot, the number of slots per frame, and the number of slots per subframe in the extended CP case.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

TABLE 2

| μ | $N_{symb}^{slot}$ | $N_{slot}^{frame,\mu}$ | $N_{slot}^{subframe,\mu}$ |
|---|---|---|---|
| 2 | 12 | 40 | 4 |

In the above tables, Nslotsymb represents the number of symbols in a slot, Nframe,μslot represents the number of slots in a frame, and Nsubframe,μslot represents the number of slots in a subframe.

In the NR system to which the present disclosure is applicable, different OFDM(A) numerologies (e.g., SCSs, CP length, and so on) may be configured for a plurality of cells aggregated for a UE. Therefore, the (absolute) duration of a time resource (e.g., an SF, slot, or TTI) (for the convenience of description, generically referred to as a time unit (TU)) including the same number of symbols may be different between the aggregated cells.

The NR system supports multiple numerologies (e.g., subcarrier spacings) to support various 5G services. For example, the NR system supports a wide area in conventional cellular bands in a subcarrier spacing of 15 kHz and supports a dense urban environment, low latency, and wide carrier BW in a subcarrier spacing of 30/60 kHz. In a subcarrier spacing of 60 kHz or above, the NR system supports a BW higher than 24.25 GHz to overcome phase noise.

An NR frequency band is defined by two types of frequency ranges, FR1 and FR2. FR1 and FR2 may be configured as described in Table 3 below. FR2 may represent millimeter wave (mmW).

TABLE 3

| Frequency Range designation | Corresponding frequency range | Subcarrier Spacing |
|---|---|---|
| FR1 | 410 MHz-7125 MHz | 15, 30, 60 kHz |
| FR2 | 24250 MHz-52600 MHz | 60, 120, 240 kHz |

Figure 3:
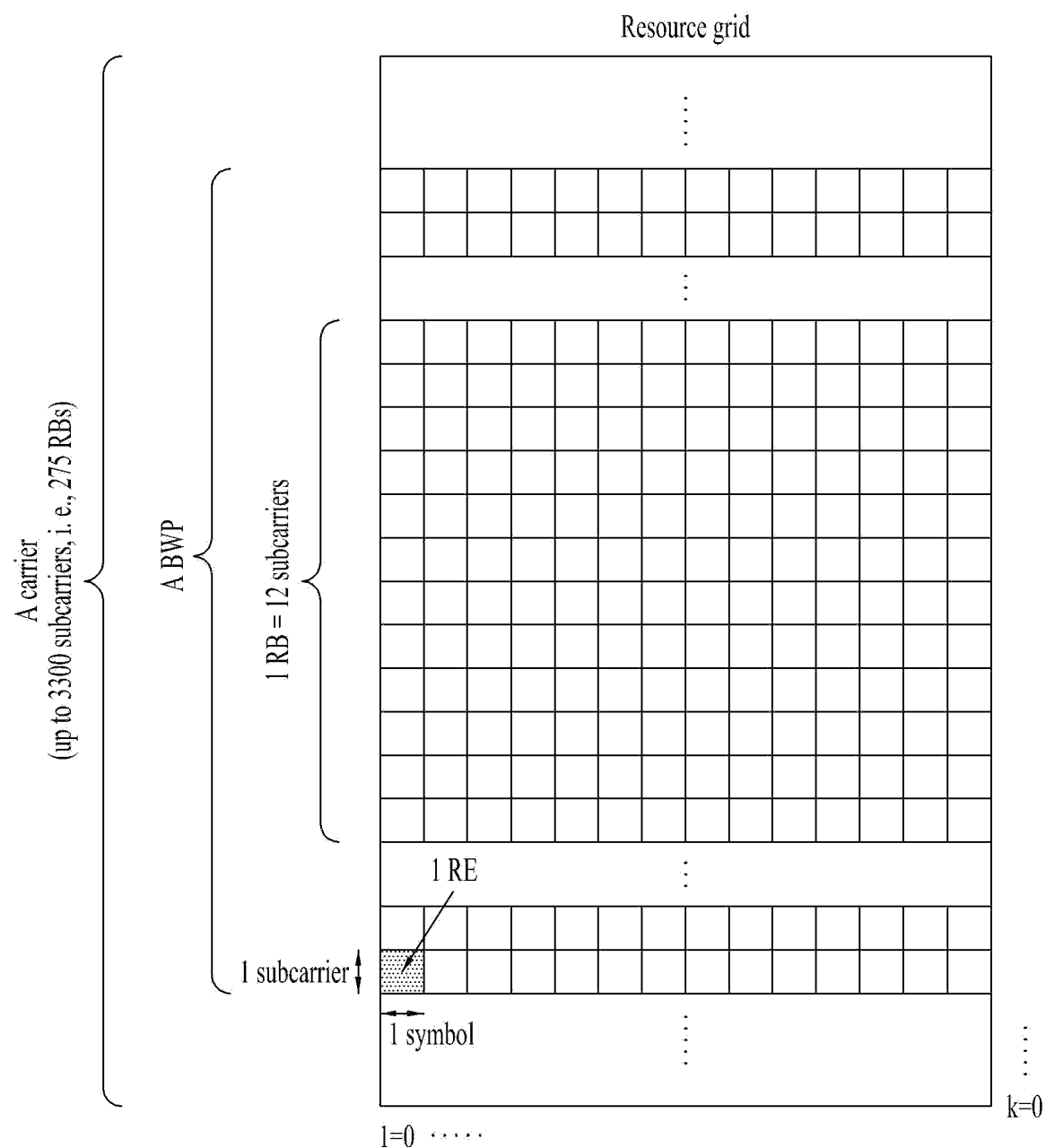
FIG. 3 is a diagram illustrating a slot structure in an NR system to which embodiments of the present disclosure are applicable.

FIG. 3 is a diagram illustrating a slot structure in an NR system to which embodiments of the present disclosure are applicable.

One slot includes a plurality of symbols in the time domain. For example, one slot includes 7 symbols in a normal CP case and 6 symbols in an extended CP case.

A carrier includes a plurality of subcarriers in the frequency domain. An RB is defined by a plurality of (e.g., 12) consecutive subcarriers in the frequency domain.

A bandwidth part (BWP), which is defined by a plurality of consecutive (P)RBs in the frequency domain, may correspond to one numerology (e.g., subcarrier spacing (SCS), CP length, and so on).

A carrier may include up to N (e.g., 5) BWPs. Data communication may be conducted in an activated BWP, and only one BWP may be activated for one UE. In a resource grid, each element is referred to as an RE, to which one complex symbol may be mapped.

Figure 4:
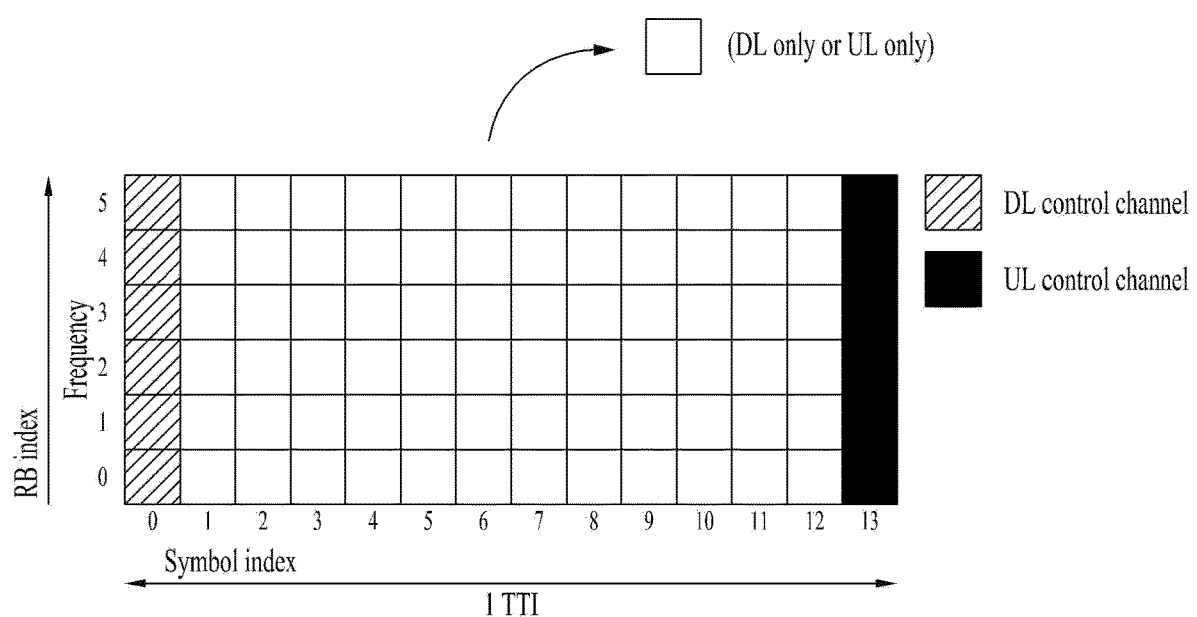
FIG. 4 is a diagram illustrating a self-contained slot structure in an NR system to which embodiments of the present disclosure are applicable

FIG. 4 is a diagram illustrating a self-contained slot structures in an NR system to which embodiments of the present disclosure are applicable.

In FIG. 4, the hatched area (e.g., symbol index=0) indicates a DL control region, and the black area (e.g., symbol index=13) indicates a UL control region. The remaining area (e.g., symbol index=1 to 12) may be used for DL or UL data transmission.

Based on this structure, a base station and a UE may sequentially perform DL transmission and UL transmission in one slot. That is, the base station and UE may transmit and receive not only DL data but also a UL ACK/NACK for the DL data in one slot. Consequently, this structure may reduce a time required until data retransmission when a data transmission error occurs, thereby minimizing the latency of a final data transmission.

In this self-contained slot structure, a predetermined length of time gap is required to allow the base station and UE to switch from transmission mode to reception mode and vice versa. To this end, in the self-contained slot structure, some OFDM symbols at the time of switching from DL to UL may be configured as a guard period (GP).

Although it has been described above that the self-contained slot structure includes both DL and UL control regions, these control regions may be selectively included in the self-contained slot structure. In other words, the self-contained slot structure according to the present disclosure may include either the DL control region or the UL control region as well as both the DL and UL control regions as illustrated in FIG. 4.

Further, the order of the regions in one slot may vary according to embodiments. For example, one slot may be configured in the order of DL control region, DL data region, UL control region, and UL data region, or UL control region, UL data region, DL control region, and DL data region.

A PDCCH may be transmitted in the DL control region, and a PDSCH may be transmitted in the DL data region. A PUCCH may be transmitted in the UL control region, and a PUSCH may be transmitted in the UL data region.

The PDCCH may deliver downlink control information (DCI), for example, DL data scheduling information, UL data scheduling information, and so on. The PUCCH may deliver uplink control information (UCI), for example, an ACK/NACK for DL data, channel state information (CSI), a scheduling request (SR), and so on.

The PDSCH conveys DL data (e.g., DL-shared channel transport block (DL-SCH TB)) and uses a modulation scheme such as quadrature phase shift keying (QPSK), 16-ary quadrature amplitude modulation (16QAM), 64QAM, or 256QAM. A TB is encoded into a codeword. The PDSCH may deliver up to two codewords. Scrambling and modulation mapping are performed on a codeword basis, and modulation symbols generated from each codeword are mapped to one or more layers (layer mapping). Each layer together with a demodulation reference signal (DMRS) is mapped to resources, generated as an OFDM symbol signal, and transmitted through a corresponding antenna port.

The PDCCH carries DCI and uses QPSK as a modulation scheme. One PDCCH includes 1, 2, 4, 8, or 16 control channel elements (CCEs) according to an aggregation level (AL). One CCE includes 6 resource element groups (REGs). One REG is defined by one OFDM symbol by one (P)RB.

Figure 5:
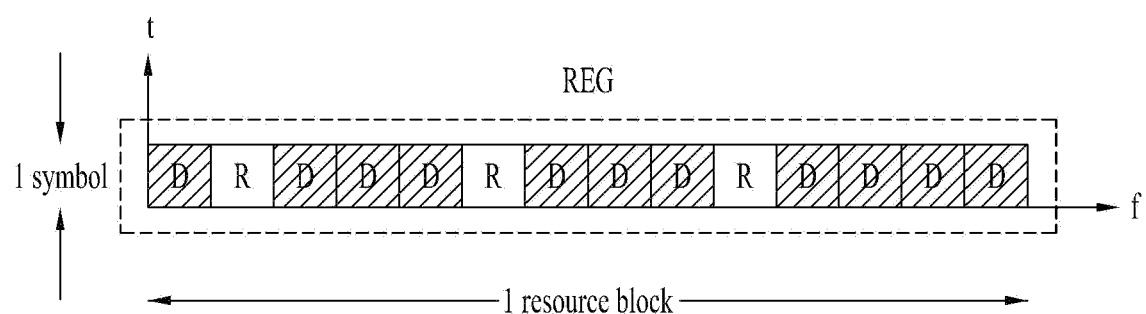
FIG. 5 is a diagram illustrating the structure of one REG in an NR system to which embodiments of the present disclosure are applicable.

FIG. 5 is a diagram illustrating the structure of one REG in an NR system to which embodiments of the present disclosure are applicable.

In FIG. 5, D represents an RE to which DCI is mapped, and R represents an RE to which a DMRS is mapped. The DMRS is mapped to REs #1, #5, and #9 along the frequency axis in one symbol.

The PDCCH is transmitted in a control resource set (CORESET). A CORESET is defined as a set of REGs having a given numerology (e.g., SCS, CP length, and so on). A plurality of CORESETs for one UE may overlap with each other in the time/frequency domain. A CORESET may be configured by system information (e.g., a master information block (MIB)) or by UE-specific higher layer (RRC) signaling. Specifically, the number of RBs and the number of symbols (up to 3 symbols) included in a CORESET may be configured by higher-layer signaling.

The PUSCH delivers UL data (e.g., UL-shared channel transport block (UL-SCH TB)) and/or UCI based on a CP-OFDM waveform or a DFT-s-OFDM waveform. When the PUSCH is transmitted in the DFT-s-OFDM waveform, the UE transmits the PUSCH by transform precoding. For example, when transform precoding is impossible (e.g., disabled), the UE may transmit the PUSCH in the CP-OFDM waveform, while when transform precoding is possible (e.g., enabled), the UE may transmit the PUSCH in the CP-OFDM or DFT-s-OFDM waveform. A PUSCH transmission may be dynamically scheduled by a UL grant in DCI, or semi-statically scheduled by higher-layer (e.g., RRC) signaling (and/or layer 1 (L1) signaling such as a PDCCH) (configured grant). The PUSCH transmission may be performed in a codebook-based or non-codebook-based manner.

The PUCCH delivers UCI, an HARQ-ACK, and/or an SR and is classified as a short PUCCH or a long PUCCH according to the transmission duration of the PUCCH. Table 4 lists exemplary PUCCH formats.

TABLE 4

| PbCCH format | Length in OFDM symbols in $N_{symb}^{PUCCH}$ | Number of bits | Usage | Etc |
|---|---|---|---|---|
| 0 | 1-2 | ≤2 | HARQ, SR | Sequence selection |
| 1 | 4-14 | ≤2 | HARQ, [SR] | Sequence modulation |
| 2 | 1-2 | >2 | HARQ, CSI, [SR] | CP-OFDM |
| 3 | 4-14 | >2 | HARQ, CSI, [SR] | DFT-s-OFDM (no UE multiplexing) |
| 4 | 4-14 | >2 | HARQ, CSI, [SR] | DFT-s-OFDM (Pre DFT OCC) |

PUCCH format 0 conveys UCI of up to 2 bits and is mapped in a sequence-based manner, for transmission. Specifically, the UE transmits specific UCI to the base station by transmitting one of a plurality of sequences on a PUCCH of PUCCH format 0. Only when the UE transmits a positive SR, the UE transmits the PUCCH of PUCCH format 0 in a PUCCH resource for a corresponding SR configuration.

PUCCH format 1 conveys UCI of up to 2 bits and modulation symbols of the UCI are spread with an OCC (which is configured differently whether frequency hopping is performed) in the time domain. The DMRS is transmitted in a symbol in which a modulation symbol is not transmitted (i.e., transmitted in time division multiplexing (TDM)).

PUCCH format 2 conveys UCI of more than 2 bits and modulation symbols of the DCI are transmitted in frequency division multiplexing (FDM) with the DMRS. The DMRS is located in symbols #1, #4, #7, and #10 of a given RB with a density of ⅓. A pseudo noise (PN) sequence is used for a DMRS sequence. For 1-symbol PUCCH format 2, frequency hopping may be activated.

PUCCH format 3 does not support UE multiplexing in the same physical resource blocks (PRBs) and conveys UCI of more than 2 bits. In other words, PUCCH resources of PUCCH format 3 do not include an OCC. Modulation symbols are transmitted in TDM with the DMRS.

PUCCH format 4 supports multiplexing of up to 4 UEs in the same PRBs and conveys UCI of more than 2 bits. In other words, PUCCH resources of PUCCH format 3 includes an OCC. Modulation symbols are transmitted in TDM with the DMRS.

1.3. DCI Format

In the NR system to which the present disclosure is applicable, the following DCI formats may be supported. First, the NR system may support DCI format 0_0 and DCI format 0_1 as a DCI format for PUSCH scheduling and support DCI format 1_0 and DCI format 1_1 as a DCI format for PDSCH scheduling. In addition, as DCI formats usable for other purposes, the NR system may additionally support DCI format 2_0, DCI format 2_1, DCI format 2_2, and DCI format 2_3.

Herein, DCI format 0_0 is used to schedule a transmission block (TB)-based (or TB-level) PUSCH. DCI format 0_1 may be used to schedule a TB-based (or TB-level) PUSCH or code block group (CBG)-based (or CBG-level) PUSCH (in the case in which CBG-based signal transmission and reception is configured).

In addition, DCI format 1_0 may be used to schedule TB-based (or TB-level) PDSCH. DCI format 1_1 may be used to schedule TB-based (or TB-level) PDSCH or CBG-based (or CBG-level) PDSCH (in the case in which CBG-based signal transmission and reception is configured).

In addition, DCI format 2_0 may be used to notify UEs of a slot format. DCI format 2_1 may be used to notify UEs of PRB(s) and OFDM symbol(s) in which a specific UE assumes that no transmission is intended therefor. DCI format 2_2 may be used to transmit transmission power control (TPC) commands for a PUCCH and a PUSCH. DCI format 2_3 may be used to transmit a group of TPC commands for SRS transmission by one or more UEs.

More specifically, DCI format 1_1 may include modulation and coding scheme (MCS)/new data indicator (NDI)/redundancy version (RV) fields for TB 1 and further include MCS/NDI/RV fields for TB 2 only when a higher layer parameter maxNrofCodeWordsScheduledByDCI in a higher layer parameter PDSCH-Config is set to n2 (i.e., 2).

In particular, when the higher layer parameter maxNrofCodeWordsScheduledByDCI is set to n2 (i.e., 2), whether a TB is substantially enabled/disabled may be determined by a combination of the MCS field and the RV field. More specifically, when the MCS field for a specific TB has a value of 26 and the RV field for the specific TB has a value of 1, the specific TB may be disabled.

Detailed features of the DCI formats may be supported by 3GPP TS 38.212. That is, obvious steps or parts which are not explained by DCI format-related features may be explained with reference to the above document. In addition, all terms disclosed in the present document may be explained by the above standard document.

1.4. Control Resource Set (CORESET)

One CORESET includes $N^{CORESET}_{RB}$ RBs in the frequency domain and $N^{CORESET}_{symb}$ symbols (having a value of 1, 2, or 3) in the time domain.

One control channel element (CCE) includes 6 resource element groups (REGs) and one REG is equal to one RB in one OFDM symbol. REGs in the CORESET are numbered in a time-first manner. Specifically, the REGs are numbered starting with '0' for the first OFDM symbol and the lowest-numbered RB in the CORESET.

A plurality of CORESETs may be configured for one UE. Each CORESET is related only to one CCE-to-REG mapping.

CCE-to-REG mapping for one CORESET may be interleaved or non-interleaved.

Configuration information for the CORESET may be configured by a higher layer parameter ControlResourceSet IE.

In addition, configuration information for CORESET 0 (e.g., common CORESET) may be configured by a higher layer parameter ControlResourceSetZero IE.

1.5. Antenna Port Quasi-Colocation

One UE may be configured with a list of up to M transmission configuration indicator (TCI) state configurations. The M TCI-state configurations may be configured by a higher layer parameter PDSCH-Config to decode a PDSCH (by the UE) according to a detected PDCCH with DCI intended for the UE and the given serving cell. Herein, M may be determined depending on the capability of the UE.

Each TCI state contains parameters for configuring a quasi-colocation (QCL) relationship between one or two DL reference signals and the DMRS ports of the PDSCH. The QCL relationship is configured by the higher layer parameter qcl-Type1 for a first DL RS and a higher layer parameter qcl-Type2 for a second DL RS (if configured). For the case of two DL RSs, the QCL types should not be the same, regardless of whether the RSs are the same DL RS or different DL RSs. The QCL type corresponding to each DL RS is given by a higher layer parameter qcl-Type within a higher layer parameter QCL-Info and may have one of the following values.

'QCL-TypeA': {Doppler shift, Doppler spread, average delay, delay spread}
'QCL-TypeB': {Doppler shift, Doppler spread}
'QCL-TypeC': {Doppler shift, average delay}
'QCL-TypeD': {Spatial Rx parameter}

The UE receives an activation command used to map up to 8 TCI states to codepoints of a TCI field in the DCI. When a HARQ-ACK signal corresponding to the PDSCH carrying the activation command is transmitted in slot #n, mapping between the TCI states and codepoints of the TCI field in the DCI may be applied starting from slot $\#(n+3*N^{subframe,\mu}_{slot}+1)$. In this case, $N^{subframe,\mu}_{slot}$ is determined based on Table 1 or Table 2 described above. After the UE receives initial higher layer configuration of TCI states and before the UE receives the activation command, the UE assumes that DMRS port(s) of a PDSCH of a serving cell are quasi-colocated (QCLed) with an SS/PBCH block determined in the initial access procedure with respect to 'QCL-TypeA'. Additionally, the UE may assume that the DMRS port(s) of the PDSCH of the serving cell are QCLed with the SS/PBCH block determined in the initial access procedure also with respect to 'QCL-TypeD' at the above timing.

If a higher layer parameter tci-PresentInDCI is set to 'enabled' for a CORESET scheduling the PDSCH, the UE assumes that the TCI field is present in a PDCCH of DCI format 1_1 transmitted on the CORESET. If the higher layer parameter tci-PresentInDCI is not configured for the CORESET scheduling the PDSCH or the PDSCH is scheduled by DCI format 1_0 and if a time offset between reception of the DL DCI and reception of the corresponding PDSCH is equal to or greater than a threshold Threshold-Sched-Offset (where the threshold is based on UE capability), for determining PDSCH antenna port QCL, the UE assumes that a TCI state or QCL assumption for the PDSCH is identical to a TCI state or QCL assumption applied to a CORESET used for PDCCH transmission.

If the higher layer parameter tci-PresentInDCI is set to 'enabled', the TCI field in the DCI scheduling a component carrier (CC) points to activated TCI states in the scheduled CC or a DL BW, and the PDSCH is scheduled by DCI format 1_1, the UE uses a TCI-state according to the TCI field in the DCI in a detected PDCCH to determine PDSCH antenna port QCL. The UE may assume that DMRS ports of the PDSCH of a serving cell are QCLed with RS(s) in the TCI state with respect to QCL type parameter(s) given by an indicated TCI state if the time offset between reception of the DL DCI and reception of the corresponding PDSCH is equal to or greater than the threshold Threshold-Sched-Offset (where the threshold is determined based on reported UE capability). When the UE is configured with a single slot PDSCH, the indicated TCI state should be based on the activated TCI states in a slot with the scheduled PDSCH. When the UE is configured with CORESET associated with a search space set for cross-carrier scheduling, the UE expects that the higher layer parameter tci-PresentInDcI is set to 'enabled' for the CORESET. If one or more of the TCI states configured for the serving cell scheduled by the search space set contains 'QCL-TypeD', the UE expects that the time offset between reception of the detected PDCCH in the search space set and reception of the corresponding PDSCH is greater than or equal to the threshold timeDurationForQCL.

For both the case in which a higher layer parameter tci-PresentInDCI is set to 'enabled' and the case in which the higher layer parameter tci-PresentInDCI is not configured in RRC connected mode, if the offset between reception of the DL DCI and reception of the corresponding PDSCH is less than the threshold Threshold-Sched-Offset, the UE makes the following assumptions. (i) DMRS ports of a PDSCH of a serving cell are QCLed with the RS(s) in a TCI state with respect to QCL parameter(s). (ii) In this case, the QCL parameter(s) are used for PDCCH QCL indication of the CORESET associated with a monitored search space with the lowest CORESET-ID in the latest slot in which one or more CORESETs within an active BWP of the serving cell are monitored by the UE.

In this case, if the 'QCL-TypeD' of a PDSCH DMRS is different from 'QCL-TypeD' of a PDCCH DMRS with which overlapping occurs in at least one symbol, the UE is expected to prioritize reception of the ePDCCH associated with the corresponding CORESET. This operation may also be applied to an intra-band carrier aggregation case (when the PDSCH and the CORESET are in different CCs). If none of configured TCI states contains 'QCL-TypeD', the UE obtains the other QCL assumptions from the indicated TCI states for a scheduled PDSCH irrespective of the time offset between reception of the DL DCI and reception of the corresponding PDSCH.

For a periodic CSI-RS resource in an NZP-CSI-RS-ResourceSet configured with a higher layer parameter trs-Info, the UE should assume that that a TCI state indicates one of the following QCL type(s):

'QCL-TypeC' with an SS/PBCH block and, when (QCL-TypeD) is applicable, 'QCL-TypeD' with the same SS/PBCH block, or 'QCL-TypeC' with an SS/PBCH block and, when (QCL-TypeD) is applicable, 'QCL-TypeD' with a periodic CSI-RS resource in a higher layer parameter NZPCSI-RS-ResourceSet configured with a higher layer parameter repetition.

For a CSI-RS resource in the higher layer parameter NZP-CSI-RS-ResourceSet configured with the higher layer parameter trs-Info and without the higher layer parameter repetition, the UE should assume that a TCI state indicates one of the following QCL type(s):

'QCL-TypeA' with a CSI-RS resource in the higher layer parameter NZP-CSI-RS-ResourceSet configured with a higher layer parameter trs-Info and, when (QCL-TypeD) is applicable, 'QCL-TypeD' with the same CSI-RS resource, or 'QCL-TypeA' with a CSI-RS resource in the higher layer parameter NZP-CSI-RS-ResourceSet configured with a higher layer parameter trs-Info and, when (QCL-TypeD) is applicable, 'QCL-TypeD' with an SS/PBCH, or 'QCL-TypeA' with a CSI-RS resource in the higher layer parameter NZP-CSI-RS-ResourceSet configured with the higher layer parameter trs-Info and, when (QCL-TyepD) is applicable, 'QCL-TypeD' with a periodic CSI-RS resource in the higher layer parameter NZP-CSI-RS-ResourceSet configured with the higher layer parameter repetition, or 'QCL-TypeB' with a CSI-RS resource in the higher layer parameter NZP-CSI-RS-ResourceSet configured with the higher layer parameter trs-Info when 'QCL-TypeD' is not applicable.

For a CSI-RS resource in the higher layer parameter NZP-CSI-RS-ResourceSet configured with the higher layer parameter repetition, the UE should assume that a TCI state indicates one of the following QCL type(s):

'QCL-TypeA' with a CSI-RS resource in the higher layer parameter NZP-CSI-RS-ResourceSet configured with the higher layer parameter trs-Info and, when ('QCL-TypeD) is applicable, 'QCL-TypeD' with the same CSI-RS resource, or 'QCL-TypeA' with a CSI-RS resource in the higher layer parameter NZP-CSI-RS-ResourceSet configured with the higher layer parameter trs-Info and, when ('QCL-TypeD' is) applicable, 'QCL-TypeD' with a CSI-RS resource in the higher layer parameter NZP-CSI-RS-ResourceSet configured with higher layer parameter repetition, or 'QCL-TypeC' with an SS/PBCH block and, when (QCL-TypeD) is applicable, 'QCL-TypeD' with the same SS/PBCH block.

For the DMRS of PDCCH, the UE should assume that a TCI state indicates one of the following QCL type(s):

'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or 'QCL-TypeA' with a CSI-RS resource in the higher layer parameter NZP-CSI-RS-ResourceSet configured with a higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or 'QCL-TypeA' with a CSI-RS resource in the higher layer parameter NZP-CSI-RS-ResourceSet configured without the higher layer parameter trs-Info and without the higher layer parameter repetition and, when (QCL-TypeD) is applicable, 'QCL-TypeD' with the same CSI-RS resource.

For the DMRS of the PDSCH, the UE should assume that a TCI state indicates one of the following QCL type(s):

'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with the same CSI-RS resource, or 'QCL-TypeA' with a CSI-RS resource in the higher layer parameter NZP-CSI-RS-ResourceSet configured with the higher layer parameter trs-Info and, when (QCL-TypeD) is applicable, 'QCL-TypeD' with a CSI-RS resource in the higher layer parameter NZP-CSI-RS-ResourceSet configured with the higher layer parameter repetition, or QCL-TypeA' with a CSI-RS resource in the higher layer parameter NZP-CSI-RS-ResourceSet configured without the higher layer parameter trs-Info and without the higher layer parameter repetition and, when (QCL-TypeD) is applicable,'QCL-TypeD' with the same CSI-RS resource.

In the present disclosure, QCL signaling may include all kinds of signaling configurations shown in the following table 5.

TABLE 5

| QCL linkage for FR2 after RRC | signalling |
|---|---|
| SSE → TRS w.r.t average delay, Doppler shift, spatal RX parameters | QCL type: C + D |
| TRS → CSI-RS for BM w.r.t average delay, Doppler shift, delay spread, Doppler spread estimation | QCL type: A + D |
| TRS → CS-RS for CSI w.r.t average delay, Doppler shift, delay spread, Doppler spread estimation | QCL type: A |
| TRS → DMRS for PDCCH w.r.t average delay, Doppler shift, delay spread, spread, Doppler spread estimation | QCL type: A + D |
| TRS → DMRS for PDSCH w.r.t average delay, Doppler shift, delay spread, spread, Doppler spread estimation | QCL type: A + D |
| SSB → CSI-RS for BM w.r.t average delay, Doppler shift, spatial RX parameters | QCL type: C + D |
| SSB → CSI-RS for CSI w.r.t, spatial RX parameters | QCL type: D |
| SSB → DMRS for PDCCH (before TRS is configured) .w.r.t. average delay, Doppler shift, delay spread, Doppler spread, spatial RX parameters | QCL type: A + D |
| SSB → DMRS for PDSCH before TRS is configured) w.r.t. average delay, Doppler shift, delay spread; Doppler spread, spatial RX parameters | QCL type: A+ D |
| CSI-RS for BM → DMRS for PDCCH w.r.t. spatial RX parameters | QCL type: D |
| CSI-RS for BM → DMRS for PDSCH w.r.t. spatial RX parameters | QCL type: D |
| CSI-RS for CSI → DMRS for PDSCH w.r.t. average delay; Doppler shift delay spread, Doppler spread, spatial RX parameters; Note: QCL parameters may not be derived directly from CSI-RS for CSI | QCL type: A + D |
| CSI-RS for BM → CSI-RS for TRS/SM/CSI w.r.t. spatial RX parameters | QCL type: D |

In the following tables, when there are one or more rows including the same RS type, it can be assumed that the same RS ID is applied to the rows.

For example, if CSI-RS resources configured by both a higher layer parameter 'trs-Info' and a higher layer parameter 'NZP-CSI-RS-ResourceSet' are present, the UE may expect only the following two available configurations of the higher layer parameter 'TCI-State'.

TABLE 6

| Valid TCI state Configuration | DL RS 1 | qcl-Type1 | DL RS 2 (if configured) | qcl-Type2 (if configured) |
|---|---|---|---|---|
| 1* | SS/PBCH Block | QCL-TypeC | SS/PBCH Block | QCL-TypeD |
| 2* | SS/PBCH Block | QCL-TypeC | CSI-RS (BM) | QCL-TypeD |

In Table 6, '*' may denote that, if QCL type-D is applicable, DL RS 2 and QCL type-2 can be configured for the above-mentioned UE.

In another example, if there are CSI-RS resources that can be configured by a higher layer parameter 'NZP-CSI-RS-ResourceSet' without using the higher layer parameters 'trs-Info' and 'repetition', the UE may expect only the following three available configurations related to the higher layer parameter 'TCI-State'.

TABLE 7

| Valid TCI state Configuration | DL RS 1 | qcl-Type1 | DL RS 2 (if configured) | qcl-Type2 (if configured) |
|---|---|---|---|---|
| 1** | TRS | QCL-TypeA | TRS | QCL-TypeD |
| 2** | TRS | QCL-TypeA | SS/PBCH Block | QCL-TypeD |
| 3** | TRS | QCL-TypeA | CSI-RS (BM) | QCL-TypeD |
| 4** | TRS | QCL-TypeB | | |

In Table 7, '*' may denote that QCL type-D is not applicable.

In Table 7, '**' may denote that, when QCL type-D is applicable, DL RS 2 and QCL type-2 can be configured for the UE.

In another example, if there are CSI-RS resources that can be configured by the higher layer parameter 'repetition' and the other higher layer parameter 'NZP-CSI-RS-Resource-Set', the UE may expect only the following three available configurations of the higher layer parameter 'TCI-State'.

TABLE 8

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | SS/PBCH Block | QCL-TypeA | SS/PBCH Block | QCL-TypeD |

In the following two tables, when QCL type-D is considered available, DL RS 2 and QCL type-2 may be configured for the UE in the remaining tables other than a default case (i.e., a fourth row of the following two tables). If a TRS for downlink (DL) is used for QCL type-D, TRS may have a reference signal (e.g., SSB or CSI-RS) for beam management (BM) as a source reference signal for QCL type-D.

For a DMRS of PDCCH, the UE can expect only the following three configurations related to the higher layer parameter 'TCI-State' for a predetermined period of time in which the fourth configuration (i.e., the fourth row of the following two tables) formed prior to TRS configuration is valid as a default configuration.

TABLE 9

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 9, '*' may denote a configuration available before TRS is configured. Accordingly, the corresponding configuration does not indicate a TCI state, but can be interpreted as a valid QCL assumption.

In Table 9, '**' may denote that QCL parameters are not directly derived from CSI-RS (or CSI).

For a DMRS of PDCCH, the UE can expect only the following three configurations related to the higher layer parameter 'TCI-State' for a predetermined period of time in which the fourth configuration (i.e., the fourth row of the following two tables) formed prior to TRS configuration is valid as a default.

TABLE 10

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 10, '*' may denote a configuration that can be available prior to TRS configuration. Accordingly, the corresponding configuration does not indicate the TCI state, but can be interpreted as a valid QCL assumption.

In Table 10, '**' may denote that QCL parameters are not directly derived from CSI-RS (or CSI).

For a DMRS of PDCCH, the UE can expect only the following three configurations related to the higher layer parameter 'TCI-State' for a predetermined period of time in which the fourth configuration (i.e., the fourth row of the following two tables) formed prior to TRS configuration is valid as a default.

TABLE 11

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3** | CSI-RS (CSI) | QCL-TypeA | CSI-RS (CSI) | QCL-TypeD |
| 4* | SS/PBCH Block* | QCL-TypeA | SS/PBCH Block* | QCL-TypeD |

In Table 11, '*' may denote a configuration that can be available prior to TRS configuration. Accordingly, the corresponding configuration may also be interpreted as a more efficient QCL assumption rather than the TCI state.

In Table 11, '**' may denote that QCL parameters are not directly derived from CSI-RS (or CSI).

1.6. DMRS (Demodulation Reference Signal)

In the NR system according to the present disclosure, DMRS can be transmitted and received as a front load structure. Alternatively, an additional DMRS other than the front loaded DMRS can be transmitted and received.

The front loaded DMRS can support high-speed decoding (i.e., fast decoding). A first OFDM symbol where the front loaded DMRS is loaded may be determined to be a third OFDM symbol (e.g., l=2) or a fourth OFDM symbol (e.g., l=3). The first OFDM symbol location may be indicated by a physical broadcast channel (PBCH).

The number of OFDM symbols occupied by the front loaded DMRS may be indicated by a combination of DCI (Downlink Control Information) and RRC (Radio Resource Control) signaling.

The additional DMRS may be configured for a high-speed UE. The additional DMRS may be located at the middle/last symbol(s) of the slot. If only one front loaded DMRS symbol is configured, the additional DMRS can be allocated to zero to three OFDM symbols. If two front loaded DMRS symbols are configured, the additional DMRS can be allocated to zero to two OFDM symbols.

The front loaded DMRS can be configured in two types, and only one of the two types can be instructed through higher layer signaling (e.g., RRC signaling).

Two DMRS configuration types can be applied to the present disclosure. One DMRS configuration type from among the two DMRS configuration types, substantially configured for the UE may be instructed by higher layer signaling (e.g., RRC).

The first DMRS configuration type (DMRS configuration type 1) can be classified as follows according to the number of OFDM symbols to which the front loaded DMRS is allocated.

The number of OFDM symbols to which DMRS configuration type 1 and the front loaded DMRS are allocated=1

Up to four ports (e.g., P0~P3) may be multiplexed based on the Length-2 F-CDM (Frequency-Code Division Multiplexing) and FDM (Frequency Division Multiplexing) method. RS density may be set to 6 REs for each port in a resource block (RB)

The number of OFDM symbols to which DMRS configuration type 1 and the front loaded DMRS are allocated=2

Up to 8 ports (e.g., P0~P7) may be multiplexed based on the length-2 F-CDM method and the length-2 T-CDM (Time-Code Division Multiplexing) and FDM method. Here, when the presence of a PT_RS is configured by higher layer signaling, T-CDM may be fixed to [1 1]. RS density may be set to 12 REs for each port in the RB.

The second DMRS configuration type (DMRS configuration type 2) can be classified as follows according to the number of OFDM symbols to which the front loaded DMRS is allocated.

The number of OFDM symbols to which DMRS configuration type 2 and the front loaded DMRS are allocated=1

Up to six ports (e.g., P0~P5) may be multiplexed based on the Length-2 F-CDM (Frequency-Code Division Multiplexing) and FDM (Frequency Division Multiplexing) method. The RS density may be set to 4 REs for each port in the RB.

The number of OFDM symbols to which DMRS configuration type 2 and the front loaded DMRS are allocated=2

Up to 12 ports (e.g., P0~P11) may be multiplexed based on the length-2 F-CDM method and the length-2 T-CDM (Time-Code Division Multiplexing) and FDM method. Here, when the presence of PT_RS is configured by higher layer signaling, T-CDM may be fixed to [1 1]. RS density may be set to 8 REs for each port in the RB.

FIG. 6 is a diagram illustrating an example of the Front Loaded DMRS of the first DMRS configuration type (DMRS configuration Type 1) according to the present disclosure.

In more detail, FIG. 6(a) illustrates the front loaded DMRS with one symbol, and FIG. 6(b) illustrates the front loaded DMRS with two symbols.

In FIG. 6, 'Δ' may denote the DMRS offset value in a frequency domain. In this case, DMRS ports having the same value 'Δ' may be CDM-F (code division multiplexing in frequency domain) processed, or may be CDM-T (code division multiplexing in time domain) processed. In addition, DMRS ports having different values 'Δ' may be CDM-F processed.

In the present disclosure, CDM-F may be applied based on the parameter $w_f(k')$ shown in the following table, and CDM-T may be applied based on the parameter $w_t(l')$ shown in the following table. In this case, k' and l' may be parameter values for determining the subcarrier index to which the corresponding DMRS is mapped, and may be set to '0' or '1'. In this case, DMRS corresponding to each DMRS port according to the DMRS configuration types may be classified into the following CDM groups as shown in the following table.

Table 12 shows parameters for the first DMRS configuration type (DMRS configuration type 1) for PDSCH, and Table 13 shows parameters for the second DMRS configuration type (DMRS configuration type 2) for PDSCH.

TABLE 12

| p | CDM group λ | Δ | $w_f(k')$ k' = 0 | k' = 1 | $w_t(l')$ l' = 0 | l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 13

| p | CDM group λ | Δ | $w_f(k')$ k' = 0 | k' = 1 | $w_t(l')$ l' = 0 | l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

The UE may obtain DMRS port configuration information that is configured by the BS through DCI. For example, not only based on DMRS configuration type (e.g., DMRS configuration type 1 (dmrs-Type=1), and DMRS configuration type 2 (dmrs-Type=2)) configured for the UE, but also based on a maximum number of OFDM symbols (e.g., maxLength=1 or maxLength=2) for 'DL front loaded DMRSfmf', the UE can obtain DMRS port configuration information through a field of the antenna ports corresponding to DCI format 1_1. In more detail, Table 14 shows DMRS port configuration information based on the value of the antenna port field in a situation where 'dmrs-Type=1 and maxLength=1' are configured for the UE, and Table 15 shows DMRS port configuration information based on the value of the antenna port field in a situation where 'dmrs-Type=1 and maxLength=2' are configured for the UE. Table 16 shows DMRS port configuration information based on the value of the antenna port field in a situation where 'dmrs-Type=2 and maxLength=1' are configured for the UE, and Table 17 shows DMRS port configuration information based on the value of the antenna port field in a situation where 'dmrs-Type=2 and maxLength=2' are configured for the UE.

TABLE 14

| | One Codeword: Codeword 0 enabled, Codeword 1 disabled | |
|---|---|---|
| Value | Number of DMRS CDM group(s) without data | DMRS port(s) |
| 0 | 1 | 0 |
| 1 | 1 | 1 |
| 2 | 1 | 0,1 |
| 3 | 2 | 0 |
| 4 | 2 | 1 |
| 5 | 2 | 2 |
| 6 | 2 | 3 |
| 7 | 2 | 0,1 |
| 8 | 2 | 2,3 |
| 9 | 2 | 0-2 |
| 10 | 2 | 0-3 |
| 11 | 2 | 0,2 |
| 12-15 | Reserved | Reserved |

TABLE 15

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 6, | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 16

| | One Codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0,1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0,1 | | | |
| 8 | 2 | 2,3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0,1 | | | |
| 18 | 3 | 2,3 | | | |
| 19 | 3 | 4,5 | | | |
| 20 | 3 | 0-2 | | | |
| 21 | 3 | 3-5 | | | |
| 22 | 3 | 0-3 | | | |

TABLE 16-continued

| | One Codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 23 | 2 | 0.2 | | | |
| 24-31 | Reserved | Reserved | | | |

TABLE 17

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |

TABLE 17-continued

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-83 | Reserved | Reserved | Reserved | | | | |

In this case, the UE may perform DMRS reception as follows according to various conditions.

For DMRS configuration type 1,
if one codeword may be scheduled for the UE, and DCI for indicating any one of {2, 9, 10, 11, 30} as an index value (e.g., index values shown in Table 14 or Table 15) related to the antenna port mapping may be allocated to the UE, or
if two codewords are scheduled for the UE,
the UE may receive the DMRS on the assumption that all remaining orthogonal antenna ports are not associated with PDSCH transmission for other UEs.

For DMRS configuration type 2,
if one codeword may be scheduled for the UE, and DCI for indicating any one of {2, 10, 23} as an index value (e.g., index values shown in Table 15 or Table 16) related to the antenna port mapping may be allocated to the UE, or
if two codewords are scheduled for the UE,
the UE may receive the DMRS on the assumption that all remaining orthogonal antenna ports are not associated with PDSCH transmission for other UEs.

1.7. Codeword

In the present disclosure, the BS may determine a maximum number of codewords (to be scheduled for the UE through only one DCI) through higher layer signaling, and may thus configure the determined maximum number of codewords in the UE through higher layer signaling. For example, the BS may determine the maximum number of codewords to be scheduled for the UE through only one DCI based on a higher layer parameter 'maxNrofCodeWordsScheduledByDCI' (this parameter is set to n1 or n2) to be 1 or 2. In this case, the higher layer parameter 'maxNrofCodeWordsScheduledByDCI' may be included in a higher layer parameter 'PDSCH-Config'.

Referring to Rel-15 TS 38.212 standard documents, DCI format 1_1 may be constructed as shown in the following table 18 according to the higher layer parameter 'maxNrofCodeWordsScheduledByDCI'.

TABLE 18

For transport block 1:
    Modulation and coding scheme - 5 bits
    New data indicator - 1 bit
    Redundancy version - 2 bits
For transport block 2 (only present if maxNrofCodeWordsScheduledByDCI equals 2):
    Modulation and coding scheme - 5 bits
    New data indicator - 1 bit
    Redundancy version - 2 bits Additionally, (i) if a bandwidth part indicator field indicates a bandwidth part rather than an active bandwidth part, (ii) if the value of the higher layer parameter 'maxNrofCodeWordsScheduledByDCI' for the above-mentioned indicated bandwidth part, and (iii) if the value of the higher layer parameter 'maxNrofCodeWordsScheduledByDCI' for the active bandwidth part is set to 1, the UE may assume that the corresponding fields are padded with zero in the process of interpreting the MCS, NDI, and RV fields of Transport Block 2. Subsequently, in the above-mentioned case, the UE may ignore the MCS, NDI, and RV fields of Transport Block 2 for the above-mentioned indicated bandwidth part.

In addition, when the higher layer parameter 'maxNrofCodeWordsScheduledByDCI' indicates that transmission of two codewords is enabled, one TB (or codeword) from among two TBs (or two codewords) may be enabled or disabled based on the following methods.

In more detail, if the higher layer parameter 'maxN-rofCodeWordsScheduledByDCI' indicates that transmission of two codewords is enabled, one TB from among two TBs may be disabled either in the case (i) where the MCS value for the corresponding TB included in DCI format 1_1 is set to 26 (i.e., =26) and in the case (ii) where the RV value is set to 1 (i.e., $rv_{id}=1$). If two TBs are enabled, a first transport block (TB 1) and a second transport block (TB 2) may be mapped to Codeword 1 and Codeword 2, respectively. If only one TB from among two TBs is enabled, the enabled TB may always be mapped to the first codeword (i.e., Codeword 0).

1.8. Time/Frequency Resource Allocation Cases applicable to the Present Disclosure In the present disclosure, time/frequency (T/F) resources for each PDSCH (e.g., PDSCH #0 and PDSCH #1) transmitted from different TRPs (Transmission and Reception Point) (or different beams or panels) may overlap each other in various ways. In this case, the case in which T/F resources overlap each other may include all five cases shown in FIG. 7.

Figure 7:
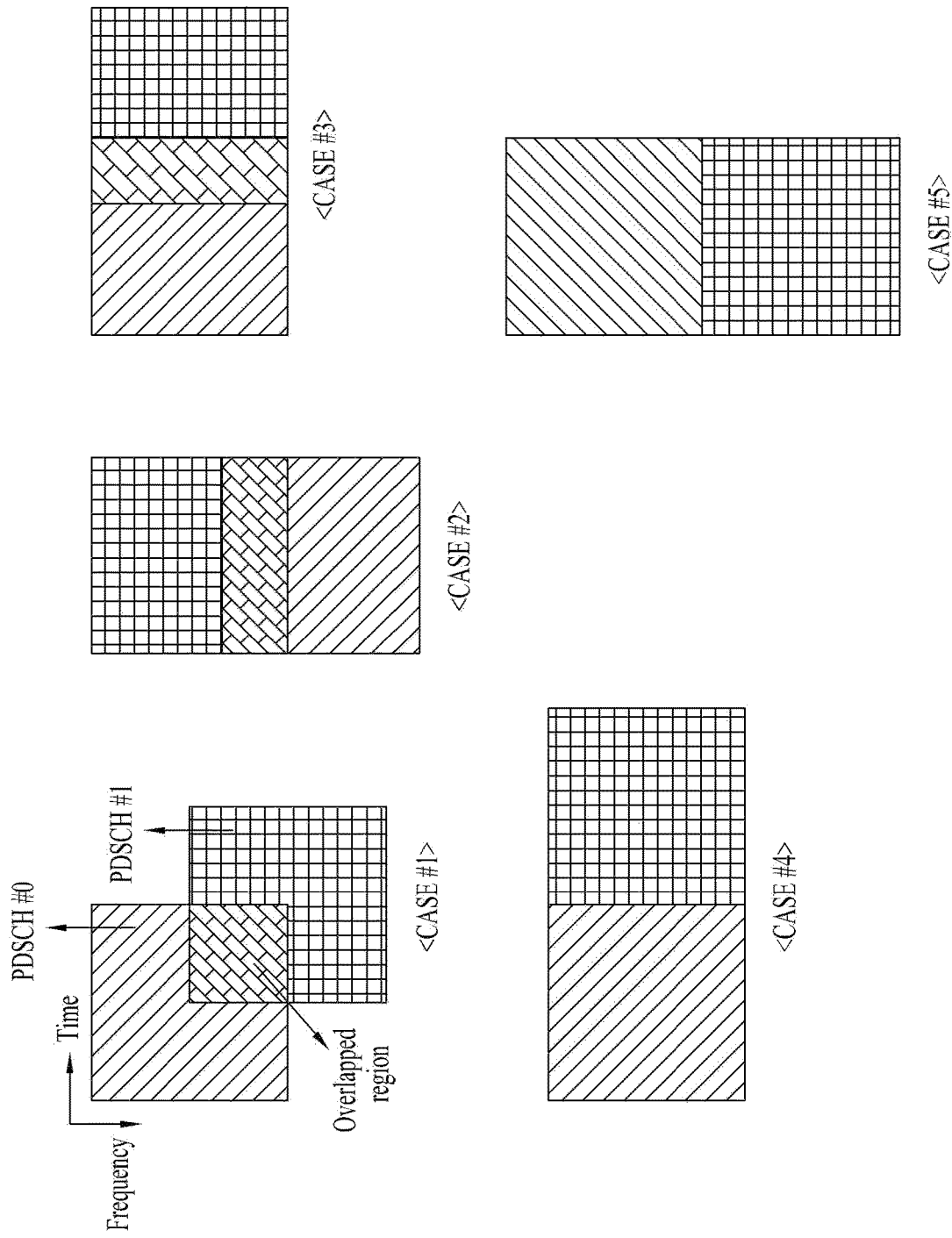
FIG. 7 is a diagram illustrating an example of a case in which time and/or frequency resources of two PDSCHs applicable to the present disclosure overlap each other.

FIG. 7 is a diagram illustrating an example of the case in which time and/or frequency (T/F) resources of two PDSCHs applicable to the present disclosure overlap each other.

Referring to FIG. 7, two PDSCHs may partially overlap each other (e.g., Case #1 to Case #3) or may overlap with only one of the time domain and the frequency domain of two PDSCHs (e.g., Case #4 and Case #5). In Case #1, Case #2, and Case #3 shown in FIG. 7, two PDSCHs may (partially) overlap each other in both of the time domain and the frequency domain. In Case #4 of FIG. 7, this means that two PDSCHs do not overlap each other only in the time domain. In Case #5 of FIG. 7, this means that two PDSCHs overlap each other in the time domain, and do not overlap each other in the frequency domain. In Case #5 of FIG. 7, two PDSCHs overlap in the time axis but do not overlap in the frequency domain.

1.9. Single PDCCH System

Figure 8:
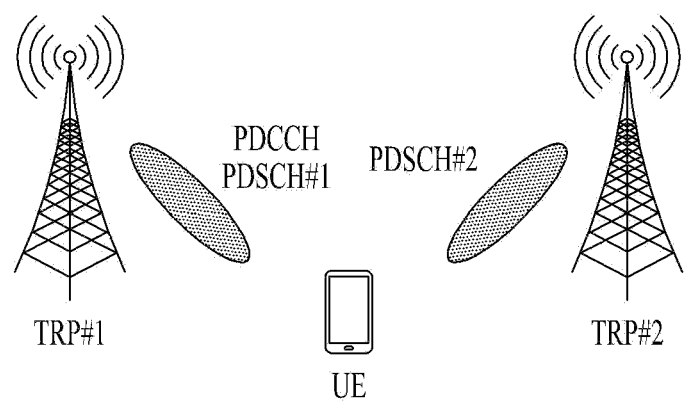
FIG. 8 is a diagram illustrating a single PDCCH system operation applicable to the present disclosure.

FIG. 8 is a diagram illustrating a single PDCCH system operation applicable to the present disclosure.

In FIG. 8, it is assumed that one TRP (TRP #1) transmits PDSCH #1 to one UE and the other TRP (TRP #2) transmits PDSCH #2 to one UE. In the following description, as shown in FIG. 8, the operation in which multiple PDSCHs are scheduled by one PDCCH may be referred to as one PDCCH system or one PDCCH operation. In other words, one PDCCH may denote a PDCCH for scheduling the plurality of PDSCHs (for different TRPs).

For convenience of description, although the following description illustrates two TRPs as an example of the plurality of TRPs, it should be noted that the corresponding operation according to the embodiment can also be equally applied to examples of at least three TRPs. In other words, in the present disclosure, the single PDCCH may include a PDCCH for scheduling a PDSCH for at least three TRPs.

According to the single PDCCH system, although the UE receives PDSCHs from different TRPs, the UE can obtain scheduling information of the plurality of PDSCHs by receiving one PDCCH, such that the PDCCH reception complexity of the UE may decrease.

In contrast, according to a multi-PDCCH system or a multi-PDCCH operation in which two TRPs respectively transmit PDCCHs and one PDCCH schedules PDSCH #1 and the other PDCCH schedules PDSCH #2, the UE should succeed in receiving two PDCCHs, such that the UE can receive the above-mentioned two PDCCHs. In contrast, the PDCCH system or the single PDCCH operation may enable the UE to receive two PDSCHs after the UE has successfully received only one PDCCH, so that performance degradation caused by PDCCH non-detection (or PDCCH missdetection) can be minimized.

In FIG. 8, PDCCH for scheduling PDSCH #1 and PDSCH #2 may be transferred from TRP #1 and/or TRP #2 to the UE.

1.10. Non-Coherent Joint Transmission (NC-JT)

In the present disclosure, in the situation where time resources of PDSCHs that are respectively transmitted from different TRPs (or beams) (partially) overlap each other (e.g., CASE #5 of FIG. 5) or in the situation where time/frequency resources (partially) overlap each other (e.g., CASE #1, CASE #2, and CASE #3 of FIG. 7), signals can be transmitted based on the above-mentioned situations, so that such signal transmission method will hereinafter be referred to as NC-JT for convenience of description.

In the present disclosure, 'Single DCI based NC-JT' may denote the NC-JT operation implemented when PDSCHs respectively transferred from different TRPs (or beams) are scheduled by only one DCI. For example, the single DCI based NC-JT may include the NC-JT operation implemented when PDSCH #1 and PDSCH #2 are simultaneously scheduled by DCI #L.

In the present disclosure, 'Multi DCI based NC-JT' may refer to an NC-JT operation implemented when PDSCHs respectively transmitted from different TRPs (or beams) are scheduled by the respective DCIs. For example, 'Multi DCI based NC-JT' may include an NC-JT operation implemented when PDSCH #1 and PDSCH #2 are respectively scheduled by DCI #1 and DCI #2 at the same time.

In the present disclosure, NC-JT can be classified into two types of NC-JT depending on whether a layer transmitted by different TRPs is considered independent or common.

In the present disclosure, the expression "independent layer" may indicate that, when TRP #A transmits signals through three layers and TRP #B transmits signals through four layers, this means that the UE can expect signal reception through a total of 7 layers.

In the present disclosure, the expression "common layer" may indicate that, when TRP #A transmits signals through three layers and TRP #B transmits signals through three layers, this means that the UE can expect signal reception through a total of 3 layers.

In order to distinguish the above-mentioned two operations from each other, NC-JT based on the former operation will hereinafter be referred to as 'NC-JT with IL (Independent Layer)', and NC-JT based on the latter operation will hereinafter be referred to as 'NC-JT with CL (Common Layer)'.

Although the present disclosure has disclosed examples of various operations based on 'NC-JT with IL' (or mode), the corresponding operation examples can be extended to other operation examples based on 'NC-JT with CL' operation (or mode) as necessary.

1.11. HARQ Process

DCI transmitted from the BS to the UE may include a 'HARQ process number' field that is 4 bits long. Based on the HARQ process number indicated by the 'HARQ process number' field included in the DCI, the UE can determine or recognize which PDSCH from among the previously transmitted PDSCHs is associated with retransmission of a PDSCH scheduled by the DCI.

1.12. Decision of Modulation Order and Target Code Rate

In the present disclosure, PDSCH can be scheduled by PDCCH (e.g., DCI format 1_0 or DCI format 1_1) that is CRC(cyclic redundancy check)-scrambled by C-RNTI (cell radio network temporary identifier (cell RNTI)), MCS-RNTI (modulation coding scheme cell RNTI), TC-RNTI (temporary cell RNTI), CS-RNTI (configured scheduling RNTI), RA-RNTI (random access RNTI), or P-RNTI (paging RNTI). Alternatively, the PDSCH can be scheduled based on PDSCH configuration (SPS-config) that is supplied from a higher layer without PDCCH transmission. The modulation order and the target code rate for such PDSCHs can be determined and configured as follows.

(1) (i) If the higher layer parameter 'mcs-Table' supplied by 'PDSCH-Config' is set to 'qam256', and (ii) if a PDSCH is scheduled by DCI format 1_1 (or DCI format 11) that is CRC-scrambled by C-RNTI, the UE can determine the modulation order ($Q_m$) and the target code rate (R) for PDSCH based on the MCS value (e.g., $I_{MCS}$) and content described in Table 20.

(2) Alternatively, (i) if MCS-C-RNTI is not configured for the UE, (ii) if the higher layer parameter 'mcs-Table' provided by 'PDSCH-Config' is set to 'qam64LowSE', and (iii) if PDSCH is scheduled by PDCCH in a UE-specific search space that is CRC-scrambled by C-RNTI, the UE can determine the modulation order ($Q_m$) and the target code rate (R) for PDSCH based on the MCS value (e.g., $I_{MCS}$) and content described in Table 21.

(3) Alternatively, (i) if MCS-C-RNTI is configured for the UE, and (ii) if PDSCH is scheduled by PDCCH that is CRC-scrambled by MCS-C-RNTI, the UE can determine the modulation order ($Q_m$) and the target code rate for PDSCH based on the MCS value (e.g., $I_{MCS}$) and content described in Table 21.

(4) Alternatively, (i) if the higher layer parameter 'mcs-Table' provided by SOS-Config is not configured for the UE, and (ii) if the higher layer parameter 'mcs-Table' provided by PDSCH-Config is set to 'qam256', the following operations can be performed.

If the PDSCH is scheduled by DCI format 1_1 (or by PDCCH including DCI format 1_1) that is CRC-scrambled by CS-RNTI, or if the PDSCH is scheduled using SPS-config without PDCCH transmission, the UE can determine the modulation order (Qm) and the target code rate (R) for PDSCH based on the MCS value (e.g., $I_{MCS}$) and content described in Table 20.

(5) Alternatively, (i) if the higher layer parameter 'mcs-Table' provided by SPS-Config is set to 'qam64LowSE', if the PDSCH is scheduled by PDCCH that is CRC-scrambled by CS-RNTI, or if the PDSCH is scheduled using 'SPS-config' without PDCCH transmission, the UE can determine the modulation order ($Q_m$) and the target code rate for PDSCH based on the MCS value (e.g., $I_{MCS}$) and content described in Table 21.

(6) Alternatively, the UE can determine the modulation order ($Q_m$) and the target code rate (R) for PDSCH based on the MCS value (e.g., $I_{MCS}$) and content described in Table 19.

TABLE 19

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |

TABLE 19-continued

| MCS Index $I_{MCS}$ | Modulation Order $Q_m$ | Target code Rate R × [1024] | Spectral efficiency |
|---|---|---|---|
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 12 | 4 | 434 | 1.6953 |
| 13 | 4 | 490 | 1.9141 |
| 14 | 4 | 553 | 2.1602 |
| 15 | 4 | 616 | 2.4063 |
| 16 | 4 | 658 | 2.5703 |
| 17 | 6 | 438 | 2.5664 |
| 18 | 6 | 466 | 2.7305 |
| 19 | 6 | 517 | 3.0293 |
| 20 | 6 | 567 | 3.3223 |
| 21 | 6 | 616 | 3.6094 |
| 22 | 6 | 666 | 3.9023 |
| 23 | 6 | 719 | 4.2129 |
| 24 | 6 | 772 | 4.5234 |
| 25 | 6 | 822 | 4.8164 |
| 26 | 6 | 873 | 5.1152 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

TABLE 20

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 193 | 0.3770 |
| 2 | 2 | 308 | 0.6016 |
| 3 | 2 | 449 | 0.8770 |
| 4 | 2 | 602 | 1.1758 |
| 5 | 4 | 378 | 1.4766 |
| 6 | 4 | 434 | 1.6953 |
| 7 | 4 | 490 | 1.9141 |
| 8 | 4 | 553 | 2.1602 |
| 9 | 4 | 616 | 2.4063 |
| 10 | 4 | 658 | 2.5703 |
| 11 | 6 | 466 | 2.7305 |
| 12 | 6 | 517 | 3.0293 |
| 13 | 6 | 567 | 3.3223 |
| 14 | 6 | 616 | 3.6094 |
| 15 | 6 | 666 | 3.9023 |
| 16 | 6 | 719 | 4.2129 |
| 17 | 6 | 772 | 4.5234 |
| 18 | 6 | 822 | 4.8164 |
| 19 | 6 | 873 | 5.1152 |
| 20 | 8 | 682.5 | 5.3320 |
| 21 | 8 | 711 | 5.5547 |
| 22 | 8 | 754 | 5.8906 |
| 23 | 8 | 797 | 6.2266 |
| 24 | 8 | 841 | 6.5703 |
| 25 | 8 | 885 | 6.9141 |
| 26 | 8 | 916.5 | 7.1602 |
| 27 | 8 | 948 | 7.4063 |
| 28 | 2 | reserved | |
| 29 | 4 | reserved | |
| 30 | 6 | reserved | |
| 31 | 8 | reserved | |

TABLE 21

| MCS Index $I_{MCS}$ | Modulation Order $Q_m$ | Target code Rate R × [1024] | Spectral efficiency |
| --- | --- | --- | --- |
| 0 | 2 | 30 | 0.0586 |
| 1 | 2 | 40 | 0.0781 |
| 2 | 2 | 50 | 0.0977 |
| 3 | 2 | 64 | 0.1250 |
| 4 | 2 | 78 | 0.1523 |
| 5 | 2 | 99 | 0.1934 |
| 6 | 2 | 120 | 0.2344 |
| 7 | 2 | 157 | 0.3066 |
| 8 | 2 | 193 | 0.3770 |
| 9 | 2 | 251 | 0.4902 |
| 10 | 2 | 308 | 0.6016 |
| 11 | 2 | 379 | 0.7402 |
| 12 | 2 | 449 | 0.8770 |
| 13 | 2 | 526 | 1.0273 |
| 14 | 2 | 602 | 1.1758 |
| 15 | 4 | 340 | 1.3281 |
| 16 | 4 | 378 | 1.4766 |
| 17 | 4 | 434 | 1.6953 |
| 18 | 4 | 490 | 1.9141 |
| 19 | 4 | 553 | 2.1602 |
| 20 | 4 | 616 | 2.4063 |
| 21 | 6 | 438 | 2.5664 |
| 22 | 6 | 466 | 2.7305 |
| 23 | 6 | 517 | 3.0293 |
| 24 | 6 | 567 | 3.3223 |
| 25 | 6 | 616 | 3.6094 |
| 26 | 6 | 666 | 3.9023 |
| 27 | 6 | 719 | 4.2129 |
| 28 | 6 | 772 | 4.5234 |
| 29 | 2 |  | reserved |
| 30 | 4 |  | reserved |
| 31 | 6 |  | reserved |

1.13. Transport Block (TB) Size Determination

Based on the 5.1.3.2 section of the 3GPP TS 38.214 standard specification, the transport block (TB) size between the UE and the BS can be determined. More specifically, the TB size can be determined as follows.

In the situation where the higher layer parameter 'maxNrofCodeWordsScheduledByDCI' indicates that transmission of two codewords is enabled, (i) if the $I_{MCS}$ value for the corresponding TB is set to 26, and (ii) if the 'rv$_{id}$' value is set to 1, the corresponding TB can be disabled by DCI format 1_1. If two TBs are enabled, TB1 and TB2 can be mapped to Codeword 0 and Codeword 1, respectively. If only one TB of the two TBs is enabled, the enabled TB can always be mapped to the first codeword (e.g., Codeword 0).

For FDSCH allocated by DCI format 1_0 or DCI format 1_1 (or PDCCH including DCI format 1_0 or DCI format 11) that is scrambled by C-RNTI, MCS-C-RNTI, TC-RNTI, CS-RNTI, or SI-RNTI, (i) if Table 19 is used and if the $I_{MCS}$ value is equal to or higher than zero '0' and is equal to or less than 27, or (ii) if Table 18 or Table 20 is used and if the $I_{MCS}$ value is equal to or higher than zero '0' and is equal to or less than 27, the UE can determine a transport block size (TBS) as follows in the remaining cases other than one case in which the transport block (TB) on DCI format 1_1 is disabled.

(1) First, the UE may determine the number of REs (e.g., the number of NREs) in the slot.

The UE can determine the number of REs (e.g., N'$_{RE}$) allocated for PDSCH in a physical resource block (PRB), based on the following equation 1.

$$N'_{RE} = N_{sc}^{RB} \cdot N_{symb}^{sh} - N_{DMRS}^{PRB} - N_{oh}^{PRB}$$ [Equation 1]

In Equation 1, $N_{sc}^{RB}=12$ may denote the number of subcarriers in a physical resource block (PRB), and $N_{symb}^{sh}$ may denote the number of symbols required for PDSCH allocation in the slot. $N_{DMRS}^{PRB}$ may denote the number of REs for per-PRB DMRS included in the scheduled section provided with overhead of the DMRS CDM group having no data. Here, $N_{DMRS}^{PRB}$ indicating the number of REs for per-PRB DMRS may be indicated by DCI format 1_1 or may be determined according to DCI format 1_0 characteristics. $N_{oh}^{PRB}$ may denote overhead that is configured by the higher layer parameter 'xOverhead' included in 'PDSCH-ServingCellConfig'. If the higher layer parameter 'xOverhead' is not configured in the higher layer parameter 'PDSCH-ServingCellConfig' (the corresponding value may be set to 0, 6, 12 or 18), $N_{oh}^{PRB}$ may be set to zero '0'. If PDSCH is scheduled by PDCCH that is CRC-scrambled by SI-RNTI, RA-RNTI or P-RNTI, it is assumed that $N_{oh}^{PRB}$ is zero '0'.

The UE can determine a total number of REs (NREs) allocated for PDSCH using the following equation 2.

$$N_{RE} = \min(156, N'_{RE}) \cdot n_{PRB}$$ [Equation 2]

In Equation 2, $n_{PRB}$ may denote the total number of PRBs allocated for the UE.

(2) The intermediate number ($N_{info}$) of the information bit can be obtained based on the following equation 3.

$$N_{info} = N_{RE} \cdot R \cdot Q_m \cdot v$$ [Equation 3]

In Equation 3, R may denote a target code rate decided by the MCS field, $Q_m$ may denote the modulation order decided by the MCS field, and a may denote the number of layers.

If the $N_{info}$ size is equal to or less than 3824, step 3 can be used as the next step of TBS determination. Conversely, if the $N_{info}$ size is larger than 3824, step 4 can be used as the next step of TBS determination.

(3) If the $N_{info}$ size is equal to or less than 3824, TBS can be determined as follows.

N'$_{info}$ indicating the quantized intermediate number of information bits can be used to satisfy the following equation 4.

$$N'_{info} = \max\left(24, 2^n \cdot \left\lfloor \frac{N_{info}}{2^n} \right\rfloor\right)$$ [Equation 4]

In Equation 4, 'n' may satisfy n=max (3, $\lfloor \log_2(N_{info}) \rfloor -6$)
In Table 22, the nearest TBS that is not less than N'$_{info}$ can be found.

TABLE 22

| Index | TBS |
| --- | --- |
| 1 | 24 |
| 2 | 32 |
| 3 | 40 |
| 4 | 48 |
| 5 | 56 |
| 6 | 64 |
| 7 | 72 |
| 8 | 80 |
| 9 | 88 |
| 10 | 96 |
| 11 | 104 |
| 12 | 112 |
| 13 | 120 |
| 14 | 128 |
| 15 | 136 |
| 16 | 144 |
| 17 | 152 |
| 18 | 160 |
| 19 | 168 |
| 20 | 176 |

TABLE 22-continued

| Index | TBS |
|---|---|
| 21 | 184 |
| 22 | 192 |
| 23 | 208 |
| 24 | 224 |
| 25 | 240 |
| 26 | 256 |
| 27 | 272 |
| 28 | 288 |
| 29 | 304 |
| 30 | 320 |
| 31 | 336 |
| 32 | 352 |
| 33 | 368 |
| 34 | 384 |
| 35 | 408 |
| 36 | 432 |
| 37 | 456 |
| 38 | 480 |
| 39 | 504 |
| 40 | 528 |
| 41 | 552 |
| 42 | 576 |
| 43 | 608 |
| 44 | 640 |
| 45 | 672 |
| 46 | 704 |
| 47 | 736 |
| 48 | 768 |
| 49 | 808 |
| 50 | 848 |
| 51 | 888 |
| 52 | 928 |
| 53 | 984 |
| 54 | 1032 |
| 55 | 1064 |
| 56 | 1128 |
| 57 | 1160 |
| 58 | 1192 |
| 59 | 1224 |
| 60 | 1256 |
| 61 | 1288 |
| 62 | 1320 |
| 63 | 1352 |
| 64 | 1416 |
| 65 | 1480 |
| 66 | 1544 |
| 67 | 1608 |
| 68 | 1672 |
| 69 | 1736 |
| 70 | 1800 |
| 71 | 1864 |
| 72 | 1928 |
| 73 | 2024 |
| 74 | 2088 |
| 75 | 2152 |
| 76 | 2216 |
| 77 | 2280 |
| 78 | 2408 |
| 79 | 2472 |
| 80 | 2536 |
| 81 | 2600 |
| 82 | 2664 |
| 83 | 2728 |
| 84 | 2792 |
| 85 | 2856 |
| 86 | 2976 |
| 87 | 3104 |
| 88 | 3240 |
| 89 | 3368 |
| 90 | 3496 |
| 91 | 3624 |
| 92 | 3752 |
| 93 | 3824 |

(4) If the $N_{info}$ size is larger than 3824, TBS can be determined as follows.

$N'_{info}$ indicating the quantized intermediate number of information bits can be determined to satisfy the following equation 5.

[Equation 5]

$$N'_{info} = \max\left(3840, 2^n \times \text{round}\left(\frac{N_{info} - 24}{2^n}\right)\right)$$ [Equation 5]

In Equation 5, 'n' may satisfy $n = \lfloor \log_2(N_{info} - 24) \rfloor - 5$.

If the R value is equal to or less than ¼, TBS can be determined to satisfy the following equation 6.

$$TBS = 8 \cdot C \cdot \left\lceil \frac{N'_{info} + 24}{8 \cdot C} \right\rceil - 24$$ [Equation 6]

In Equation 6, the value of C can be determined to satisfy $$C = \left\lceil \frac{N'_{info} + 24}{3816} \right\rceil.$$

Alternatively, if the R value is higher than ¼ and the $N'_{info}$ value is higher than 8424, TBS can be determined to satisfy the following equation 7.

$$TBS = 8 \cdot C \cdot \left\lceil \frac{N'_{info} + 24}{8 \cdot C} \right\rceil - 24$$ [Equation 7]

In Equation 7, the value of C may be determined to satisfy $$C = \left\lceil \frac{N'_{info} + 24}{8424} \right\rceil.$$

Alternatively, TBS may be determined to satisfy the following equation 8.

$$TBS = 8 \cdot \left\lceil \frac{N'_{info} + 24}{8} \right\rceil - 24$$ [Equation 8]

Differently from the above-mentioned content, if Table 19 is used, and if the $I_{MCS}$ value is equal to or higher than 28 or is equal to equal to or less than 31, TBS can be determined as follows.

In more detail, in the above-mentioned cases, it is assumed that TBS is determined based on DCI transmitted within the latest PDCCH for the same transport block (TB) configured to use the $I_{MCS}$ having the values of 0 to 27. In the case (i) where the same TB configured to use the $I_{MCS}$ having the values of 0 to 27 does not exist, and in the other case (ii) where the initial PDSCH for the same TB is semi-persistently scheduled, the TBS can be determined based on the semi-persistent scheduled (SPS) PDCCH.

Alternatively, it is assumed that TBS is determined based on DCI transmitted within the latest PDCCH for the same TB configured to use the $I_{MCS}$ having the values of 0 to 28. In the case (i) where the same TB configured to use the $I_{MCS}$ having the values of 0 to 28 does not exist, and in the other case (ii) where the initial PDSCH for the same TB is semi-persistently scheduled, TBS can be determined based on the latest SPS allocation PDCCH.

The UE may not expect that PDSCH allocated by PDCCH that is CRC-scrambled by SI-RNTI has the TBS exceeding the size of 2976 bits.

For PDSCH allocated by DCI format 1_0 (or PDCCH including DCI format 1_0) that is CRC-scrambled by P-RNTI or RA-RNTI, TBS determination may follow the step 1-4, and may also follow the step 1-4 in a state where the following items are corrected in step 2. In the process of calculating the $N_{info}$ parameter, scaling that is capable of satisfying the following equation for the $N_{info}$ parameter can be used. In this case, the scaling factor may be determined based on the TB scaling field included in DCI shown in the following tables.

$$N_{info} = S \cdot N_{RE} \cdot R \cdot Q_m \cdot v \qquad \text{[Equation 9]}$$

TABLE 23

| TB scaling field | Scaling factor S |
|---|---|
| 00 | 1 |
| 01 | 0.5 |
| 10 | 0.25 |
| 11 | |

Not only the NDI and HARQ process ID that is signaled on PDCCH, but also the above-mentioned TBS determined as described above can be reported to a higher layer (in the UE).

1.14. Resource Allocation Method

In the present disclosure, two DL resource allocation schemes (e.g., resource allocation type 0 and resource allocation type 1) can be supported. If DCI format 1_0 and the scheduling grant are received, the UE can assume that DL resource allocation type 1 is used.

If the higher layer parameter 'resourceAllocation' included in 'pdsch-Config' is set to 'dynamicswitch', and if the scheduled DCI is configured to indicate the DL resource allocation type as a portion of the FRA (frequency domain resource assignment) field, the UE may use DL resource allocation type 0 or DL resource allocation type 1 that is determined/defined based on the DCI field.

If the bandwidth part (BWP) indicator field is not configured in the scheduled DCI, or if the UE does not support the active BWP change through DCI, RB indexing for DL resource allocation type 0 and DL resource allocation type 1 can be determined in the active BWP of the UE. Conversely, if the BWP indicator field is configured in the scheduled DCI, and if the UE supports the active BWP change through DCI, RB indexing for DL resource allocation type 0 and DL resource allocation type 1 can be determined within the UE BWP indicated by the BWP indicator field value included in the DCI. If the UE detects a PDCCH intended for the UE itself, the UE may determine the DL carrier BWP and then determine resource allocation within the bandwidth part (BWP).

For PDSCH scheduled by DCI format 1_0 in all types of PDCCH common search spaces, RB numbering may start from the lowest RB of the CORESET having received the DCI, irrespective of which BWP is the active BWP. In other cases, RB numbering may start from the lowest RB included in the determined DL BWP.

1.14.1. Resource Allocation Type 0

In the present disclosure, resource allocation type 0 may refer to a resource allocation method based on a resource block group (RBG).

In order to support resource allocation type 0, the higher layer parameter for the RBG shown in the following table 24 can be configured for the UE.

TABLE 24

| | |
|---|---|
| PDSCH-Config ::= | SEQUENCE { |
| dataScramblingIdentityPDSCH | INTEGER (0..1023) |
| OPTIONAL, -- Need S | |
| dmrs-DownlinkForPDSCH-MappingTypeA | SetupRelease ( DMRS-DownlinkConfig ) |
| OPTIONAL, -- Need M | |
| dmrs-DownlinkForPDSCH-MappingTypeB | SetupRelease ( DMRS-DownlinkConfig ) |
| OPTIONAL, -- Need M | |
| tci-StatesToAddModList | SEQUENCE (SIZE (1..maxNrofTCI-States) ) OF TCI- |
| State OPTIONAL, -- Need N | |
| tci-StatesToReleaseList | SEQUENCE (SIZE (1..maxNrofTCI-States) ) OF TCI- |
| StateId OPTIONAL, -- Need N | |
| vrb-ToPRB-Interleaver | ENUMERATED {n2, n4} |
| OPTIONAL, -- Need S | |
| resourceAllocation | ENUMERATED { resourceAllocationType0, |
| resourceAllocationType1, dynamicSwitch}, | |
| pdsch-TimeDomainAllocationList | SetupRelease { PDSCH- |
| TimeDomainResourceAllocationList } | OPTIONAL, -- Need M |
| pdsch-AggregationFactor | ENUMERATED { n2, n4, n8 } |
| OPTIONAL, -- Need S | |
| rateMatchPatternToAddModList | SEQUENCE (SIZE (1..maxNrofRateMatchPatterns) ) |
| OF RateMatchPattern OPTIONAL, -- Need N | |
| rateMatchPatternToReleaseList | SEQUENCE (SIZE (1..maxNrofRateMatchPatterns) ) |
| OF RateMatchPatternId OPTIONAL, -- Need N | |
| rateMatchPatternGroup1 | RateMatchPatternGroup |
| OPTIONAL, -- Need R | |
| rateMatchPatternGroup2 | RateMatchPatternGroup |
| OPTIONAL, -- Need R | |
| rbg-Size | ENUMERATED {config1, config2}, |
| mcs-Table | ENUMERATED {qam256, qam64LowSE} |
| OPTIONAL, -- Need S | |
| maxNrofCodeWordsScheduledByDCI | ENUMERATED {n1, n2} |

In Table 24, the higher layer parameter 'rbg-Size' can be set to 'config1' or 'config2' as the RBG size for PDSCH. Only when the higher layer parameter 'resourceAllocation' is set to 'resourceAllocationType0' or 'dynamicSwitch', the network (or base station) can determine the higher layer parameter 'rbg-Size' to be 'config2'. The higher layer parameter may correspond to the L1 parameter 'RBG-size-PDSCH'.

In DL resource allocation type 0, the RB allocation information may include a bitmap indicating RBG(s) to be allocated to the scheduled UE. The RBS(s) may refer to the set of consecutive virtual resource blocks (VRBs) defined by both the higher layer parameter 'rbg-Size' configured by PDSCH-Config and the BWP size defined as shown in the following table 25.

TABLE 25

| Bandwidth Part Size | Configuration 1 | Configuration 2 |
|---|---|---|
| 1-35 | 2 | 4 |
| 37-72 | 4 | 8 |
| 73-144 | 8 | 16 |
| 145-275 | 16 | 16 |

In Table 25, a total number (NRBG) of RBGs for the DL BWP (i) having the size of $N_{BWP,i}^{size}$ PRBs can be determined to satisfy the following equation 10.

$$N_{RBG} = \lceil (N_{BWP,i}^{size} + N_{BWP,i}^{start} \bmod P))/P \rceil \quad \text{[Equation 10]}$$

In Equation 10, the size of the first RBG may be configured to satisfy the following equation 11. In Equation 10, if $(N_{BWP,i}^{start} + N_{BWP,i}^{size}) \bmod P > 0$ is satisfied, the size of the last RBG may be determined to satisfy the following equation 12. Otherwise, the last RBG size may be set to P. In Equation 10, the size of another RBG may be set to P.

$$RBG_0^{size} = P - N_{BWP,i}^{start} \bmod P \quad \text{[Equation 11]}$$

$$RBG_{last}^{size} = (N_{BWP,i}^{start} + N_{BWP,i}^{size}) \bmod P \quad \text{[Equation 12]}$$

Bitmap is NRBG bits long, so that only one bit can be allocated to each RBG. As a result, each RBG is addressable. RBG may be indexed in ascending numerical order of frequency, and may start from the lowest frequency of the carrier BWP. RBG bitmap including RBGs ranging from RBG0 to RBG NRBG-1 may be sequentially mapped in the direction from MSB (Most Significant Bit) to LSB (Least Significant Bit). If the value of a bit corresponding to the bitmap is set to 1, the corresponding RBG is allocated to the UE. Otherwise, the corresponding RBG may not be allocated to the UE.

1.14.2. Resource Allocation Type 1

In DL resource allocation type 1, the RB allocation information may indicate (i) non-interleaved VRBs consecutively allocated, or may indicate (ii) the interleaved VRBs consecutively allocated. In this case, the non-interleaved VRBs and/or the interleaved VRBs may be included in the active BWP having the $N_{BWP}^{size}$ PRB size in the remaining cases other than one case of decoding DCI format 1_0 included in the common search space in which the size of CORESET 0 is used.

The RB allocation field of DL type 1 may include (i) a start VRB (e.g., RBstart), and (ii) a resource indication value (RIV) corresponding to the length (e.g., LRBs) of RB units that are consecutively allocated. The RIV value can be defined based on the following equation 13.

if $(L_{RBs}-1) \leq \lfloor N_{BWP}^{size}/2 \rfloor$ then $$RIV = N_{BWP}^{size}(L_{RBs}-1) + RB_{start}$$

else $$RIV = N_{BWP}^{size}(N_{BWP}^{size}-L_{RBs}+1) + (N_{BWP}^{size}-1-RB_{start}) \quad \text{[Equation 13]}$$

where $L_{RBs} \geq 1$ and shall not exceed $N_{BWP}^{size} - RB_{start}$

If the DCI size for DCI format 1_0 in a User-specific Search Space (USS) is derived from the size of CORESET 0 and is then applied to another active BWP having the $N_{BWP}^{active}$ size, the RB allocation field of DL type 1 may include (i) a start VRB (e.g., $RB_{start}=0$, K, 2·K, . . . , $(N_{BWP}^{initial}-1)$·K), and (ii) a resource indication value (RIV) corresponding to the length (e.g., $L_{RBs}=K, 2·K, \ldots , N_{BWP}^{initial}·K$) of RB units that are virtually and consecutively allocated.

The $N_{BWP}^{active}$ value may be determined to be the CORESET size when 'CORESET 0' is configured for the cell (in Case (i)), and may be determined to be the initial DL bandwidth size when 'CORESET 0 is not configured for the cell (in Case (ii)).

The RIV value may be defined based on the following equation 14.

if $(L_{RBs}'-1) \leq \lfloor N_{BWP}^{size}/2 \rfloor$ then $$RIV = N_{BWP}^{initial}(L_{RBs}'-1) + RB_{start}'$$

else $$RIV = N_{BWP}^{initial}(N_{BWP}^{initial}-L_{RBs}'+1) + (N_{BWP}^{initial}-1-RB_{start}') \quad \text{[Equation 14]}$$

where $L_{RBs}' = L_{RBs}/K$, $RB_{start}' = RB_{start}/K$ and where $L_{RBs}'$ shall not exceed $N_{BWP}^{initial} - RB'_{start}$ In Equation 14, K may be determined to satisfy the following equation 15.

If $N_{BWP}^{active} > N_{BWP}^{initial}$, K is the maximum value from set {1,2,4,8} [Equation 15]

which satisfies $K \leq \lceil N_{BWP}^{active}/N_{BWP}^{initial} \rceil$; otherwise K=1

1.15. PRG (Precoding Resource Block Group, PRB group)

In the present disclosure, bundling for the PRG can be determined based on the higher layer parameter shown in the following table 26.

TABLE 26

| prb-BundlingType | CHOICE { |
| staticBundling | SEQUENCE { |
| bundleSize | ENUMERATED { n4, wideband } |
| OPTIONAL -- Need S | |
| }, | |
| dynamicBundling | SEQUENCE { |
| bundleSizeSet1 | ENUMERATED { n4, wideband, n2-wideband, n4-wideband } OPTIONAL, -- Need S |
| bundleSizeSet2 | ENUMERATED { n4, wideband } |

TABLE 26-continued

OPTIONAL -- Need S
```
    }
  },
```

In Table 26, prb-bundlingType may be associated with 'PRB bundle type' and 'bundle size(s)' (or may indicate 'PRB bundle type' and 'bundle size(s)'). If 'dynamic' is selected, 'bundleSizeSet1' or 'bundleSizeSet2' to be used can be indicated through DCI. Constraints for bundleSize (Set) setting may be based on 'vrb-ToPRB-Interleaver' and 'rbg-Size' setting. If the bundleSize(Set) value is absent (or does not exist), the UE may apply the n2 value (e.g., 2) to the present disclosure.

Based on the above-mentioned higher layer parameters, the UE can perform various operations based on the following tables.

In more detail, the UE may assume that the precoding granularity in the frequency domain includes $P_{BWP,i}'$ consecutive RBs. $P_{BWP,i}'$ may be identical to one value from among $\{2, 4, \text{wideband}\}$.

If the $P_{BWP,i}'$ value is determined to be 'wideband', the UE may not expect that non-continuous PRBs are scheduled, and the UE may assume that the same precoding is applied to the allocated resources.

If the $P_{BWP,i}'$ value is set to any one of $\{2, 4\}$, the PRG can partition the BWP (i) into $P_{BWP,i}'$ consecutive PRBs. The actual number of consecutive PRBs included in each PRG may be set to 1 or more.

The first PRG size may be denoted by $P_{BWP,i}' - N_{BWP,i}^{start}$ mod $P_{BWP}'$. If $(N_{BWP,i}^{start} + N_{BWP,i}^{size})$ mod $P_{BWP,i}' \neq 0$ is given, the last PRB size may be $(N_{BWP,i}^{start} + N_{BWP,i}^{size})$ mod $P_{BWP,i}'$. Alternatively, if $(N_{BWP,i}^{start} + N_{BWP,i}^{size})$ mod $P_{BWP,i}' = 0$ is given, the last PRG size may be denoted by $P_{BWP,i}'$.

The UE may assume that the same precoding can be applied for any downlink consecutive allocation of PRBs belonging to the PRG.

For the PDSCH that is scheduled by PDCCH (that is CRC-scrambled by SI-RNTI) while carrying an SIB1, the PRG can discriminate between RBs starting from the lowest numbered RB of the CORESET signaled into a PBCH. That is, partitioning of the RBs starting from the lowest numbered RB of the CORESET can be performed.

If the PDSCH is scheduled by DCI format 1_0, the UE may assume that $P_{BWP,i}'$ is identical to 2 PRB(s).

If the UE receives a PDSCH scheduled by PDCCH of DCI format 1_1 that is CRC-scrambled by C-RNTI, MCS-C-RNTI or CS-RNTI, and if the higher layer parameter 'prb-BundlingType' is set to 'dynamicBundling', (i) the higher layer parameters 'bundleSizeSet1' and 'bundleSizeSet2' may set two sets of the $P_{BWP,i}'$ values, (ii) the first set of the two sets may select (or take) one or more $P_{BWP,i}'$ values from among $\{2, 4, \text{wideband}\}$ values, and (iii) the second set may select (or take) only one $P_{BWP,i}'$ value from among $\{2, 4, \text{wideband}\}$ values.

If the PRB bundling size indicator signaled through DCI format 1_1 is set to zero '0', the UE may use the $P_{BWP,i}'$ value included in the second set of the $P_{BWP,i}'$ values when receiving the PDSCH scheduled by the same DCI. If the PRB bundling size indicator signaled through DCI format 1_1 is set to '1', and if only one value is configured for the first set of the $P_{BWP,i}'$ values, the UE may use the $P_{BWP,i}'$ value when receiving the PDSCH scheduled by the same DCI. If the PRB bundling size indicator signaled through DCI format 1_1 is set to '1', and if two values for the first set of the $P_{BWP,i}'$ values are 'n2-wideband' (where, two BWP i values correspond to '2' and 'wideband') or 'n4-wideband' (where, two $P_{BWP,i}'$ values correspond to '4' and 'wideband'), the UE may use the above-mentioned values as follows when receiving the PDSCH scheduled by the same DCI. In Case (i), if the scheduled PRBs are consecutive and the size of the scheduled PRBs exceeds $N_{BWP,i}^{size}/2$, $P_{BWP,i}'$ may be identical to the scheduled bandwidth. In Case (ii), if the scheduled PRBs are not consecutive and the size of the scheduled PRBs does not exceed $N_{BWP,i}^{size}/2$, $P_{BWP,i}'$ may be set to 2 or 4 corresponding to the remaining configuration values.

If the UE receives the PDSCH scheduled by PDCCH of DCI format 1_1 that is CRC-scrambled by C-RNTI, MCS-C-RNTI or CS-RNTI, and if the higher layer parameter 'prb-BundlingType' is set to 'staticBundling', the $P_{BWP,i}'$ value may be set to a single value indicated by the higher layer parameter 'bundleSize'.

(i) If a nominal RBG size (P=2) for a specific BWP is configured for the UE, or (ii) if the interleaving unit for VRB-to-PRB mapping is set to 2 by the higher layer parameter 'vrb-ToPRB-Interleaver' included in 'PDSCH-Config' for a specific BWP, the UE may not expect that the $P_{BWP,i}'$ value is set to 4.

TABLE 27

A UE may assume that precoding granularity is $P'_{BWP,i}$ consecutive resource blocks in the frequency domain.
$P'_{BWP,i}$ can be equal to one of the values among $\{2, 4, \text{wideband}\}$.
If $P'_{BWP,i}$ is determined as "wideband", the UE is not expected to be scheduled with non-contiguous PRBs and the UE may assume that the same precoding is applied to the allocated resource.
If $P'_{BWP,i}$ is determined as one of the values among $\{2, 4\}$, Precoding Resource Block Group (PRGs) partitions the bandwidth part i with $P'_{BWP,i}$ consecutive PRBs. Actual number of consecutive PRBs in each PRG could be one or more.
The first PRG size is given by $P'_{BWP,i} - N_{BWP,i}^{start}$ mod $P'_{BWP}$ and the last PRG size given by $(N_{BWP,i}^{start} + N_{BWP,i}^{size})$ mod $P'_{BWP,i}$ if $(N_{BWP,i}^{start} + N_{BWP,i}^{size})$ mod $P'_{BWP,i} \neq 0$, and the last PRG size is $P'_{BWP,i}$ if $(N_{BWP,i}^{start} + N_{BWP,i}^{size})$ mod $P'_{BWP,i} = 0$.
The UE may assume the same precoding is applied for any downlink contiguous allocation of PRBs in a PRG.
For PDSCH carrying SIB1 scheduled by PDCCH with CRC scrambled by SI-RNTI, a PRG is partitioned from the lowest numbered resource block of CORESET 0 if the corresponding PDCCH is associated with CORESET 0 and Type0-PDCCH common search space and is addressed to SI-RNTI; otherwise, a PRG is partitioned from common resource block 0.
If a UE is scheduled a PDSCH with DCI format 1_0, the UE shall assume that $P'_{BWP,i}$ is equal to 2 PRBs.

TABLE 28

When receiving PDSCH scheduled by PDCCH with DCI format 1_1 with CRC scrambled by C-RNTI, MCS-C-RNTI, or CS-RNTI, $P'_{BWP,i}$ for bandwidth part is equal to 2 PRBs unless configured by the higher layer parameter prb-BundlingType given by PDSCH-Config.
When receiving PDSCH scheduled by PDCCH with DCI format 1_1 with CRC scrambled by C-RNTI, MCS-C-RNTI, or CS-RNTI, if the higher layer parameter prb-BundlingType is set to 'dynamicBundling', the higher layer parameters bundleSizeSet1 and bundleSizeSet2 configure two sets of $P'_{BWP,i}$ values, the first set can take one or two $P'_{BWP,i}$ values among {2, 4, wideband}, and the second set can take one $P'_{BWP,i}$ value amoung {2, 4, wideband}.
If the PRB bundling size indicator signalled in DCI format 1_1 as defined in clause 7.3.1.2.2 of [5, TS 38.212]
    is set to '0', the UE shall use the $P'_{BWP,i}$ value from the second set of $P'_{BWP,i}$ values when receiving PDSCH scheduled by the same DCI.
    is set to '1' and one value is configured for the first set of $P'_{BWP,i}$ values, the UE shall use this $P'_{BWP,i}$ value when receiving PDSCH scheduled by the same DCI
    is set to '1' and two values are configured for the first set of $P'_{BWP,i}$ values as 'n2-wideband' (corresponding to two $P'_{BWP,i}$ values 2 and wideband) or 'n4-wideband' (corresponding to two $P'_{BWP,i}$ values 4 and wideband), the UE shall use the value when receiving PDSCH scheduled by the same DCI as follows:
      If the scheduled PRBs are contiguous and the size of the scheduled PRBs is larger than $N_{BWP,i}^{size}/2$, $P'_{BWP,i}$ is the same as the scheduled bandwidth, otherwise $P'_{BWP,i}$ is set to the remaining configured value of 2 or 4, respectively.
When receiving PDSCH scheduled by PDCCH with DCI format 1_1 with CRC scrambled by C-RNTI, MCS-C-RNTI, or CS-RNTI, if the higher layer parameter prb-BundlingType is set to 'staticBundling', the $P'_{BWP,i}$ value is configured with the single value indicated by the higher layer parameter bundleSize.
When a UE is configured with nominal RBG size P = 2 for bandwidth part i according to clause 5.1.2.2.1, or when a UE is configured with interleaving unit of 2 for VRB to PRB mapping provided by the higher layer parameter vrb-ToPRB-Interleaver given by PDSCH-Config for bandwidth part i, the UE is not expected to be configured with $P'_{BWP,i=4}$.

2. Example of UE and BS Operations Described in this Patent Document

In the present disclosure, the UE may be replaced with another term such as a terminal.

In the present disclosure, the higher layer signaling may include RRC signaling, MAC CE, etc.

In the present disclosure, TRP (Transmission Reception Point) can also be conceptually extended to a beam.

In the present disclosure, the beam may be replaced with resources.

In the present disclosure, differently from the LTE system, if UL data to be transmitted is not present (e.g., Case #1), and if UL data to be transmitted is present (e.g., Case #2), the UE can transmit a scheduling request (SR) to the BS. To this end, the UE can transmit different SR information according to Case #1 and Case #2. In Case #1, the SR may have the value of '−1'. In Case #2, the SR may have the value of '+1'.

A method for determining the PRG size between multiple PDSCHs will hereinafter be described in detail.

FIG. 9 is a diagram illustrating a method for allowing the UE to receive different PDSCHs from different TRPs according to the present disclosure. Referring to FIG. 9, PDSCH #1 and PDSCH #1 received from the respective TRPs can be received through the same or partially overlapping time/frequency (T/F) resources.

In this case, as shown in FIG. 9, two PDSCHs fully overlap each other in the frequency domain, but the PRG sizes for the respective PDSCHs may be different from each other.

Referring to FIG. 9, the PRG size of PDSCH #0 may be set to 4 RBs, and the PRG size of PDSCH #1 may be set to 2 RBs. In this case, the UE may perform grouping of DMRSs for PDSCH #0 in units of 4 RBs, and may perform channel estimation in units of the group. In contrast, the UE may group DMRSs for PDSCH #1 in units of 2 RBs, and may perform channel estimation in units of the group. When the IRC (Interference Rejection Combining) receiver filter for detecting data of the PDSCH #0 is designed, the UE may use the desired channel (e.g., a channel using a DMRS for PDSCH #0) and the interference channel (e.g., a channel using a DMRS for PDSCH #1). At this time, the receiver filter can be calculated and determined in units of the RE.

For the above-mentioned configuration, the BS may transmit two DCIs respectively scheduling the two PDSCHs to the UE. At this time, if the UE does not detect any one of the two DCIs, unexpected problems may occur.

For example, if the UE does not detect the DCI scheduling PDSCH #1 (e.g., if the UE does not detect the corresponding DCI due to occurrence of channel interference or UE operation errors), the UE can receive only the PDSCH #0. In this case, as shown in FIG. 9, although different interferences occur in the same PRG, the UE cannot recognize occurrence of such interference.

Referring to FIG. 9, whereas 'A' and 'B' shown in FIG. 9(b) are included in the same PRG from the viewpoint of PDSCH #0, it can be recognized that 'A' and 'B' shown in FIG. 9(b) correspond to two different PRGs from the viewpoint of PDSCH #1. If it is possible for the UE to recognize the above situation, the UE can properly cope with the above situation through separate implementation. In contrast, if the UE does not detect some DCIs (e.g., if DCI scheduling PDSCH #1 is not detected and the UE cannot recognize the presence or absence of PDSCH #1), the UE may have difficulty in recognizing difference in interference channel between 'A' and 'B' using the blind scheme. In addition, it may be very difficult for the UE to recognize such difference in interference channel between A and B.

Figure 10:
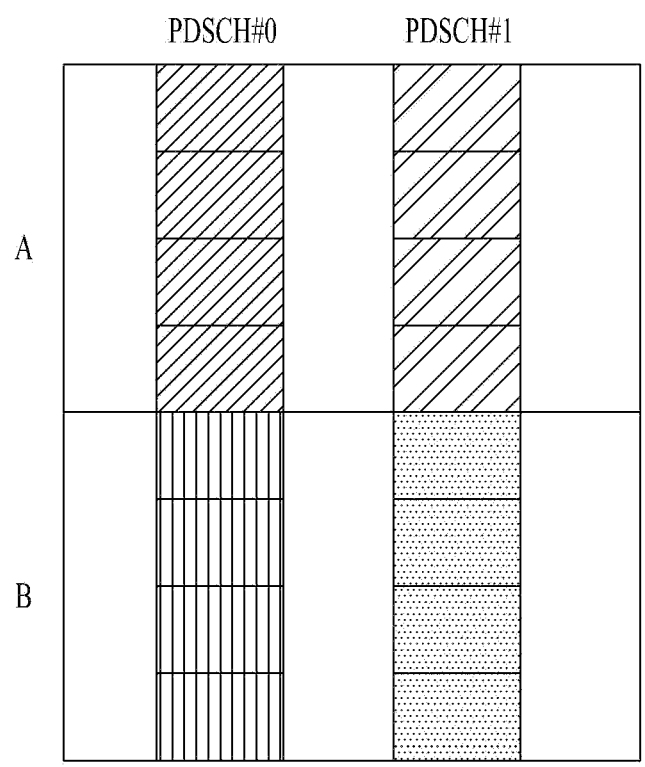
FIG. 10 is a diagram illustrating an example of a case in which different PDSCHs have the same PRG according to the present disclosure.

FIG. 10 is a diagram illustrating an example of the case in which different PDSCHs have the same PRG according to the present disclosure.

Referring to FIG. 10, assuming that two PDSCHs always have the same PRG size, the UE may assume that the interference channel in at least a specific PRG remains unchanged. Therefore, although the UE loses a portion of the DCI, the UE can easily estimate the interference channel.

For example, as shown in FIG. 10, it is assumed that a DMRS port group (or CDM group) for PDSCH #0 and a DMRS port group (or CDM group) for PDSCH #1 are set to {DMRS port #0/#1} and {DMRS port #2/#3}, respectively. In this case, it is assumed that the UE has missed the DCI required to schedule the PDSCH #1. Here, the UE may estimate a desired channel requested by PDSCH #0 in units of 4 RBs using DMRS ports #0 and #1. Based on the above assumption (e.g., it is assumed that two different PDSCHs have the same PRG), the UE may check whether transmission (Tx) signals are present in DMRS port #2 or DMRS port #3 in units of the PRG of the PDSCH #0. In this case, if such checking is performed in units of the PRG, the UE can obtain many more samples, so that the UE can improve the blind detection performance. As a result, even if the UE loses the DCI scheduling the PDSCH #1, the UE can effectively estimate the interference channel caused by the A region and the B region shown in FIG. 10, resulting in an increase in detection performance of the PDSCH #0.

Alternatively, as shown in FIG. 9, it may be impossible for the UE to assume that the two PDSCHs always have the same PRG size. In this case, if the UE loses the DCI scheduling the PDSCH #1, the UE has to perform blind detection of the PDSCH #1 in units of the RB. This is because the UE cannot perform any assumption for the interference channel. In this case, since the unit to be used for interference channel estimation includes 2 RBs, the interference channel estimation performance may be degraded as compared to the above case (e.g., the case in which the unit to be used for interference channel estimation includes 4 RBs).

Figure 11:
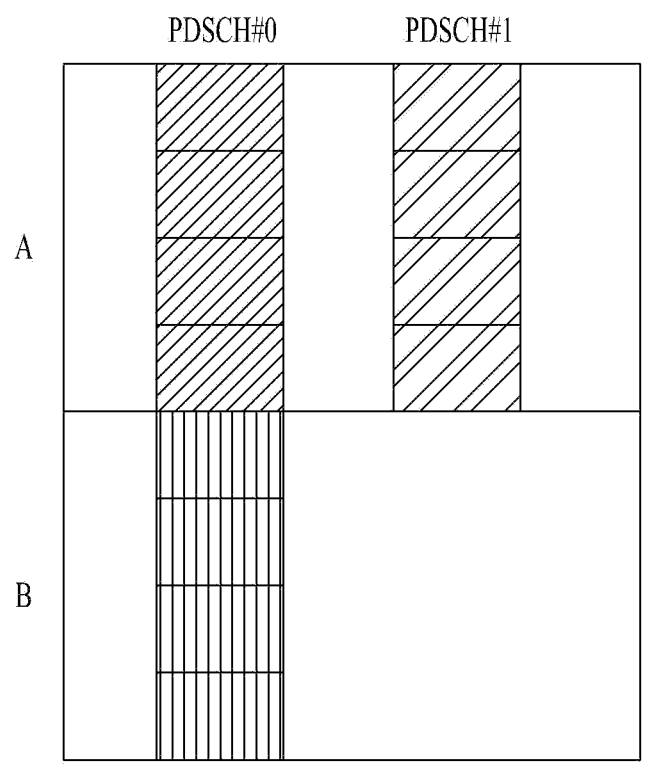
FIG. 11 is a diagram illustrating an example of a case in which different PDSCHs are configured to partially overlap each other according to the present disclosure.

FIG. 11 is a diagram illustrating an example of a case in which different PDSCHs are configured to partially overlap each other according to the present disclosure. Referring to FIG. 11, in the A region, PDSCHs may fully overlap each other on at least a PRG basis. In this case, although the UE loses the DCI scheduling PDSCH #1, the UE can estimate the interference channel in units of the PRG. Therefore, there is a high possibility that the UE can detect the presence of the PDSCH #1 channel acting as the interference channel within the A region and the absence of the PDSCH #1 channel acting as the interference channel within the B region.

2.1. Example of First Operation

If PDSCHs transmitted from different TRPs partially overlap each other in the time/frequency (T/F) resources, the UE may expect that the PRSCHs have the same PRG (or the same PRG size).

In other words, when PDSCHs scheduled by different DCIs (partially) overlap each other in the time/frequency (T/F) resources, the UE may expect that the above PDSCHs have the same PRG (or the same PRG size). The corresponding configuration can be extended and applied to all of the following operation examples to be described below.

2.2. Example of Second Operation

In the first operation example, the UE may expect that different PDSCHs fully overlap each other in units of the PRG, or may expect that different PDSCHs do not overlap each other.

Figure 12:
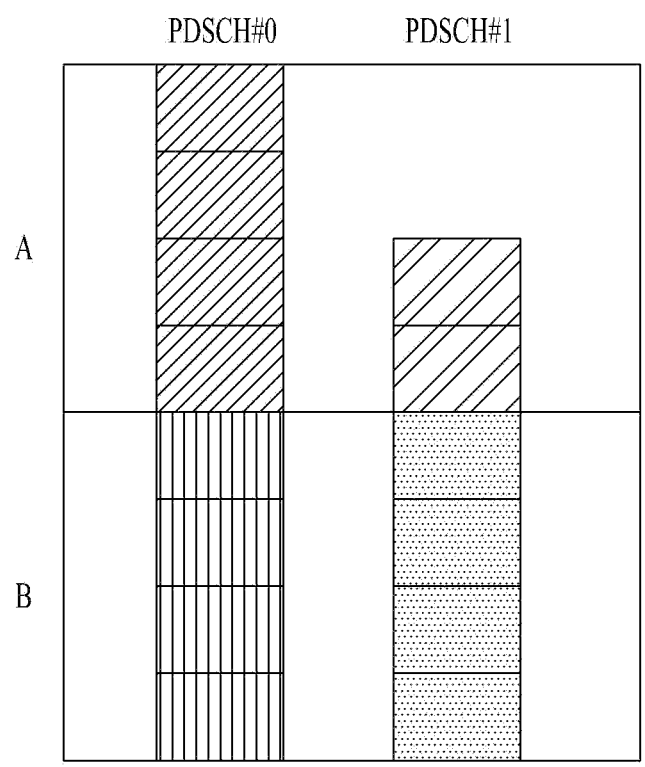
FIG. 12 is a diagram illustrating an example of BS (base station) resource allocation.

FIG. 12 is a diagram illustrating an example of BS (base station) resource allocation, and FIG. 13 is a diagram illustrating an example of a second operation according to the present disclosure.

For example, assuming that the RBG unit includes 2 RBs and the PRG unit includes 4 RBs, the BS can perform resource allocation as shown in FIG. 12. In this case, if the UE loses the DCI scheduling the PDSCH #1, there may occur the problem in which only some parts of PDSCH #1 overlap each other in the A region on the assumption that the PDSCHs have the same PRG. In this case, the UE may have difficulty in determining the presence or absence of PDSCH #1 in the A region and may also have difficulty in estimating the interference channel.

In contrast, according to the second operation example, the BS can configure resources shown in FIG. 13(a) or FIG. 13(b) rather than resource configuration shown in FIG. 12. In this case, although the UE detects the presence or absence of PDSCH #1 and performs interference channel estimation in units of the PRG, the UE may not experience the above-mentioned difficulties.

The second operation example can be extended as follows when two PDSCHs have different PRGs. More specifically, if it is expected that PDSCHs transmitted from different TRPs (partially) overlap each other in T/F resources and the PDSCHs have different PRGs, the UE may expect that the above PDSCHs fully overlap each other or do not overlap each other on the basis of a minimum PRG value from among the PRG values.

Figure 14:
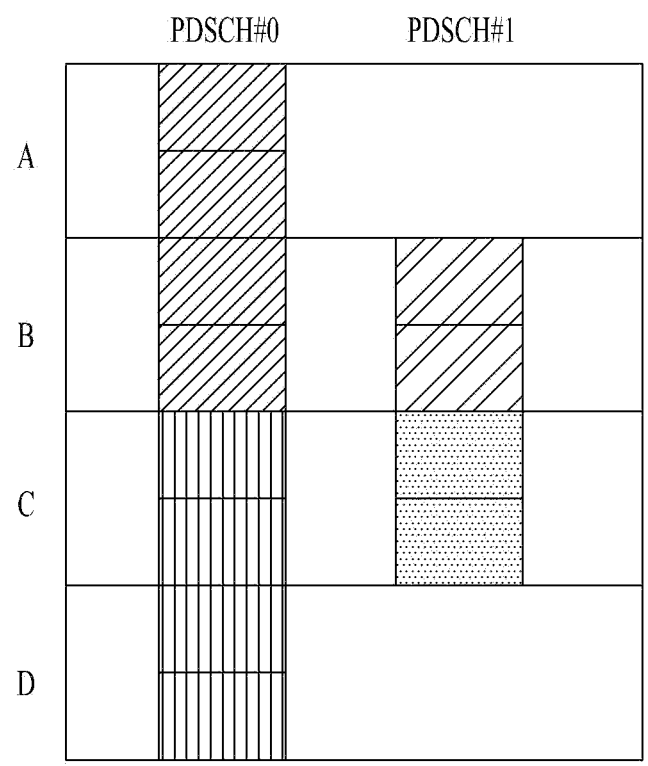
FIG. 14 is a diagram illustrating an example of a second operation according to the present disclosure.

FIG. 14 is a diagram illustrating the second operation example according to the present disclosure.

For example, it is assumed that the PRG of the PDSCH #0 is set to 4 and the UE has lost DCI scheduling the PDSCH #1. At this time, when the UE expects that the PRG size of the PDSCH #1 is set to 2, the UE may expect that two PDSCHs fully overlap each other in units of 2 PRGs or do not overlap each other (e.g., see FIG. 14). In this case, the UE may detect the presence or absence of PDSCH #1 in units of 2 PRGs, and may estimate the interference channel in units of 2 PRGs.

2.3. Example of Third Operation

In the first operation example, the UE may expect that the RBG size is always equal to or larger than the PRG size (excluding the wideband).

The problems of FIG. 12 may occur because the RBG size is larger than the PRG size. Therefore, as shown in the third operation example, if the UE expects that the RBG size is always equal to or larger than the PRG size (excluding the wideband), the problems of FIG. 12 may no longer be generated. For example, if the RBG size is set to 4, the BS cannot support the resource configuration as shown in FIG. 12, and can support only the resource configuration as shown in FIG. 13.

2.4. Example of Fourth Operation

If PDSCHs transmitted from different TRPs (partially) overlap each other in time/frequency (T/F) resources and the PRG of one PDSCH indicates 'wideband', the UE can expect that the PRG of another PDSCH is set to 2 (or 4). In addition, the UE can expect that different PDSCHs fully overlap each other in units of 2 PRGs (or 4 PRGs).

Figure 15:
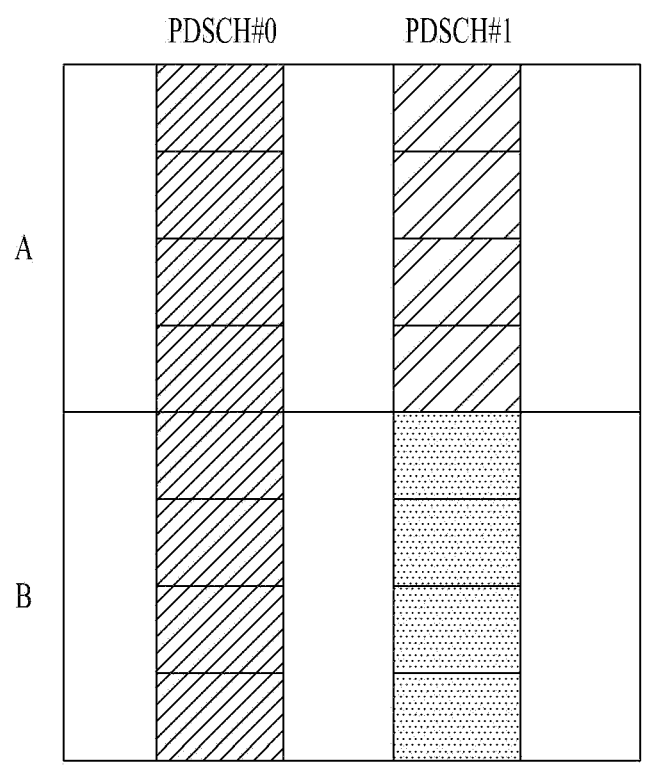
FIGS. 15 to 17 are diagrams illustrating examples of BS resource allocation.
Figure 16:
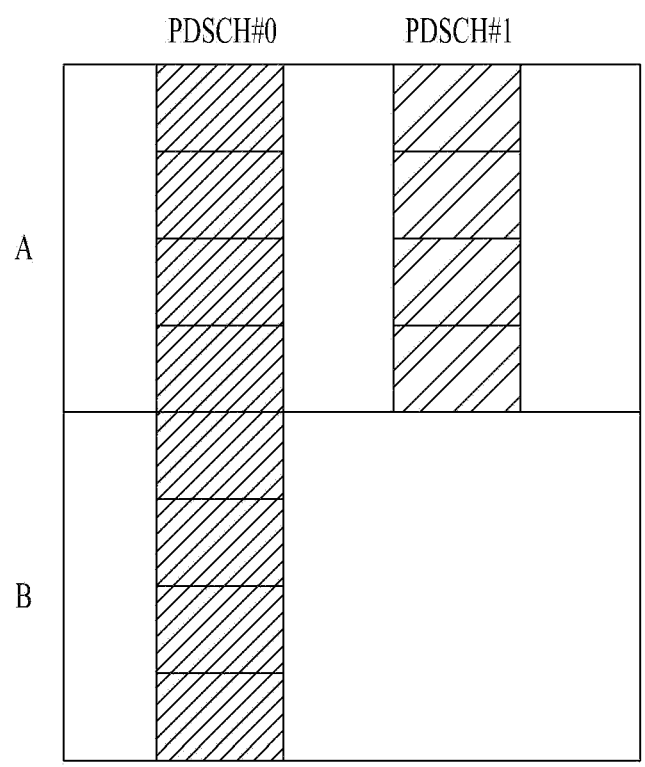
Figure 17:
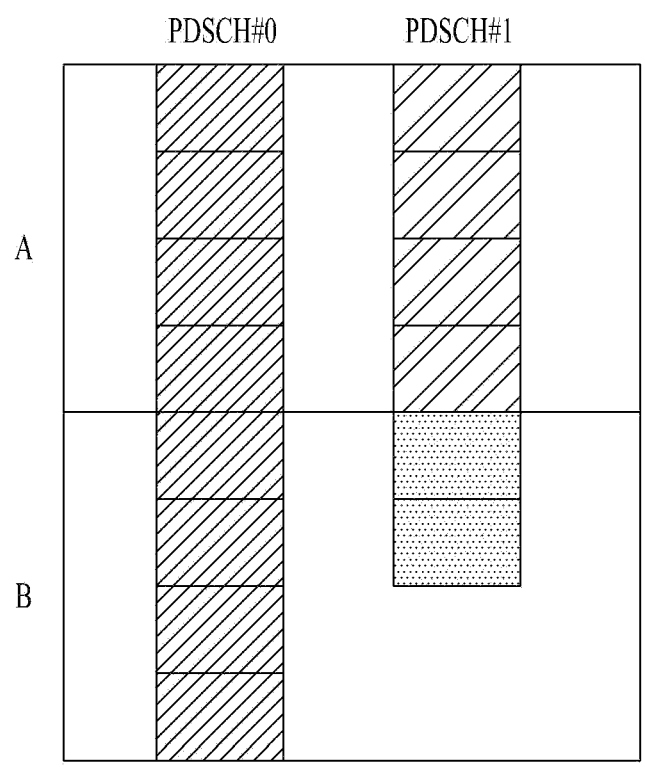

FIGS. 15 to 17 are diagrams illustrating examples of BS resource allocation.

In FIG. 15, it is assumed that the PRG of PDSCH #0 is set to 'wideband' and the PRG of PDSCH #1 is set to '4'. According to the above-mentioned first and second operations, two PDSCHs (i.e., PDSCH #0 and PDSCH #1) must have the same PRG, so that the PRG may be excessively restricted from the viewpoint of PDSCH #1, and system throughput may be affected by such restriction.

On the other hand, as shown in FIG. 16, whereas the UE can satisfy the above first operation example, the UE cannot satisfy the second operation example. Thus, when the UE performs blind detection of PDSCH #1 in the B region shown in FIG. 16, it is impossible to guarantee the UE performance. In order to guarantee the UE performance, the frequency domain of the PDSCH #1 and the frequency domain of the PDSCH #1 must fully overlap each other.

The fourth operation example according to the present disclosure illustrates a method for mitigating (or relaxing) restrictions on the PRG and the frequency domain.

In the first example, when the PRG of PDSCH #0 is set to 'wideband' and the UE has lost the DCI scheduling the PDSCH #1 as shown in FIG. 15, the UE may expect that the PRG of the PDSCH #1 is set to 4.

In the second example, when the PRG of PDSCH #0 is set to 'wideband' and the UE has lost the DCI scheduling the PDSCH #1 as shown in FIG. 16, the UE may expect that the PRG of PDSCH #1 is set to 4.

On the other hand, FIG. 16 shows that two PDSCHs fully overlap each other in the frequency domain in units of at least 4 PRGs. Accordingly, the UE may not expect resource allocation as shown in FIG. 17.

2.5. Example of Fifth Operation

If PDSCHs transmitted from different TRPs (partially) overlap each other in time/frequency (T/F) resources and the PRG of one PDSCH indicates 'wideband', the UE can expect that the PDSCHs fully overlap each other in the frequency domain and all the PRGs of the PDSCHs are equally set to 'wideband'.

2.6. Example of Sixth Operation

If PDSCHs transmitted from different TRPs (partially) overlap each other in time/frequency (T/F) resources, the UE can expect that different PDSCHs fully overlap each other in units of 2 PRBs (or 4 PRBs).

Figure 19:
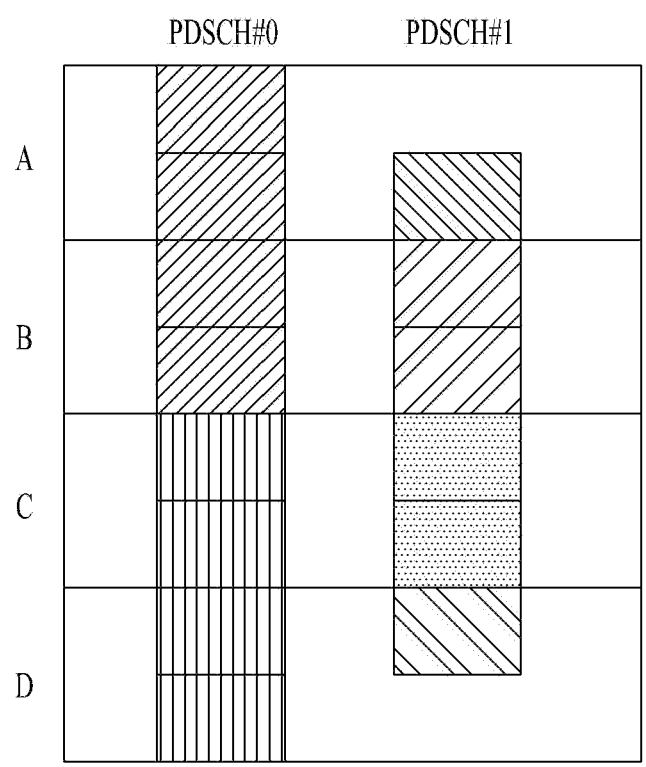

FIGS. 18 and 19 are diagrams illustrating examples of BS resource allocation.

In the present disclosure, the PRG size may have a minimum size corresponding to 2 PRGs. Accordingly, even when the UE has lost the DCI scheduling the PDSCH #1, the UE can expect that the PRG of the PDSCH #1 is set to 2. In FIG. 18, the above-described UE assumption may be considered useful in detecting the presence or absence of PDSCH #1 as well as in searching for the interference channel.

Specifically, according to 'resource allocation Type 0' defined in the NR Rel-15 standard documents, a minimum unit of the RBG is set to 2, so that the above-described assumption may always be valid.

In contrast, according to 'resource allocation type 1' defined in the NR Rel-15 standard documents, resource allocation shown in FIG. 18 can be made available. In this case, the above-described UE assumption may negatively affect the analog-to-digital (A/D) region.

Therefore, according to the sixth operation example, the BS can support the same resource allocation as in FIG. 18 (e.g., FIG. 18(*a*) or FIG. 18(*b*)) instead of the resource allocation shown in FIG. 19.

2.7. Example of Seventh Operation

If PDSCHs transmitted from different TRPs (partially) overlap each other in time/frequency (T/F) resources and resources are allocated based on "resource allocation type 0", and if the RBG size is equal to or larger than 4, the UE may not expect "RBG size=2". In contrast, if the RBG size is 2, the UE may expect that different PDSCHs fully overlap each other in the frequency domain on a PRG basis. In addition, if the RBG size is equal to or greater than 4, the UE may expect that different PDSCHs fully overlap each other or do not overlap each other in the frequency domain in units of 4 PRGs.

According to the above-described operation examples, the available PRG size based on the RBG size is as follows.
(If RBG size=2) PRG size=4, wideband
(If RBG size=4) PRG size=4, wideband
(If RBG size>4) PRG size=4, wideband In the present disclosure, if the RBG size is equal to or greater than 4, the UE may expect that different PDSCHs fully overlap each other in the frequency domain in units of 4 PRGs. Therefore, even when the UE has lost the DCI scheduling the PDSCH #1, the UE can expect that the PRG of PDSCH #1 is always set to 4 as shown in FIGS. 10 and 11.

2.8. Additional Embodiment 1

The present disclosure discloses a PRB bundling size between the plurality of PDSCHs and detailed examples of resource allocation methods. In this case, the plurality of PDSCHs can be defined as follows. For example, the plurality of PDSCHs may be constructed in a manner that time/frequency resources of PDSCHs respectively scheduled by the DCIs included in at least two different search spaces (or CORESETs) supplied to one UE can partially or fully overlap each other.

If time/frequency resources of two PDSCHs partially or fully overlap each other, the UE may assume that precoding of another PDSCH remains unchanged in the PRG of only one PDSCH. In this case, the UE may estimate the interference channel in units of PRGs, so that the interference channel estimation performance can increase whereas UE complexity can decrease. To this end, as described above, the first to seventh operation examples may be considered available.

In the present disclosure, a method for enabling the UE to implement interference channel estimation through restrictions of both the PRB bundling size between the PDSCHs and such resource allocation according to the multi-TRP transmission method can be more easily defined. To this end, some operation examples from among the above-described operation examples can be simultaneously applied to the present disclosure.

In the present disclosure, the above-described operation examples can be applied only to one case in which the PRG size is set to 2 RBs or 4 RBs, and may not be applied to the other case in which PRG is set to WB (wideband).

If the PRG is set to WB, the entire RB to which PDSCH is transmitted can be defined as one PRG. In this case, according to the second operation example, two PDSCHs should be correctly allocated to the same RB (i.e., fully overlapped) or should be allocated to different RBs having no intersection portion (i.e., non-overlapped). If two TRPs have difficulty in dynamic coordination over a non-ideal backhaul, this resource allocation may be considered impossible.

Thus, if the PRG is set to WB, and if PRGs of two TRPs are different from each other, it may be desirable that no other restriction be applied to the resource allocation method. Alternatively, during the multi-TRP transmission, the UE may not expect that the PRG is not set to WB, so that the PRG may not be set to WB by the BS as needed.

In the present disclosure, the first operation example and the second operation example can be redefined as follows. In the following description, although PRG is set to 2 or 4 (i.e., PRG=2 or 4), it should be noted that the corresponding structure can also be extended to the other case denoted by 'PRG=WB'.

1) The UE does not expect that the precoding of one PDSCH has a PRG-level grid different from that of another PDSCH where the PRG size is set to 2 or 4 (The UE does not expect the precoding of one PDSCH to be different in the PRG-level grid of another PDSCH with PRG=2 or 4).

2) The UE may not expect that the PRG size related to resources of one PDSCH is not allocated to both the PRG-level grid and another PDSCH having 'PRG size=2 or 4'. (The UE does not expect the resource allocation of one PDSCH to be misaligned in the PRG-level grid of another PDSCH with 'PRG=2 or 4').

3) In the present disclosure, 'prb-BundlingType IE' included in 'PDSCH-Config IE' can be constructed as shown in the following table. In this case, considering that the PRG sizes of different PDSCHs are set to 2 or 4, the following structure may be considered available.

TABLE 29

| | |
|---|---|
| prb-BundlingType | CHOICE { |
|     staticBundling |     SEQUENCE { |
|         bundleSize |         ENUMERATED { n4, wideband } |
| OPTIONAL -- Need S | |
| }, | |
|     dynamicBundling |     SEQUENCE { |
|         bundleSizeSet1 |         ENUMERATED { n4, wideband, n2-wideband, n4-wideband ) OPTIONAL, -- Need S |
|         bundleSizeSet2 |         ENUMERATED {n4, wideband } |
| OPTIONAL -- Need S | |
|     } | |
| }, | |

For example, in the case of 'staticBundling', the plurality of PDSCHs may always have the same bundling size. Therefore, the above-described problem may not occur.

As another example, in the case of 'dynamicBundling', 'bundleSizeSet1' may include 'n2-wideband', so that the above-described problem may occur. Therefore, the UE supporting multiple DCIs (or if PDSCHs transmitted from different TRPs (partially) overlap each other in the time/frequency (T/F) domains, the UE may not expect that 'n2-wideband' is configured in 'bundleSizeSet1'. Alternatively, as described above, the UE may not expect that 'n2-wideband' is configured in 'bundleSizeSet1' and at the same time 'n4' is configured in 'bundleSizeSet2'

According to the above-described construction, the operation in which 'PRG=2' and'PRG=4' are respectively configured for the PDSCHs can be prevented.

2.9. Additional Embodiment 2

In the present disclosure, PRG bundling sizes of two TRPs may be configured to be different from each other.

Figure 20:
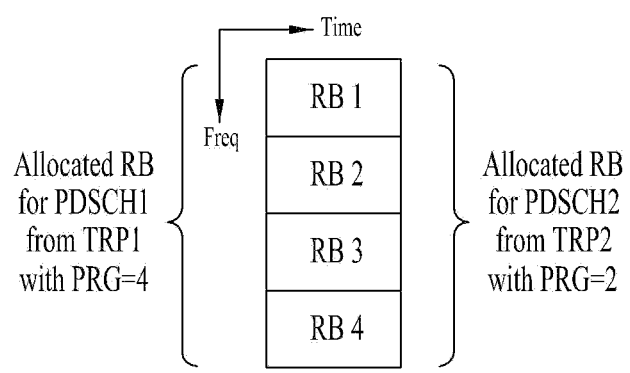
FIG. 20 is a diagram illustrating one example of different PRGs configured between two TRPs (Transmission Reception Points).

FIG. 20 is a diagram illustrating one example of different PRGs configured between two TRPs (Transmission Reception Points). In FIG. 20, it is assumed that a PRG for the first TRP is set to 4 and a PRG for the second TRP is set to 2.

In FIG. 20, when DPSCH is allocated to one PRG (e.g., 4 RBs), the UE must calculate two different interference covariance matrices to determine a minimum mean square error (MMSE) RX filter. This is because the precoder of PDSCH2 for RB1 and RB2 and the precoder of PDSCH2 for RB3 and RB4 are different from each other. In this case, when the UE calculates a single covariance matrix for the PRG, the Rx filter is not optimized so that interference between layers may not be sufficiently mitigated.

Referring to FIG. 20, when the PRG is set to 2 or 4, UE complexity may increase to calculate multiple interference covariance matrices for each PRG. On the other hand, if the PRG is set to WB, the UE may require a plurality of interference covariance matrices for only one PRG so as to increase IRC performance. If the PRG size is set to 2 or 4, precoding of PDSCH2 should be identical to precoding for each PRG of PDSCH 1 so as to calculate only one interference covariance matrix in each PRG. In order to guarantee the above-described condition, the following alternatives can be considered.

Alt 1 (First Alternative): If PRG of PDSCH is set to 2 or 4, the precoding of the PDSCH that partially overlaps with another fully/partially overlapped PDSCH should be the same in each PRG. In other words, when the PRG of the PDSCH is 2 or 4, the precoding of another fully/partially overlapped PDSCH should be the same in each PRG.

Alt 2 (Second Alternative): If PRG of PDSCH is set to 2 or 4, this PRG should be the same as a PRG of another fully/partially overlapped PDSCH. That is, when PRG of PDSCH is 2 or 4, this PRG should be the same as a PRG of another fully/partially overlapped PDSCH.

A difference between Alt 1 and Alt 2 is a scheduling flexibility. In Alt 1, a combination of PRGs available for two PDSCHs may be selected from among (2,2), (2,WB), (4,4), (4,WB), and (WB, WB). In contrast, in Alt 2, a combination of PRGs available for two PDSCHs may be selected from among (2,2), (4,4), and (WB, WB).

In Alt 1, dynamic switching of the PRG value can be achieved in a non-ideal backhaul scenario. For example, when the first TRP dynamically configures PRG={4, WB}, the second TRP can dynamically configure PRG={4, WB}. In contrast, in the non-ideal backhaul scenario, dynamic switching of the PRG value for the second alternative (Alt 2) may be considered impossible.

In the present disclosure, the code point '0' of the PRG bundling size indicator having the size of 1 bit within the DCI may be semi-statically set to 4 or WB, and the code point '1' of the PRG bundling size indicator may be semi-statically set to 4, WB, 2/WB or 4/WB. Thus, the PRG bundling size indicator having the size of 1 bit can be selected from among (4, WB), (4, 2/WB), (4, 4/WB), (WB, 4), and (WB, 2/WB). If the network semi-statically configures '4' for the code point '0' and does not configure '2/WB' for the code point '1', Alt 1 can be satisfied.

Figure 21:
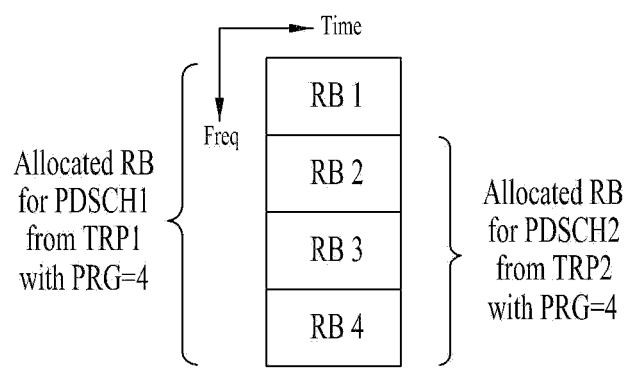
FIG. 21 is a diagram illustrating another example of different PRGs configured between two TRPs (Transmission Reception Points).

FIG. 21 is a diagram illustrating another example of different PRGs configured between two TRPs (Transmission Reception Points). In FIG. 21, it is assumed that the PRG for the first TRP is set to 4 and the PRG for the second TRP is set to 4.

Although Alt 1 or Alt 2 is satisfied, the UE has to calculate multiple covariance matrices in the exemplary case denoted by 'Resource allocation type 1' as shown in FIG. 21. In FIG. 21, whereas the precoder of PDSCH 2 is equally applied to resource blocks (RB2, RB3, RB4), PDSCH 2 may not be transmitted for 'RB1'. As a result, when PDSCH 1 allocated to one PRG (e.g., 4 RBs) is decoded, the UE has to calculate two different interference covariance matrices to determine the MMSE Rx filter. In order to calculate a single interference covariance matrix included in each PRG under the condition that the PRG is set to 2 or 4, not only Alt1 and Alt2 but also other additional conditions should be satisfied. The additional conditions may indicate that, when PRG of PDSCH is set to 2 or 4, resources of the fully/partially overlapped PDSCH should fully overlap each other within each PRG or should not overlap each other within each PRG. In the case of 'Resource allocation type 0', if PRG is set to 2 or 4, RBG is always equal to or greater than PRG, so that the above-described problems may not occur.

Based on the above-described facts, in the case of the fully/partially overlapped resource allocation, when PRG of PDSCH is set to 2 or 4, the precoding of other fully/partially PDSCHs should be the same in each PRG, and allocated resources of the overlapped PDSCHs should fully overlap each other in each PRG or should not overlap each other in each PRG.

Figure 22:
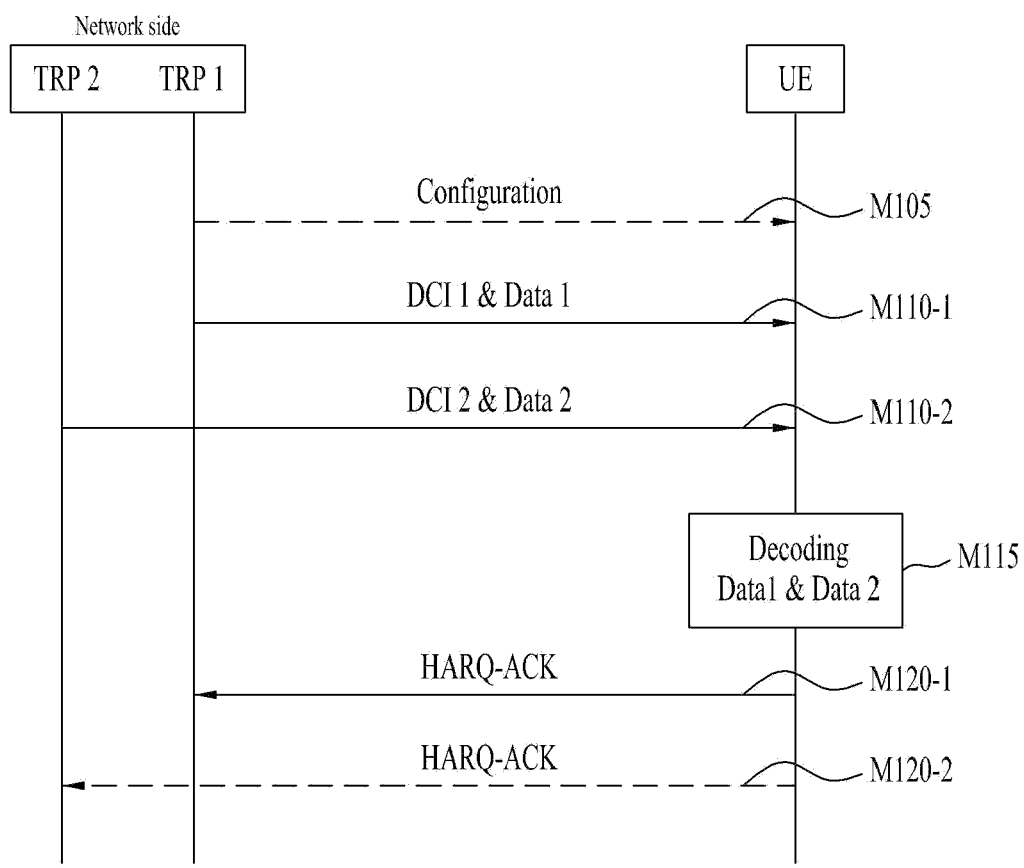
FIGS. 22 and 23 are flowcharts illustrating examples of a signaling method between a network side and the UE in a situation of multiple TRPs to which methods of the present disclosure can be applied.
Figure 23:
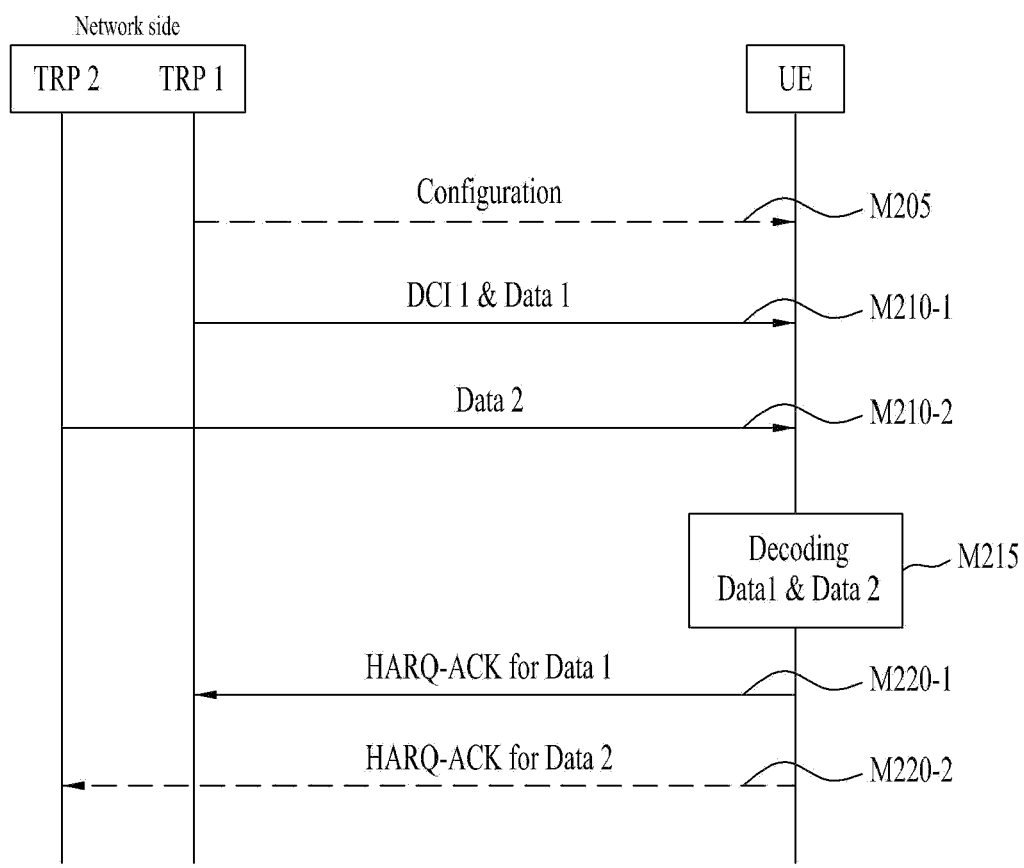

FIGS. 22 and 23 are flowcharts illustrating examples of a signaling method between a network side (e.g., TRP 1 and TRP 2) and the UE in a situation of multiple TRPs (e.g., M-TRP or multiple cells, all TRPs may be referred to as the term 'cell') to which methods of the present disclosure can be applied.

In FIGS. 22 and 23, although signaling between the UE and two TRPs can be used for convenience of description, it should be noted that the corresponding signaling method can also be extended to other signaling between TRPs and UEs as necessary. In the following description, the network side may refer to one BS including the plurality of TRPs, or may refer to one cell including the plurality of TRPs.

In more detail, FIG. 22 illustrates a signaling method for use in the case where the UE receives multiple DCIs (e.g., in a situation where each TRP transmits a DCI to the UE) in the M-TRP (or cell) situation (hereinafter, all TRPs can be replaced with the cell).

The UE can perform the initial access operation (e.g., SS/PBCH block reception, RACH preamble transmission, etc.) for initial access.

The UE may receive configuration information for multiple TRP (M-TRP) based Tx/Rx (transmission/reception) configuration information from the TRP 1 (and/or the TRP 2) (M105). The configuration information may include information related to the network side structure (e.g., TRP structure), resource allocation related to the M-TRP based Tx/Rx operation, and the like. At this time, the configuration information can be transmitted through higher layer signaling (e.g., RRC signaling, MAC-CE, etc.). In addition, when the configuration information is predefined or configured, the corresponding step may be omitted as necessary.

Then, the UE may receive DCI 1 and Data 1 scheduled by the DCI 1 from the TRP 1 (M110-1). In addition, the UE may receive DCI 2 and Data 2 scheduled by the DCI 2 from the TRP 2 (M 110-2). For example, each TRP may apply the above-described methods (Section B, Section C, Section D) to the process of transmitting DCI/Data, and the UE may receive DCI/Data based on the above-described methods (Section B, Section C, Section D).

In addition, DCI (e.g., DCI 1 and DCI 2) and Data (e.g., Data 1 and Data 2) can be transmitted through a control channel such as a PDCCH and a data channel such as a PDSCH, respectively. In addition, steps M110-1 and M110-2 may be simultaneously performed, or any one of the steps M 110-1 and M 110-2 may be performed earlier than the other step.

Thereafter, the UE may decode Data 1 and Data 2 received from TRP 1 and TRP 2 (M115). For example, the UE may decode Data 1 and Data 2 based on the above-described methods (Sections B, C, and D).

Then, the UE may transmit HARQ-ACK information (e.g., ACK information, NACK information, etc.) for Data 1 and/or Data 2 to the TRP 1 and/or the TRP 2 (M120-1 and M120-2). In this case, HARQ-ACK information for Data 1 and HARQ-ACK information for Data 2 can be combined into one. In addition, the UE may be configured to transmit only HARQ-ACK information for the representative TRP (e.g., TRP 1), and may be configured to omit the process of transmitting HARQ-ACK information to another TRP (e.g., TRP 2).

In this regard, the TRP and/or UE operations can be implemented by the following device to be described below. For example, the TRP may correspond to a transmitter, and the UE may correspond to the receiver, and vice versa.

Specifically, FIG. 23 illustrates a signaling method for use in the case where the UE receives a single DCI (e.g., in a situation where one TRP transmits DCI to the UE) in the M-TRP (or M-cell) situation (hereinafter, all TRPs can be replaced with the cell). In FIG. 23, it is assumed that TRP 1 is a representative TRP configured to transmit DCI.

The UE may perform the initial access operation for initial access.

The UE may receive configuration information for multiple TRP (M-TRP) based Tx/Rx (transmission/reception) configuration information from the TRP 1 (and/or the TRP 2) (M205). The configuration information may include information related to the network side structure (e.g., TRP structure), resource allocation related to the M-TRP based Tx/Rx operation, and the like. At this time, the configuration information can be transmitted through higher layer signaling (e.g., RRC signaling, MAC-CE, etc.). In addition, when the configuration information is predefined or configured, the corresponding step may be omitted as necessary.

Then, the UE may receive DCI and Data 1 scheduled by the DCI from the TRP 1 (M210-1). In addition, the UE may receive Data 2 from the TRP 2 (M210-2). Here, DCI may be configured to be used for scheduling both of Data 1 and Data 2. For example, each TRP may apply the above-described methods (Section B, Section C, Section D) to the process of transmitting DCI/Data, and the UE may receive DCI/Data based on the above-described methods (Section B, Section C, Section D).

In addition, DCI and Data (e.g., Data 1 and Data 2) can be transmitted through a control channel such as a PDCCH and a data channel such as a PDSCH, respectively. In addition, steps M210-1 and M210-2 may be simultaneously performed, or any one of the steps M210-1 and M210-2 may be performed earlier than the other step.

Thereafter, the UE may decode Data 1 and Data 2 received from TRP 1 and TRP 2 (M215). For example, the UE may decode Data 1 and Data 2 based on the above-described methods (Sections B, C, and D).

Then, the UE may transmit HARQ-ACK information (e.g., ACK information, NACK information, etc.) for Data 1 and/or Data 2 to the TRP 1 and/or the TRP 2 (M220-1 and M220-2). In this case, HARQ-ACK information for Data 1 and/or HARQ-ACK information for Data 2 may be combined into one, or may be separated from each other. In addition, the UE may be configured to transmit only HARQ-ACK information for the representative TRP (e.g., TRP 1), and may be configured to omit the process of transmitting HARQ-ACK information to another TRP (e.g., TRP 2).

Figure 24:
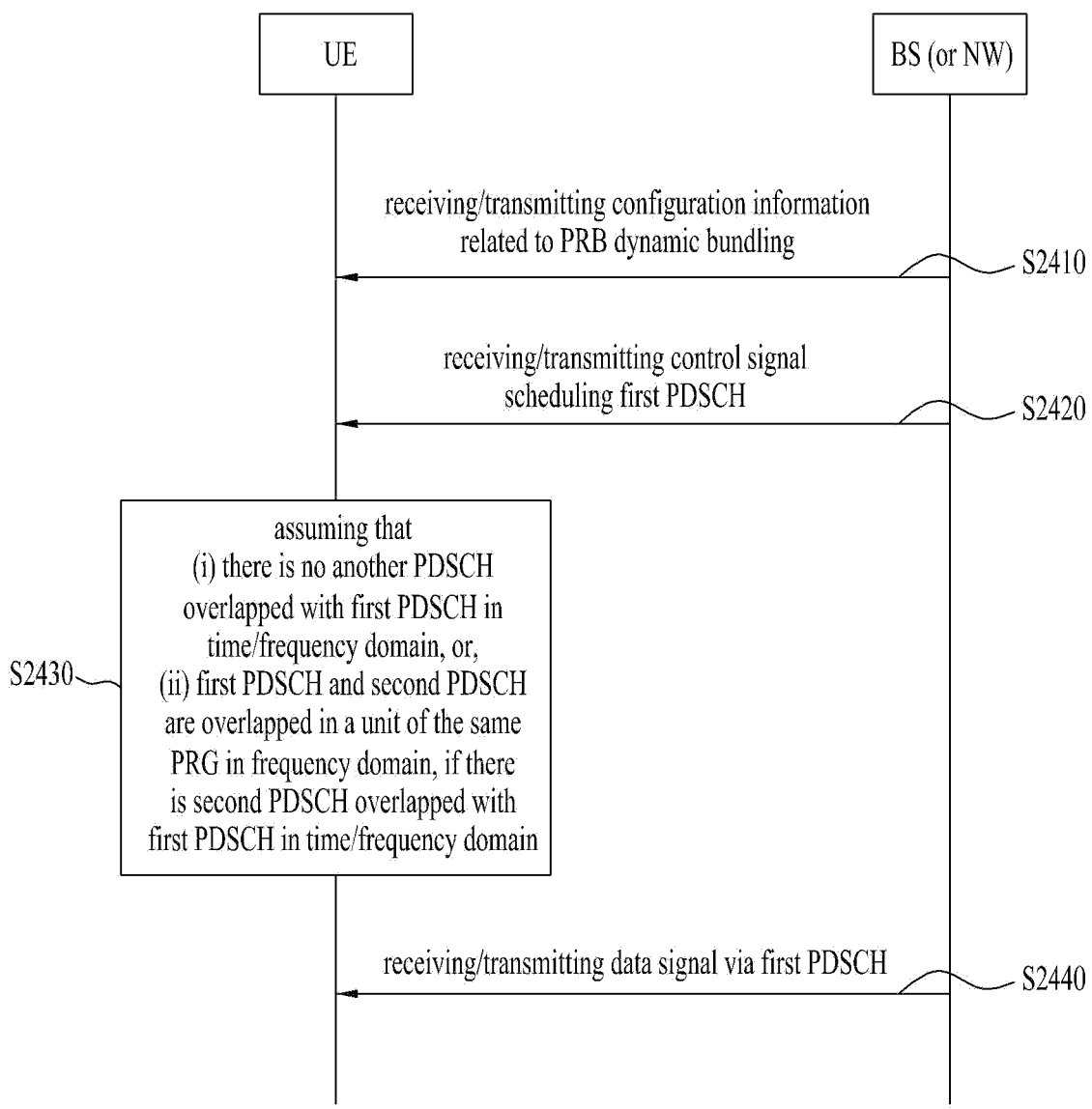
FIG. 24 is a flowchart illustrating UE and BS operations according to one example of the present disclosure.
Figure 25:
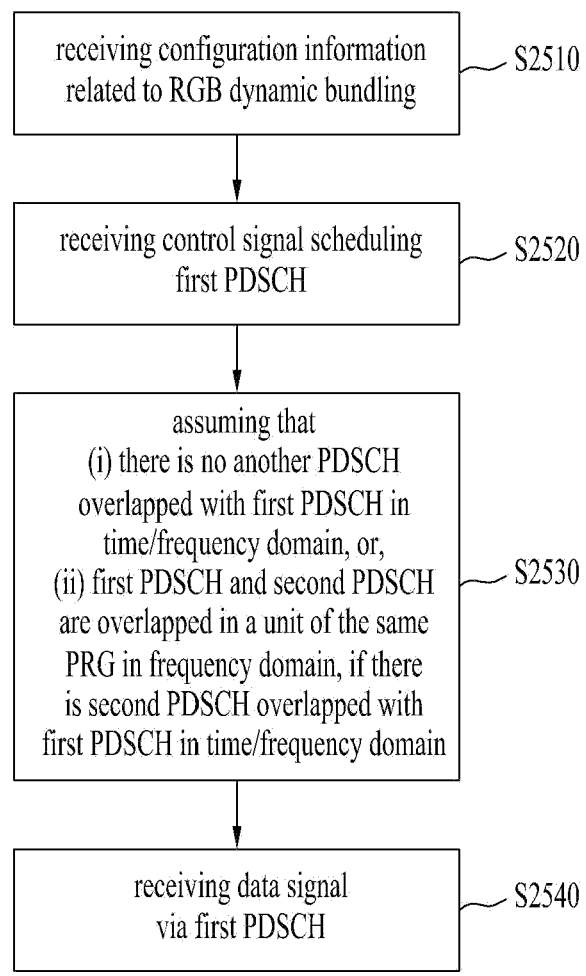
FIG. 25 is a flowchart illustrating UE operation according to one example of the present disclosure.
Figure 26:
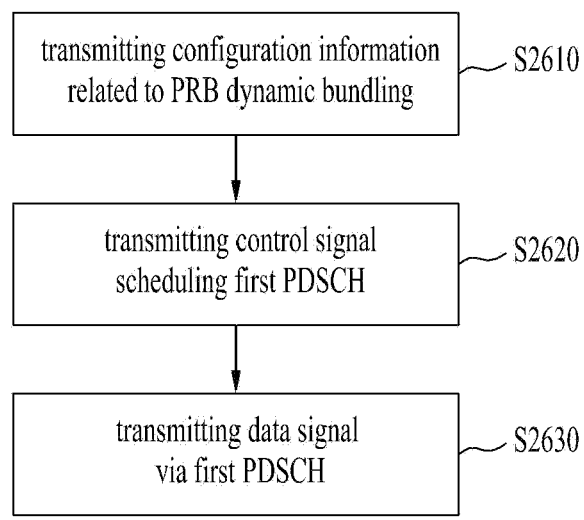
FIG. 26 is a flowchart illustrating BS operation according to one example of the present disclosure.
Figure 27:
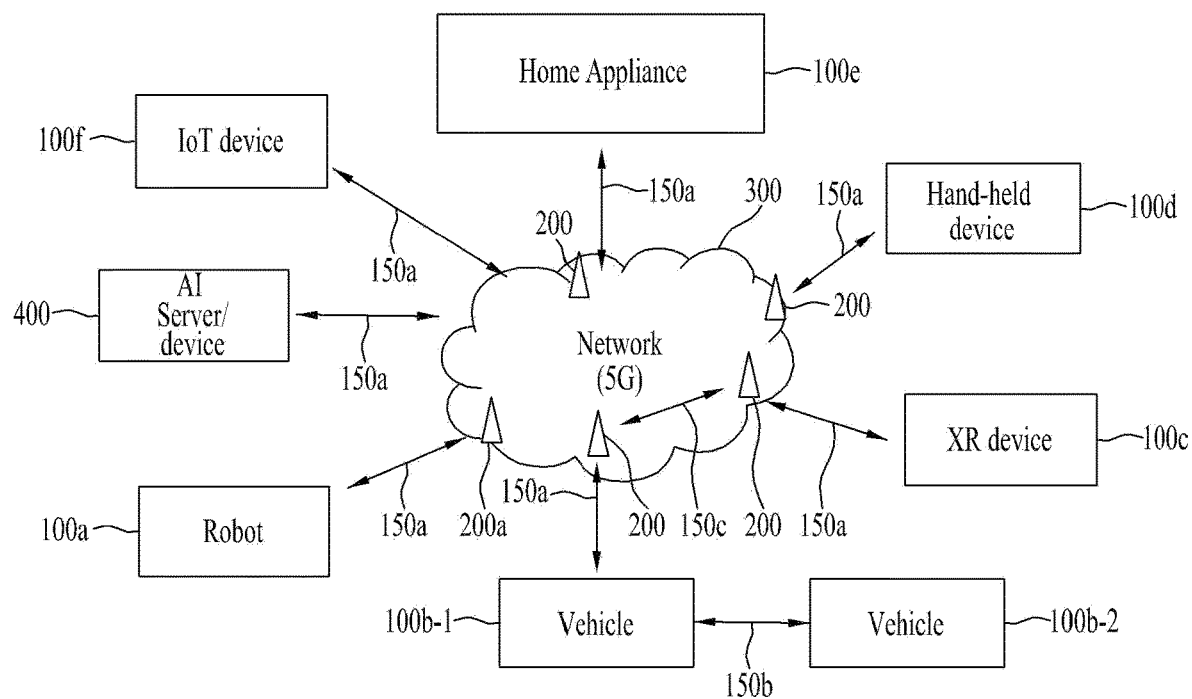
FIG. 27 illustrates a communication system applied to the present disclosure.
Figure 28:
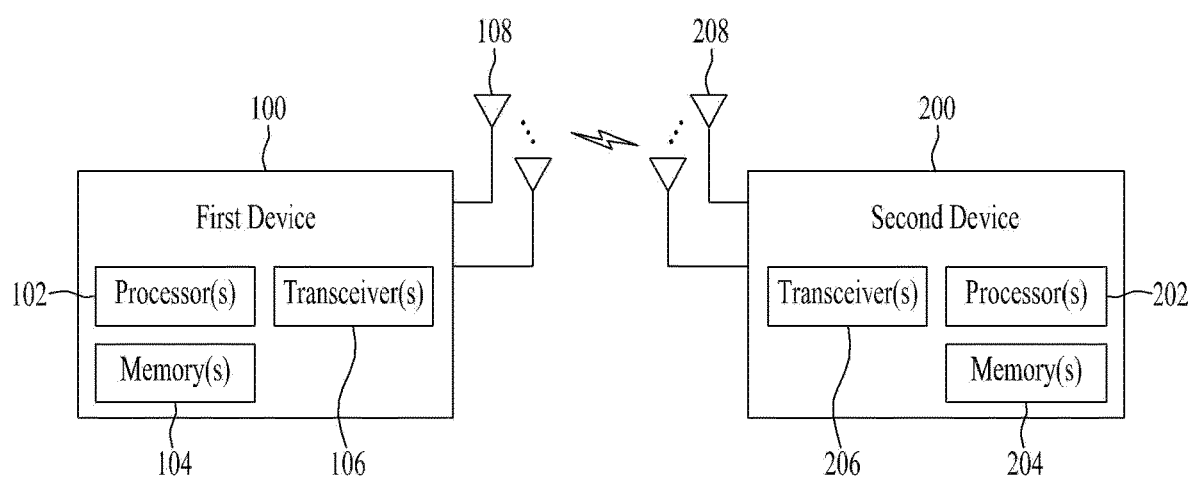
FIG. 28 illustrates wireless devices applicable to the present disclosure.
Figure 29:
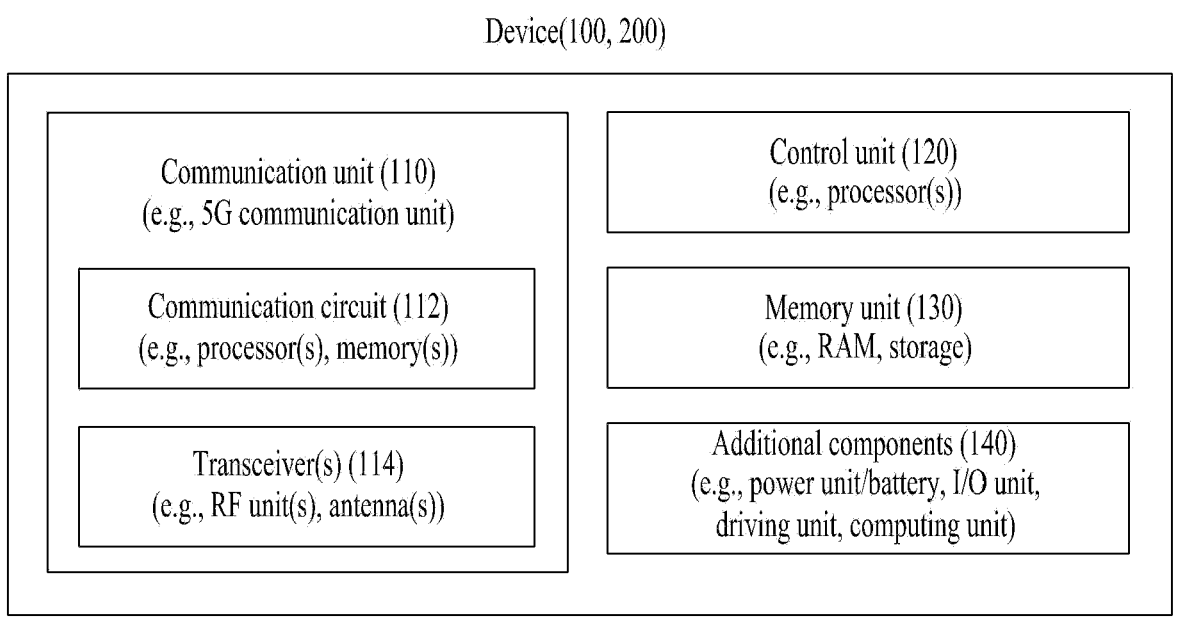
FIG. 29 illustrates another example of a wireless device applied to the present disclosure.
Figure 30:
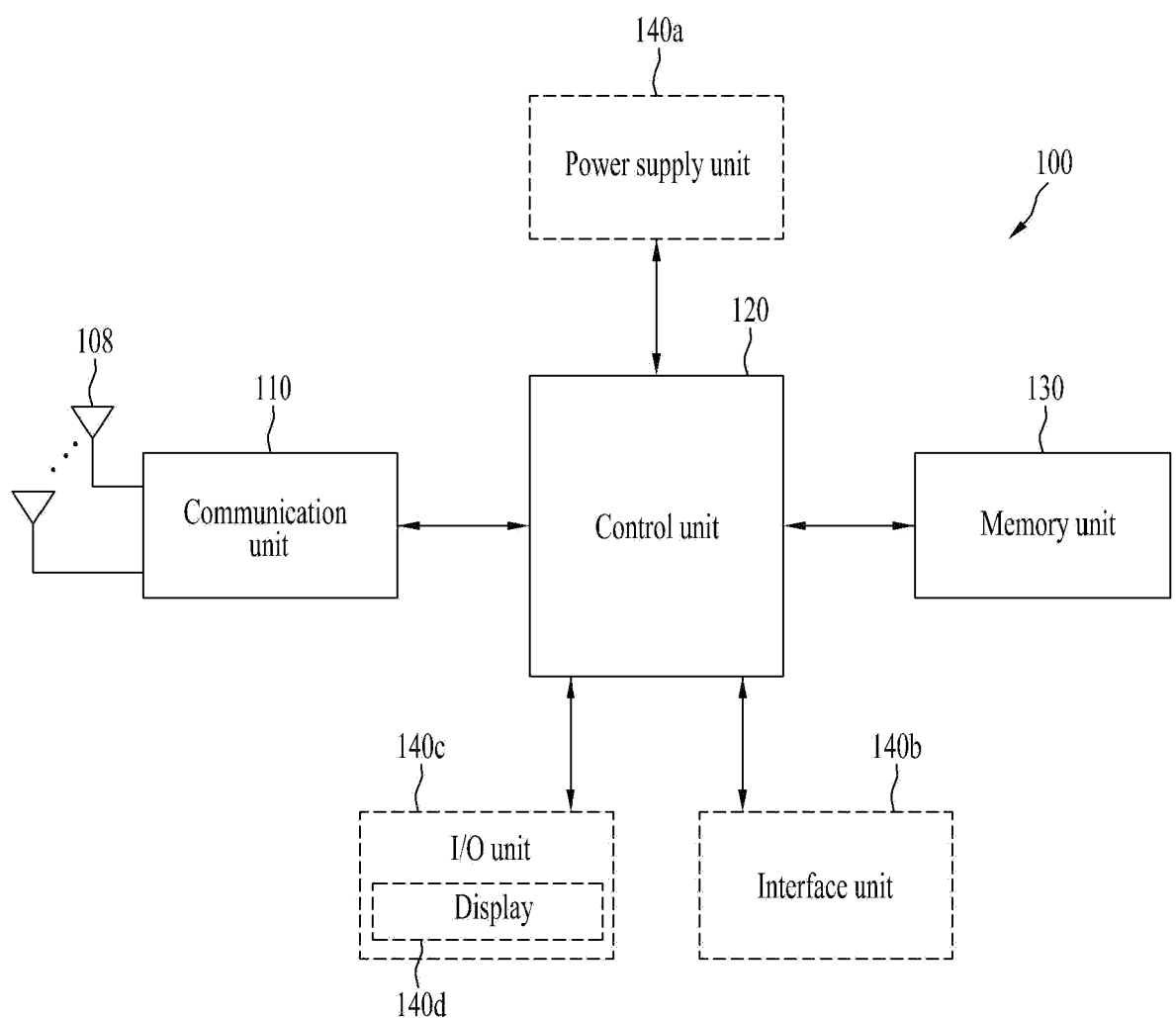
FIG. 30 illustrates a hand-held device applied to the present disclosure.
Figure 31:
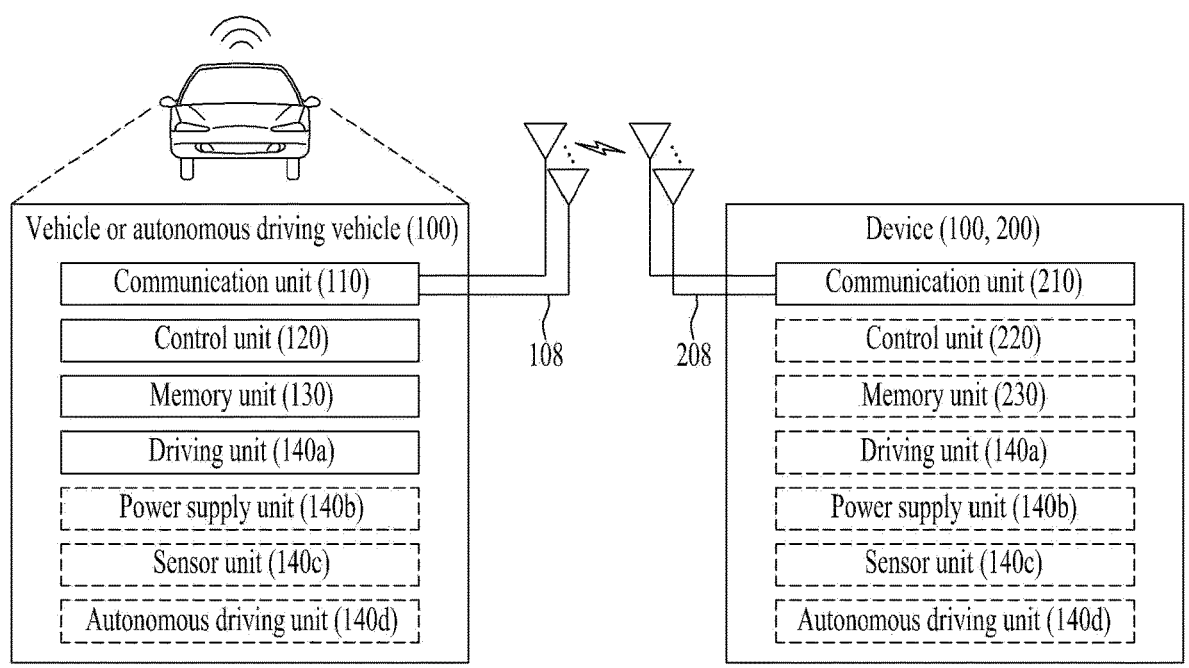
FIG. 31 illustrates a vehicle or an autonomous driving vehicle applied to the present disclosure.

FIG. 24 is a flowchart illustrating UE and BS operations according to one example of the present disclosure. FIG. 25 is a flowchart illustrating UE operation according to one example of the present disclosure. FIG. 26 is a flowchart illustrating BS operation according to one example of the present disclosure.

The UE may receive, from the BS, configuration information related to dynamic bundling for the precoding resource block (PRB) (S2410 and S2510). As a result, the BS may transmit configuration information related to PRB dynamic bundling to the UE (S2410 and S2610).

In the present disclosure, the configuration information may include any one from among the following configuration information:
- first bundling size configuration information indicating that the size of dynamic bundling is 2 PRBs,
- second bundling size configuration information indicating that the size of dynamic bundling is 4 PRBs, and
- third bundling size configuration information indicating that the size of dynamic bundling is WB (wideband).

The UE may receive a control signal (e.g., first DCI) for scheduling a first PDSCH from the BS (S2420 and S2520), so that the BS can transmit the control signal to the UE (S2420 and S2620).

Based on the above configuration information and the above control signal (e.g., first DCI), (i) if another PDSCH overlapping the first PDSCH does not exist in the time domain and the frequency domain, or (ii) if the second PDSCH overlapping the first PDSCH exists in the time domain and the frequency domain, the UE may assume that the first PDSCH and the second PDSCH overlap each other in units of PRGs (PRB groups) having the same size (S2430 and S2530).

Based on the above-described assumption, the UE may receive a data signal from the BS through the first PDSCH (S2440 and S2540), so that the BS can transmit the data signal to the UE though the first PDSCH (S2440 and S2630).

Moreover, the BS may transmit a (additional) control signal (e.g., second DCI) for scheduling the second PDSCH for either the UE or another UE. In this case, based on the above configuration information, the first DCI, and the second DCI, (i) if the first PDSCH and the second PDSCH overlap each other in the time domain and the frequency domain, or (ii) if the first PSDCH and the second PDSCH overlap each other in the time domain and the frequency domain, the first PDSCH and the second PDSCH may be configured to overlap each other in units of PRB groups (PRGs) having the same size.

In the present disclosure, the process of enabling the UE to receive the data signal through the first PDSCH based on the above-described assumption may include, receiving, by the UE, the data signal through the first PDSCH based on the interference channel estimation caused by the above-described assumption.

In the present disclosure, the second PDSCH may be scheduled (i) for the UE or may be scheduled (ii) for another UE.

In the present disclosure, the UE may perform at least one of the following additional operations to be described below:
- the operation for receiving the second DCI scheduling the second PDSCH from the BS;
- the operation for enabling the UE to receive a (additional) data signal through the second PDSCH according to the assumption based on the configuration information and the second DCI; and
- the operation for transmitting acknowledgement (ACK) information related to the received data signal to the BS.

In this case, the first PDSCH and the second PDSCH may be respectively received from different TRPs.

In the present disclosure, the UE may expect that a resource block group (RBG) size for the first PDSCH is equal to or greater than the PRG size for the first PDSCH.

In the present disclosure, based on the RBG size for the first PDSCH, the UE can expect that each of candidate values has the PRG size for the first PDSCH.

In this case, based on the RBG size that is equal to 2 and is used for the first PDSCH, the UE can expect that candidate values each having the PRG size for the first PDSCH include 2 PRBs, 4 PRBs, and wideband (WB).

In another example, based on the RBG size (for the first PDSCH) equal to or greater than 4, the UE can expect that candidate values each having the PRG size for the first PDSCH include 4 PRBs and wideband (WB).

In addition, since examples of the above-described proposals can also be used as implementation methods of the present disclosure, it will also be apparent that the examples of the above-described proposals may be considered to be a kind of proposed methods. Although the above-described proposals can be implemented independently from each other, it should be noted that the above-described proposals can also be implemented as a combination (or a merged format) of some proposals. Rules can be defined in a manner that information about whether the above-described proposed methods are applied (or information about the rules of the proposed methods) can be signaled from the BS to the UE through pre-defined signaling (e.g., physical layer signaling or higher layer signaling).

3. Example of Communication System to which Present Disclosure is Applied

The various descriptions, functions, procedures, proposals, methods, and/or operation flowcharts of the present disclosure described herein may be applied to, but not limited to, various fields requiring wireless communication/connectivity (e.g., 5G) between devices.

More specific examples will be described below with reference to the drawings. In the following drawings/description, like reference numerals denote the same or corresponding hardware blocks, software blocks, or function blocks, unless otherwise specified.

FIG. 11 illustrates a communication system 1 applied to the present disclosure.

Referring to FIG. 11, the communication system 1 applied to the present disclosure includes wireless devices, BSs, and a network. A wireless device is a device performing communication using radio access technology (RAT) (e.g., 5G NR (or New RAT) or LTE), also referred to as a communication/radio/5G device. The wireless devices may include, not limited to, a robot 100a, vehicles 100b-1 and 100b-2, an extended reality (XR) device 100c, a hand-held device 100d, a home appliance 100e, an IoT device 100f, and an artificial intelligence (AI) device/server 400. For example, the vehicles may include a vehicle having a wireless communication function, an autonomous driving vehicle, and a vehicle capable of vehicle-to-vehicle (V2V) communication. Herein, the vehicles may include an unmanned aerial vehicle (UAV) (e.g., a drone). The XR device may include an augmented reality (AR)/virtual reality (VR)/mixed reality (MR) device and may be implemented in the form of a head-mounted device (HMD), a head-up display (HUD) mounted in a vehicle, a television (TV), a smartphone, a computer, a wearable device, a home appliance, a digital signage, a vehicle, a robot, and so on. The hand-held device may include a smartphone, a smart pad, a wearable device (e.g., a smart watch or smart glasses), and a computer (e.g., a laptop). The home appliance may include a TV, a refrigerator, a washing machine, and so on. The IoT device may include a sensor, a smart meter, and so on. For example, the BSs and the network may be implemented as wireless devices, and a specific wireless device 200a may operate as a BS/network node for other wireless devices.

The wireless devices 100a to 100f may be connected to the network 300 via the BSs 200. An AI technology may be applied to the wireless devices 100a to 100f, and the wireless devices 100a to 100f may be connected to the AI server 400 via the network 300. The network 300 may be configured using a 3G network, a 4G (e.g., LTE) network, or a 5G (e.g., NR) network. Although the wireless devices 100a to 100f may communicate with each other through the BSs 200/network 300, the wireless devices 100a to 100f may perform direct communication (e.g., sidelink communication) with each other without intervention of the BSs/network. For example, the vehicles 100b-1 and 100b-2 may perform direct communication (e.g. V2V/vehicle-to-everything (V2X) communication). The IoT device (e.g., a sensor) may perform direct communication with other IoT devices (e.g., sensors) or other wireless devices 100a to 100f.

Wireless communication/connections 150a, 150b, and 150c may be established between the wireless devices 100a to 100f/BS 200 and between the BSs 200. Herein, the wireless communication/connections may be established through various RATs (e.g., 5G NR) such as UL/DL communication 150a, sidelink communication 150b (or, D2D communication), or inter-BS communication (e.g. relay or integrated access backhaul (IAB)). Wireless signals may be transmitted and received between the wireless devices, between the wireless devices and the BSs, and between the BSs through the wireless communication/connections 150a, 150b, and 150c. For example, signals may be transmitted and receive don various physical channels through the wireless communication/connections 150a, 150b and 150c. To this end, at least a part of various configuration information configuring processes, various signal processing processes (e.g., channel encoding/decoding, modulation/demodulation, and resource mapping/demapping), and resource allocation processes, for transmitting/receiving wireless signals, may be performed based on the various proposals of the present disclosure.

4. Example of Wireless Device to which Present Disclosure is Applied

FIG. 12 illustrates wireless devices applicable to the present disclosure.

Referring to FIG. 12, a first wireless device 100 and a second wireless device 200 may transmit wireless signals through a variety of RATs (e.g., LTE and NR). {The first wireless device 100 and the second wireless device 200} may correspond to {the wireless device 100x and the BS 200} and/or {the wireless device 100x and the wireless device 100x} of FIG. 20.

The first wireless device 100 may include one or more processors 102 and one or more memories 104, and further include one or more transceivers 106 and/or one or more antennas 108. The processor(s) 102 may control the memory(s) 104 and/or the transceiver(s) 106 and may be configured to implement the descriptions, functions, procedures, proposals, methods, and/or operation flowcharts disclosed in this document. For example, the processor(s) 102 may process information in the memory(s) 104 to generate first information/signals and then transmit wireless signals including the first information/signals through the transceiver(s) 106. The processor(s) 102 may receive wireless signals including second information/signals through the transceiver(s) 106 and then store information obtained by processing the second information/signals in the memory(s) 104. The memory(s) 104 may be connected to the processor(s) 102 and may store various pieces of information related to operations of the processor(s) 102. For example, the memory(s) 104 may store software code including instructions for performing all or a part of processes controlled by the processor(s) 102 or for performing the descriptions, functions, procedures, proposals, methods, and/or operation flowcharts disclosed in this document. The processor(s) 102 and the memory(s) 104 may be a part of a communication modem/circuit/chip designed to implement RAT (e.g., LTE or NR). The transceiver(s) 106 may be connected to the processor(s) 102 and transmit and/or receive wireless signals through the one or more antennas 108. Each of the transceiver(s) 106 may include a transmitter and/or a receiver. The transceiver(s) 106 may be interchangeably used with radio frequency (RF) unit(s). In the present disclosure, the wireless device may be a communication modem/circuit/chip.

The second wireless device 200 may include one or more processors 202 and one or more memories 204, and further include one or more transceivers 206 and/or one or more antennas 208. The processor(s) 202 may control the memory(s) 204 and/or the transceiver(s) 206 and may be configured to implement the descriptions, functions, procedures, proposals, methods, and/or operation flowcharts disclosed in this document. For example, the processor(s) 202 may process information in the memory(s) 204 to generate third information/signals and then transmit wireless signals including the third information/signals through the transceiver(s) 206. The processor(s) 202 may receive wireless signals including fourth information/signals through the transceiver(s) 106 and then store information obtained by processing the fourth information/signals in the memory(s) 204. The memory(s) 204 may be connected to the processor(s) 202 and store various pieces of information related to operations of the processor(s) 202. For example, the memory(s) 204 may store software code including instructions for performing all or a part of processes controlled by the processor(s) 202 or for performing the descriptions, functions, procedures, proposals, methods, and/or operation flowcharts disclosed in this document. The processor(s) 202 and the memory(s) 204 may be a part of a communication modem/circuit/chip designed to implement RAT (e.g., LTE or NR). The transceiver(s) 206 may be connected to the processor(s) 202 and transmit and/or receive wireless signals through the one or more antennas 208. Each of the transceiver(s) 206 may include a transmitter and/or a receiver. The transceiver(s) 206 may be interchangeably used with RF unit(s). In the present disclosure, the wireless device may be a communication modem/circuit/chip.

Now, hardware elements of the wireless devices 100 and 200 will be described in greater detail. One or more protocol layers may be implemented by, not limited to, one or more processors 102 and 202. For example, the one or more processors 102 and 202 may implement one or more layers (e.g., functional layers such as physical (PHY), medium access control (MAC), radio link control (RLC), packet data convergence protocol (PDCP), RRC, and service data adaptation protocol (SDAP)). The one or more processors 102 and 202 may generate one or more protocol data units (PDUs) and/or one or more service data Units (SDUs) according to the descriptions, functions, procedures, proposals, methods, and/or operation flowcharts disclosed in this document. The one or more processors 102 and 202 may generate messages, control information, data, or information according to the descriptions, functions, procedures, proposals, methods, and/or operation flowcharts disclosed in this document and provide the messages, control information, data, or information to one or more transceivers 106 and 206. The one or more processors 102 and 202 may generate signals (e.g., baseband signals) including PDUs, SDUs, messages, control information, data, or information according to the descriptions, functions, procedures, proposals, methods, and/or operation flowcharts disclosed in this document and provide the generated signals to the one or more transceivers 106 and 206. The one or more processors 102 and 202 may receive the signals (e.g., baseband signals) from the one or more transceivers 106 and 206 and acquire the PDUs, SDUs, messages, control information, data, or information according to the descriptions, functions, procedures, proposals, methods, and/or operation flowcharts disclosed in this document.

The one or more processors 102 and 202 may be referred to as controllers, microcontrollers, microprocessors, or microcomputers. The one or more processors 102 and 202 may be implemented by hardware, firmware, software, or a combination thereof. For example, one or more application specific integrated circuits (ASICs), one or more digital signal processors (DSPs), one or more digital signal processing devices (DSPDs), one or more programmable logic devices (PLDs), or one or more field programmable gate arrays (FPGAs) may be included in the one or more processors 102 and 202. The descriptions, functions, procedures, proposals, methods, and/or operation flowcharts disclosed in this document may be implemented using firmware or software, and the firmware or software may be configured to include the modules, procedures, or functions. Firmware or software configured to perform the descriptions, functions, procedures, proposals, methods, and/or operation flowcharts disclosed in this document may be included in the one or more processors 102 and 202 or may be stored in the one or more memories 104 and 204 and executed by the one or more processors 102 and 202. The descriptions, functions, procedures, proposals, methods, and/or operation flowcharts disclosed in this document may be implemented using firmware or software in the form of code, an instruction, and/or a set of instructions.

The one or more memories 104 and 204 may be connected to the one or more processors 102 and 202 and store various types of data, signals, messages, information, programs, code, instructions, and/or commands. The one or more memories 104 and 204 may be configured to include read-only memories (ROMs), random access memories (RAMs), electrically erasable programmable read-only memories (EPROMs), flash memories, hard drives, registers, cash memories, computer-readable storage media, and/or combinations thereof. The one or more memories 104 and 204 may be located at the interior and/or exterior of the one or more processors 102 and 202. The one or more memories 104 and 204 may be connected to the one or more processors 102 and 202 through various technologies such as wired or wireless connection.

The one or more transceivers 106 and 206 may transmit user data, control information, and/or wireless signals/channels, mentioned in the methods and/or operation flowcharts of this document, to one or more other devices. The one or more transceivers 106 and 206 may receive user data, control information, and/or wireless signals/channels, mentioned in the descriptions, functions, procedures, proposals, methods, and/or operation flowcharts disclosed in this document, from one or more other devices. For example, the one or more transceivers 106 and 206 may be connected to the one or more processors 102 and 202 and transmit and receive wireless signals. For example, the one or more processors 102 and 202 may perform control so that the one or more transceivers 106 and 206 may transmit user data, control information, or wireless signals to one or more other devices. The one or more processors 102 and 202 may perform control so that the one or more transceivers 106 and 206 may receive user data, control information, or wireless signals from one or more other devices. The one or more transceivers 106 and 206 may be connected to the one or more antennas 108 and 208 and the one or more transceivers 106 and 206 may be configured to transmit and receive user data, control information, and/or wireless signals/channels, mentioned in the descriptions, functions, procedures, proposals, methods, and/or operation flowcharts disclosed in this document, through the one or more antennas 108 and 208. In this document, the one or more antennas may be a plurality of physical antennas or a plurality of logical antennas (e.g., antenna ports). The one or more transceivers 106 and 206 may convert received wireless signals/channels from RF band signals into baseband signals in order to process received user data, control information, and wireless signals/channels using the one or more processors 102 and 202. The one or more transceivers 106 and 206 may convert the user data, control information, and wireless signals/channels processed using the one or more processors 102 and 202 from the baseband signals into the RF band signals. To this end, the one or more transceivers 106 and 206 may include (analog) oscillators and/or filters.

5. Use Case of Wireless Device to which Present Disclosure is Applied

FIG. 13 illustrates another example of a wireless device applied to the present disclosure. The wireless device may be implemented in various forms according to a use case/service (refer to FIG. 11).

Referring to FIG. 13, wireless devices 100 and 200 may correspond to the wireless devices 100 and 200 of FIG. 19 and may be configured to include various elements, components, units/portions, and/or modules. For example, each of the wireless devices 100 and 200 may include a communication unit 110, a control unit 120, a memory unit 130, and additional components 140. The communication unit 110 may include a communication circuit 112 and transceiver(s) 114. For example, the communication circuit 112 may include the one or more processors 102 and 202 and/or the one or more memories 104 and 204 of FIG. 21. For example, the transceiver(s) 114 may include the one or more transceivers 106 and 206 and/or the one or more antennas 108 and 208 of FIG. 13. The control unit 120 is electrically connected to the communication unit 110, the memory 130, and the additional components 140 and provides overall control to the wireless device. For example, the control unit 120 may control an electric/mechanical operation of the wireless device based on programs/code/instructions/information stored in the memory unit 130. The control unit 120 may transmit the information stored in the memory unit 130 to the outside (e.g., other communication devices) via the communication unit 110 through a wireless/wired interface or store, in the memory unit 130, information received through the wireless/wired interface from the outside (e.g., other communication devices) via the communication unit 110.

The additional components 140 may be configured in various manners according to type of the wireless device. For example, the additional components 140 may include at least one of a power unit/battery, input/output (I/O) unit, a driving unit, and a computing unit. The wireless device may be implemented in the form of, not limited to, the robot (100a of FIG. 11), the vehicles (100b-1 and 100b-2 of FIG.

11), the XR device (100c of FIG. 11), the hand-held device (100d of FIG. 11), the home appliance (100e of FIG. 11), the IoT device (100f of FIG. 11), a digital broadcasting terminal, a hologram device, a public safety device, an MTC device, a medical device, a FinTech device (or a finance device), a security device, a climate/environment device, the AI server/device (400 of FIG. 11), the BSs (200 of FIG. 11), a network node, or the like. The wireless device may be mobile or fixed according to a use case/service.

In FIG. 13, all of the various elements, components, units/portions, and/or modules in the wireless devices 100 and 200 may be connected to each other through a wired interface or at least a part thereof may be wirelessly connected through the communication unit 110. For example, in each of the wireless devices 100 and 200, the control unit 120 and the communication unit 110 may be connected by wire and the control unit 120 and first units (e.g., 130 and 140) may be wirelessly connected through the communication unit 110. Each element, component, unit/portion, and/or module in the wireless devices 100 and 200 may further include one or more elements. For example, the control unit 120 may be configured with a set of one or more processors. For example, the control unit 120 may be configured with a set of a communication control processor, an application processor, an electronic control unit (ECU), a graphical processing unit, and a memory control processor. In another example, the memory 130 may be configured with a RAM, a dynamic RAM (DRAM), a ROM, a flash memory, a volatile memory, a non-volatile memory, and/or a combination thereof.

Hereinafter, the implementation example of FIG. 13 will be described in more detail with reference to the drawings.

5.1. Example of a Hand-Held Device to which Present Disclosure is Applied

FIG. 14 illustrates a hand-held device applied to the present disclosure. The hand-held device may include a smartphone, a smartpad, a wearable device (e.g., a smartwatch or smartglasses), or a portable computer (e.g., a notebook). The hand-held device may be referred to as a mobile station (MS), a user terminal (UT), a mobile subscriber station (MSS), a subscriber station (SS), an advanced mobile station (AMS), or a wireless terminal (WT).

Referring to FIG. 14, a hand-held device 100 may include an antenna unit 108, a communication unit 110, a control unit 120, a memory unit 130, a power supply unit 140a, an interface unit 140b, and an input/output (I/O) unit 140c. The antenna unit 108 may be configured as a part of the communication unit 110. Blocks 110 to 130/140a to 140c correspond to the blocks 110 to 130/140 of FIG. 11, respectively.

The communication unit 110 may transmit and receive signals (e.g., data and control signals) to and from other wireless devices or BSs. The control unit 120 may perform various operations by controlling constituent elements of the hand-held device 100. The control unit 120 may include an application processor (AP). The memory unit 130 may store data/parameters/programs/code/instructions needed to drive the hand-held device 100. The memory unit 130 may also store input/output data/information. The power supply unit 140a may supply power to the hand-held device 100 and include a wired/wireless charging circuit, a battery, etc. The interface unit 140b may support connection of the hand-held device 100 to other external devices. The interface unit 140b may include various ports (e.g., an audio I/O port and a video I/O port) for connection to external devices. The I/O unit 140c may input or output video information/signals, audio information/signals, data, and/or information input by a user. The I/O unit 140c may include a camera, a microphone, a user input unit, a display unit 140d, a speaker, and/or a haptic module.

As an example, in the case of data communication, the I/O unit 140c may acquire information/signals (e.g., touch, text, voice, images, or video) input by a user and the acquired information/signals may be stored in the memory unit 130. The communication unit 110 may covert the information/signals stored in the memory into radio signals and transmit the converted radio signals to other wireless devices directly or to the BS. The communication unit 110 may receive radio signals from other wireless devices or the BS and then restore the received radio signals into original information/signals. The restored information/signals may be stored in the memory unit 130 and may be output as various types (e.g., text, voice, image, video, or haptic type) through the I/O unit 140c.

5.2. Example of Vehicle or Autonomous Driving Vehicle to which Present Disclosure is Applied FIG. 15 illustrates a vehicle or an autonomous driving vehicle applied to the present disclosure. The vehicle or autonomous driving vehicle may be implemented as a mobile robot, a car, a train, a manned/unmanned aerial vehicle (AV), a ship, or the like.

Referring to FIG. 15, a vehicle or autonomous driving vehicle 100 may include an antenna unit 108, a communication unit 110, a control unit 120, a driving unit 140a, a power supply unit 140b, a sensor unit 140c, and an autonomous driving unit 140d. The antenna unit 108 may be configured as a part of the communication unit 110. The blocks 110/130/140a to 140d correspond to the blocks 110/130/140 of FIG. 14, respectively.

The communication unit 110 may transmit and receive signals (e.g., data and control signals) to and from external devices such as other vehicles, BSs (e.g., gNBs and road side units), and servers. The control unit 120 may perform various operations by controlling elements of the vehicle or the autonomous driving vehicle 100. The control unit 120 may include an ECU. The driving unit 140a may enable the vehicle or the autonomous driving vehicle 100 to drive on a road. The driving unit 140a may include an engine, a motor, a powertrain, a wheel, a brake, a steering device, and so on. The power supply unit 140b may supply power to the vehicle or the autonomous driving vehicle 100 and include a wired/wireless charging circuit, a battery, and so on. The sensor unit 140c may acquire information about a vehicle state, ambient environment information, user information, and so on. The sensor unit 140c may include an inertial measurement unit (IMU) sensor, a collision sensor, a wheel sensor, a speed sensor, a slope sensor, a weight sensor, a heading sensor, a position module, a vehicle forward/backward sensor, a battery sensor, a fuel sensor, a tire sensor, a steering sensor, a temperature sensor, a humidity sensor, an ultrasonic sensor, an illumination sensor, a pedal position sensor, and so on. The autonomous driving unit 140d may implement technology for maintaining a lane on which the vehicle is driving, technology for automatically adjusting speed, such as adaptive cruise control, technology for autonomously driving along a determined path, technology for driving by automatically setting a route if a destination is set, and the like.

For example, the communication unit 110 may receive map data, traffic information data, and so on from an external server. The autonomous driving unit 140d may generate an autonomous driving route and a driving plan from the obtained data. The control unit 120 may control the driving unit 140a such that the vehicle or autonomous driving vehicle 100 may move along the autonomous driving route according to the driving plan (e.g., speed/direction control). During autonomous driving, the communication unit 110 may aperiodically/periodically acquire recent traffic information data from the external server and acquire surrounding traffic information data from neighboring vehicles. During autonomous driving, the sensor unit 140c may obtain information about a vehicle state and/or surrounding environment information. The autonomous driving unit 140d may update the autonomous driving route and the driving plan based on the newly obtained data/information. The communication unit 110 may transfer information about a vehicle position, the autonomous driving route, and/or the driving plan to the external server. The external server may predict traffic information data using AI technology based on the information collected from vehicles or autonomous driving vehicles and provide the predicted traffic information data to the vehicles or the autonomous driving vehicles.

Those skilled in the art will appreciate that the present disclosure may be carried out in other specific ways than those set forth herein without departing from the spirit and essential characteristics of the present disclosure. The above embodiments are therefore to be construed in all aspects as illustrative and not restrictive. The scope of the disclosure should be determined by the appended claims and their legal equivalents, not by the above description, and all changes coming within the meaning and equivalency range of the appended claims are intended to be embraced therein.

Embodiments of the present disclosure are applicable to various wireless access systems including a 3GPP system, and/or a 3GPP2 system. The embodiments of the present disclosure are applicable not only to the various wireless access systems but also to all technical fields to which the wireless access systems are applied. Furthermore, the proposed methods may also be applied to a millimeter wave (mmWave) communication system using an ultra-high frequency band.

Additionally, the embodiments of the present disclosure are applicable to various applications such as an autonomous-driving vehicle, a drone, etc.

What is claimed is:

1. A method for receiving a data signal by a user equipment (UE) in a wireless communication system comprising:
   receiving, from a base station (BS), configuration information related to dynamic bundling for a precoding resource block (PRB);
   receiving, from BS, first downlink control information (DCI) for scheduling a first physical downlink shared channel (PDSCH);
   i) if absence of another PDSCH configured to overlap the first PDSCH in a time domain and a frequency domain is determined based on the configuration information and the first DCI, or ii) if presence of a second PDSCH configured to overlap the first PDSCH in the time domain and the frequency domain is determined based on the configuration information and the first DCI, the UE assumes that the first PDSCH and the second PDSCH in the frequency domain overlap each other in units of PRB groups (PRGs) each having the same size; and
   receiving the data signal through the first PDSCH based on the assumption.

2. The method according to claim 1, wherein the receiving the data signal through the first PDSCH based on the UE assumption includes:
   receiving the data signal through the first PDSCH based on interference channel estimation based on the assumption.

3. The method according to claim 1, wherein the configuration information includes any one of:
   first bundling size configuration information for indicating that the dynamic bundling has the size of 2 PRBs;
   second bundling size configuration information for indicating that the dynamic bundling has the size of 4 PRBs; and
   third bundling size configuration information for indicating that the dynamic bundling has a size of wideband (WB).

4. The method according to claim 1, wherein:
   the second PDSCH is scheduled (i) for the UE, or (ii) for another UE.

5. The method according to claim 1, further comprising:
   receiving, from the BS, second DCI for scheduling the second PDSCH; and
   receiving, by the UE, the data signal through the second PDSCH based on assumption based on the configuration information and the second DCI.

6. The method according to claim 5, wherein:
   the first PDSCH and the second PDSCH are respectively received from different transmission reception points (TRPs).

7. The method according to claim 1, wherein:
   the UE expects that a size of a resource block group (RBG) for the first PDSCH is equal to or greater than a size of the PRG of the first PDSCH.

8. The method according to claim 1, wherein:
   based on a resource block group (RBG) size for the first PDSCH, the U) expects candidate values each having the PRG size for the first PDSCH.

9. The method according to claim 8, wherein:
   based on a resource block group (RBG) size that is equal to 2 and is used for the first PDSCH, the UE expects that candidate values each having the PRG size for the first PDSCH include 2 PRBs, 4 PRBs, and a wideband (WB).

10. The method according to claim 8, wherein:
    based on a resource block group (RBG) size that is equal to or greater than 4 and is used for the first PDSCH, the user equipment (UE) expects that candidate values each having the PRG size for the first PDSCH include 4 PRBs and a wideband (WB).

11. The method according to claim 1, wherein the receiving the data signal by the UE further includes:
    transmitting acknowledgement (ACK) information related to the data signal to the base station (BS).

12. A user equipment (UE) configured to receive a data signal in a wireless communication system comprising:
    at least one transmitter;
    at least one receiver;
    at least one processor; and
    at least one computer memory operably connectable to the at least one processor and storing instructions that, when executed, cause the at least one processor to perform operations comprising:
    receiving, from a base station (BS), configuration information related to dynamic bundling for a precoding resource block (PRB);
    receiving, from BS, first downlink control information (DCI) for scheduling a first physical downlink shared channel (PDSCH);
    i) if absence of another PDSCH configured to overlap the first PDSCH in a time domain and a frequency domain is determined based on the configuration information and the first DCI, or ii) if presence of a second PDSCH configured to overlap the first PDSCH in the time domain and the frequency domain is determined based on the configuration information and the first DCI, the UE assumes that the first PDSCH and the second PDSCH in the frequency domain overlap each other in units of PRB groups (PRGs) each having the same size; and receiving the data signal through the first PDSCH based on the assumption.

13. The UE according to claim 12, wherein:
the UE is configured to communicate with at least one of a mobile terminal, a network, and an autonomous vehicle other than a vehicle provided with the UE.

14. A base station (BS) configured to transmit a data signal in a wireless communication system comprising:
at least one transmitter;
at least one receiver;
at least one processor; and
at least one computer memory operably connectable to the at least one processor and storing instructions that, when executed, cause the at least one processor to perform operations comprising:

transmitting, to a user equipment (UE), configuration information related to dynamic bundling for a precoding resource block (PRB);
i) transmitting first downlink control information (DCI) for scheduling a first physical downlink shared channel (PDSCH) to the UE, and ii) transmitting second DCI for scheduling a second PDSCH to the UE; and
transmitting the first PDSCH and the second PDSCH to the UE,
wherein,
based on the configuration information, the first DCI, and the second DCI,
the first PDSCH and the second PDSCH are configured not to overlap each other in a time domain and a frequency domain, or
if the first PDSCH and the second PDSCH overlap each other in the time domain and the frequency domain, the first PDSCH and the second PDSCH in the frequency domain are configured to overlap each other in units of precoding resource block (PRB) groups (PRGs) having the same size.

* * * * *